United States Patent
Vasudevan et al.

(10) Patent No.: US 9,621,435 B2
(45) Date of Patent: Apr. 11, 2017

(54) DECLARATIVE AND EXTENSIBLE MODEL FOR PROVISIONING OF CLOUD BASED SERVICES

(71) Applicant: Oracle International Corporation, Redwood Shores, CA (US)

(72) Inventors: Ramesh Vasudevan, Los Altos, CA (US); Gopalan Arun, Saratoga, CA (US); Pradeep Seetharam, Fremont, CA (US); Anjani Kalyan Prathipati, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 736 days.

(21) Appl. No.: 13/907,616

(22) Filed: May 31, 2013

(65) Prior Publication Data

US 2014/0075032 A1 Mar. 13, 2014

Related U.S. Application Data

(60) Provisional application No. 61/698,413, filed on Sep. 7, 2012, provisional application No. 61/698,459, filed
(Continued)

(51) Int. Cl.
G06F 15/173 (2006.01)
H04L 12/24 (2006.01)
G06F 9/50 (2006.01)

(52) U.S. Cl.
CPC ............ *H04L 41/50* (2013.01); *G06F 9/5072* (2013.01)

(58) Field of Classification Search
USPC ........ 709/226, 250, 224, 220, 223; 370/538, 370/335, 437
See application file for complete search history.

(56) References Cited

U.S. PATENT DOCUMENTS

| | | | |
|---|---|---|---|
| 4,939,723 A | * | 7/1990 | Harley, Jr. ................. H04J 3/22 370/538 |
| 5,892,909 A | | 4/1999 | Grasso et al. |

(Continued)

FOREIGN PATENT DOCUMENTS

| | | |
|---|---|---|
| CN | 104604201 | 5/2015 |
| CN | 104737517 A | 6/2015 |

(Continued)

OTHER PUBLICATIONS

Non-Final Office Action mailed on Aug. 28, 2014 in U.S. Appl. No. 13/838,113, 14 pages.
(Continued)

*Primary Examiner* — Tammy Nguyen
(74) *Attorney, Agent, or Firm* — Kilpatrick Townsend & Stockton LLP

(57) ABSTRACT

A method for offering a set of services is disclosed. The method may comprise storing, by a cloud infrastructure system, subscription order information identifying a service from a set of services provided by the cloud infrastructure system, the cloud infrastructure system comprising one or more computing devices. A computing device from the one or more computing devices may determine a service declaration for the service, the service declaration comprising information indicative of procedures for provisioning resources for enabling the service. A computing device from the one or more computing devices may cause the service to be provisioned based on the service declaration.

20 Claims, 22 Drawing Sheets

Related U.S. Application Data on Sep. 7, 2012, provisional application No. 61/794,427, filed on Mar. 15, 2013, provisional application No. 61/794,269, filed on Mar. 15, 2013, provisional application No. 61/785,299, filed on Mar. 14, 2013.

(56) References Cited

U.S. PATENT DOCUMENTS

| | | |
|---|---|---|
| 5,911,143 A | 6/1999 | Deinhart et al. |
| 5,970,120 A | 10/1999 | Kasrai |
| 6,052,684 A | 4/2000 | Du |
| 6,085,188 A | 7/2000 | Bachmann et al. |
| 6,222,832 B1* | 4/2001 | Proctor ............... H04B 1/7075 370/335 |
| 6,236,988 B1 | 5/2001 | Aldred |
| 6,516,416 B2 | 2/2003 | Gregg et al. |
| 6,526,513 B1 | 2/2003 | Shrader et al. |
| 6,546,095 B1 | 4/2003 | Iverson et al. |
| 6,553,364 B1 | 4/2003 | Wu |
| 6,611,506 B1 | 8/2003 | Huang et al. |
| 6,650,433 B1* | 11/2003 | Keane et al. ............... 358/1.15 |
| 6,976,798 B2* | 12/2005 | Keane et al. ............... 400/76 |
| 7,051,039 B1 | 5/2006 | Murthy et al. |
| 7,136,867 B1 | 11/2006 | Chatterjee et al. |
| 7,290,288 B2 | 10/2007 | Gregg et al. |
| 7,428,503 B1 | 9/2008 | Groff et al. |
| 7,565,310 B2 | 7/2009 | Gao et al. |
| 7,664,866 B2 | 2/2010 | Wakefield |
| 7,790,393 B2* | 9/2010 | Lyamichev et al. ......... 435/6.11 |
| 7,912,930 B1 | 3/2011 | Farooqi et al. |
| 7,921,299 B1 | 4/2011 | Anantha et al. |
| 7,953,896 B2 | 5/2011 | Ward et al. |
| 7,992,194 B2 | 8/2011 | Damodaran et al. |
| 8,095,629 B2 | 1/2012 | Ward et al. |
| 8,151,323 B2 | 4/2012 | Harris et al. |
| 8,165,152 B2* | 4/2012 | Sammour ............... H04L 47/10 370/437 |
| 8,204,794 B1 | 6/2012 | Peng et al. |
| 8,266,616 B1 | 9/2012 | Jacquot et al. |
| 8,291,490 B1 | 10/2012 | Ahmed et al. |
| 8,321,921 B1 | 11/2012 | Ahmed et al. |
| 8,380,880 B2 | 2/2013 | Gulley et al. |
| 8,387,136 B2 | 2/2013 | Lee et al. |
| 8,387,137 B2 | 2/2013 | Lee et al. |
| 8,402,514 B1 | 3/2013 | Thompson et al. |
| 8,434,129 B2 | 4/2013 | Kannappan et al. |
| 8,468,244 B2* | 6/2013 | Redlich et al. ............... 709/225 |
| 8,499,005 B2 | 7/2013 | Brooks et al. |
| 8,572,602 B1 | 10/2013 | Colton et al. |
| 8,631,477 B2 | 1/2014 | Chen et al. |
| 8,631,478 B2 | 1/2014 | Chen et al. |
| 8,656,002 B1 | 2/2014 | Adogla et al. |
| 8,738,775 B1 | 5/2014 | Adogla et al. |
| 8,769,622 B2 | 7/2014 | Chang et al. |
| 8,769,704 B2 | 7/2014 | Peddada et al. |
| 8,788,663 B1 | 7/2014 | Adogla et al. |
| 8,789,157 B2 | 7/2014 | Sinn |
| 8,806,593 B1 | 8/2014 | Raphel et al. |
| 8,843,997 B1 | 9/2014 | Hare |
| 8,849,685 B2 | 9/2014 | Oden |
| 8,856,082 B2 | 10/2014 | Hale et al. |
| 9,015,114 B2 | 4/2015 | Chatterjee et al. |
| 9,203,866 B2 | 12/2015 | Chatterjee et al. |
| 9,219,749 B2 | 12/2015 | Khalsa et al. |
| 9,253,113 B2 | 2/2016 | Vasudevan et al. |
| 9,336,030 B1* | 5/2016 | Marr ............... G06F 9/45533 |
| 9,336,483 B1* | 5/2016 | Abeysooriya ............ G06N 3/08 |
| 2002/0004390 A1 | 1/2002 | Cutaia et al. |
| 2002/0059210 A1 | 5/2002 | Makus et al. |
| 2002/0091863 A1* | 7/2002 | Schug ............... H04L 49/90 709/250 |
| 2002/0156664 A1 | 10/2002 | Willcox et al. |
| 2003/0212991 A1 | 11/2003 | Mahajan |
| 2003/0233465 A1 | 12/2003 | Le et al. |
| 2004/0022379 A1 | 2/2004 | Klos et al. |
| 2004/0066930 A1 | 4/2004 | Bangor |
| 2004/0177133 A1 | 9/2004 | Harrison et al. |
| 2004/0267872 A1 | 12/2004 | Serdy, Jr. et al. |
| 2005/0071209 A1 | 3/2005 | Tatavu et al. |
| 2005/0198629 A1 | 9/2005 | Vishwanath |
| 2005/0289013 A1 | 12/2005 | Goldberg |
| 2005/0289072 A1 | 12/2005 | Sabharwal |
| 2006/0059029 A1 | 3/2006 | Chalasani et al. |
| 2006/0059539 A1 | 3/2006 | Shashikumar et al. |
| 2006/0143704 A1 | 6/2006 | Rits et al. |
| 2006/0173724 A1 | 8/2006 | Trefler et al. |
| 2006/0265583 A1 | 11/2006 | Eilam et al. |
| 2006/0277595 A1 | 12/2006 | Kinser et al. |
| 2007/0005536 A1 | 1/2007 | Caswell et al. |
| 2007/0028098 A1 | 2/2007 | Baartman et al. |
| 2007/0112952 A1 | 5/2007 | Sodhi et al. |
| 2007/0150480 A1 | 6/2007 | Hwang et al. |
| 2007/0169168 A1 | 7/2007 | Lim |
| 2007/0174101 A1 | 7/2007 | Li et al. |
| 2007/0203798 A1 | 8/2007 | Caballero et al. |
| 2007/0215683 A1 | 9/2007 | Koorland et al. |
| 2007/0220140 A1 | 9/2007 | Weidenschlager |
| 2007/0283147 A1 | 12/2007 | Fried et al. |
| 2008/0027825 A1 | 1/2008 | Boonie et al. |
| 2008/0077680 A1 | 3/2008 | Dellarole et al. |
| 2008/0080718 A1 | 4/2008 | Meijer et al. |
| 2008/0083036 A1 | 4/2008 | Ozzie et al. |
| 2008/0089520 A1 | 4/2008 | Kessler |
| 2008/0097816 A1 | 4/2008 | Freire et al. |
| 2008/0127183 A1 | 5/2008 | Emerson et al. |
| 2008/0155039 A1 | 6/2008 | Fernandes et al. |
| 2008/0189250 A1 | 8/2008 | Cha et al. |
| 2008/0250074 A1 | 10/2008 | Parkinson |
| 2008/0256606 A1 | 10/2008 | Koikara et al. |
| 2008/0270597 A1 | 10/2008 | Tenenti |
| 2008/0281617 A1 | 11/2008 | Conrad et al. |
| 2008/0313716 A1 | 12/2008 | Park |
| 2009/0024522 A1 | 1/2009 | Reunert et al. |
| 2009/0089407 A1 | 4/2009 | Chalupa et al. |
| 2009/0126007 A1 | 5/2009 | Zamberlan et al. |
| 2009/0157457 A1 | 6/2009 | Huuhtanen et al. |
| 2009/0178102 A1 | 7/2009 | Alghathbar et al. |
| 2009/0205018 A1 | 8/2009 | Ferraiolo et al. |
| 2009/0217267 A1 | 8/2009 | Gebhart et al. |
| 2009/0259683 A1 | 10/2009 | Murty |
| 2009/0265753 A1 | 10/2009 | Anderson et al. |
| 2009/0293046 A1 | 11/2009 | Cheriton |
| 2009/0300604 A1 | 12/2009 | Barringer |
| 2009/0320093 A1 | 12/2009 | Glazier et al. |
| 2010/0114618 A1 | 5/2010 | Wilcock et al. |
| 2010/0191774 A1 | 7/2010 | Mason, Jr. et al. |
| 2010/0198730 A1 | 8/2010 | Ahmed et al. |
| 2010/0205152 A1 | 8/2010 | Ansari et al. |
| 2010/0211781 A1 | 8/2010 | Auradkar et al. |
| 2010/0251339 A1 | 9/2010 | Mcalister |
| 2010/0280958 A1 | 11/2010 | Hasson et al. |
| 2010/0306818 A1 | 12/2010 | Li et al. |
| 2010/0318393 A1 | 12/2010 | Acker et al. |
| 2010/0333116 A1 | 12/2010 | Prahlad et al. |
| 2011/0029983 A1 | 2/2011 | Lu et al. |
| 2011/0035444 A1 | 2/2011 | Hill |
| 2011/0072436 A1 | 3/2011 | Gilat et al. |
| 2011/0103566 A1 | 5/2011 | Sarkar et al. |
| 2011/0126207 A1 | 5/2011 | Wipfel et al. |
| 2011/0131146 A1 | 6/2011 | Skutnik |
| 2011/0131309 A1 | 6/2011 | Akiyama et al. |
| 2011/0137805 A1 | 6/2011 | Brookbanks et al. |
| 2011/0138051 A1 | 6/2011 | Dawson et al. |
| 2011/0138055 A1 | 6/2011 | Daly et al. |
| 2011/0145199 A1 | 6/2011 | Prasad Palagummi |
| 2011/0153969 A1 | 6/2011 | Petrick |
| 2011/0211686 A1 | 9/2011 | Wall et al. |
| 2011/0218813 A1 | 9/2011 | Addala et al. |
| 2011/0218842 A1 | 9/2011 | Addala et al. |
| 2011/0218924 A1 | 9/2011 | Addala et al. |
| 2011/0218925 A1 | 9/2011 | Addala et al. |
| 2011/0225081 A1 | 9/2011 | Kittelsen et al. |
| 2011/0231280 A1 | 9/2011 | Farah |
| 2011/0238458 A1 | 9/2011 | Purcell et al. |

(56) References Cited

U.S. PATENT DOCUMENTS

| | | |
|---|---|---|
| 2011/0276951 A1 | 11/2011 | Jain |
| 2011/0288968 A1 | 11/2011 | King et al. |
| 2011/0295998 A1* | 12/2011 | Ferris .................. G06F 9/5072 709/224 |
| 2011/0296000 A1* | 12/2011 | Ferris .................. G06Q 10/00 709/224 |
| 2011/0307523 A1 | 12/2011 | Balani et al. |
| 2011/0313902 A1 | 12/2011 | Liu et al. |
| 2011/0314466 A1 | 12/2011 | Berg et al. |
| 2011/0320605 A1 | 12/2011 | Kramer et al. |
| 2012/0005341 A1 | 1/2012 | Seago et al. |
| 2012/0032945 A1 | 2/2012 | Dare et al. |
| 2012/0036220 A1 | 2/2012 | Dare et al. |
| 2012/0036245 A1 | 2/2012 | Dare et al. |
| 2012/0036440 A1 | 2/2012 | Dare et al. |
| 2012/0036442 A1 | 2/2012 | Dare et al. |
| 2012/0036552 A1 | 2/2012 | Dare et al. |
| 2012/0041844 A1 | 2/2012 | Shen et al. |
| 2012/0047357 A1 | 2/2012 | Bealkowski |
| 2012/0066755 A1 | 3/2012 | Peddada et al. |
| 2012/0072555 A1 | 3/2012 | DeLuca et al. |
| 2012/0079134 A1 | 3/2012 | Outhred et al. |
| 2012/0089426 A1 | 4/2012 | Borucki |
| 2012/0096521 A1 | 4/2012 | Peddada |
| 2012/0110583 A1 | 5/2012 | Balko et al. |
| 2012/0131166 A1 | 5/2012 | Barbedette et al. |
| 2012/0131194 A1 | 5/2012 | Morgan |
| 2012/0136936 A1 | 5/2012 | Quintuna |
| 2012/0150693 A1 | 6/2012 | Dueck et al. |
| 2012/0159494 A1 | 6/2012 | Shafiee et al. |
| 2012/0159503 A1 | 6/2012 | Shafiee et al. |
| 2012/0198073 A1 | 8/2012 | Srikanth et al. |
| 2012/0221454 A1 | 8/2012 | Morgan |
| 2012/0226796 A1 | 9/2012 | Morgan |
| 2012/0226808 A1* | 9/2012 | Morgan ........................ 709/226 |
| 2012/0271949 A1 | 10/2012 | Radhakrishnan et al. |
| 2012/0284776 A1 | 11/2012 | Sundaram et al. |
| 2012/0297441 A1 | 11/2012 | Boldyrev et al. |
| 2012/0304191 A1 | 11/2012 | Morgan |
| 2012/0311153 A1 | 12/2012 | Morgan |
| 2012/0311154 A1 | 12/2012 | Morgan |
| 2012/0324092 A1 | 12/2012 | Brown et al. |
| 2013/0007265 A1 | 1/2013 | Benedetti et al. |
| 2013/0030859 A1 | 1/2013 | Jung et al. |
| 2013/0047230 A1 | 2/2013 | Krishnan et al. |
| 2013/0054763 A1* | 2/2013 | Van der Merwe ...... H04W 8/12 709/220 |
| 2013/0055251 A1 | 2/2013 | Anderson et al. |
| 2013/0103640 A1 | 4/2013 | Rehman |
| 2013/0124401 A1 | 5/2013 | Del Real |
| 2013/0139152 A1 | 5/2013 | Chang et al. |
| 2013/0145300 A1 | 6/2013 | Mackay et al. |
| 2013/0152183 A1 | 6/2013 | Plewnia et al. |
| 2013/0204994 A1 | 8/2013 | Deshmukh et al. |
| 2013/0212160 A1 | 8/2013 | Lawson et al. |
| 2013/0212420 A1 | 8/2013 | Lawson et al. |
| 2013/0227137 A1 | 8/2013 | Damola et al. |
| 2013/0254882 A1 | 9/2013 | Kannappan et al. |
| 2013/0262556 A1 | 10/2013 | Xu et al. |
| 2013/0268480 A1 | 10/2013 | Dorman |
| 2013/0268491 A1 | 10/2013 | Chung et al. |
| 2013/0275509 A1 | 10/2013 | Micucci et al. |
| 2013/0283350 A1 | 10/2013 | Afek et al. |
| 2013/0290710 A1 | 10/2013 | Broder et al. |
| 2013/0298210 A1 | 11/2013 | Wright et al. |
| 2013/0298212 A1 | 11/2013 | Shah et al. |
| 2013/0332984 A1 | 12/2013 | Sastry et al. |
| 2013/0332985 A1 | 12/2013 | Sastry et al. |
| 2013/0336235 A1 | 12/2013 | Meyer et al. |
| 2014/0020054 A1 | 1/2014 | Lim |
| 2014/0059002 A1 | 2/2014 | Lockhart et al. |
| 2014/0059226 A1 | 2/2014 | Messerli et al. |
| 2014/0074539 A1 | 3/2014 | Doering et al. |
| 2014/0074540 A1 | 3/2014 | Evans et al. |
| 2014/0074544 A1 | 3/2014 | Seetharam et al. |
| 2014/0074659 A1 | 3/2014 | Chatterjee et al. |
| 2014/0074788 A1 | 3/2014 | Chatterjee et al. |
| 2014/0074793 A1 | 3/2014 | Doering et al. |
| 2014/0074999 A1 | 3/2014 | Khalsa et al. |
| 2014/0075016 A1 | 3/2014 | Chatterjee et al. |
| 2014/0075027 A1 | 3/2014 | Chatterjee et al. |
| 2014/0075031 A1 | 3/2014 | Doering et al. |
| 2014/0075033 A1 | 3/2014 | Doering et al. |
| 2014/0075034 A1 | 3/2014 | Vasudevan et al. |
| 2014/0075239 A1 | 3/2014 | Prathipati et al. |
| 2014/0075499 A1 | 3/2014 | Arun et al. |
| 2014/0075501 A1 | 3/2014 | Srinivasan et al. |
| 2014/0075565 A1 | 3/2014 | Srinivasan et al. |
| 2014/0082749 A1* | 3/2014 | Holland .................. G06F 21/60 726/29 |
| 2014/0141743 A1 | 5/2014 | Shaw |
| 2014/0143083 A1 | 5/2014 | Prathipati et al. |
| 2014/0192717 A1 | 7/2014 | Liu et al. |
| 2014/0201345 A1* | 7/2014 | Abuelsaad .......... H04L 41/5067 709/223 |
| 2014/0237502 A1 | 8/2014 | Kelsen et al. |
| 2014/0280943 A1 | 9/2014 | Bobrov et al. |
| 2014/0372533 A1 | 12/2014 | Fu et al. |
| 2015/0067171 A1* | 3/2015 | Yum .................. H04L 67/2809 709/226 |
| 2015/0074279 A1 | 3/2015 | Maes et al. |
| 2015/0156218 A1 | 6/2015 | Arun et al. |
| 2015/0363724 A1 | 12/2015 | Chatterjee et al. |
| 2015/0365301 A1 | 12/2015 | Chatterjee et al. |
| 2016/0028581 A1 | 1/2016 | Khalsa et al. |

FOREIGN PATENT DOCUMENTS

| | | |
|---|---|---|
| CN | 104756460 A | 7/2015 |
| EP | 0538464 | 4/1993 |
| EP | 1914951 A1 | 4/2008 |
| EP | 2458548 A1 | 5/2012 |
| EP | 2893683 A | 7/2015 |
| EP | 2893684 | 7/2015 |
| EP | 2893685 | 7/2015 |
| JP | 2015529366 A | 10/2015 |
| JP | 2015529367 | 10/2015 |
| WO | 2009/018584 A1 | 2/2009 |
| WO | 2010149222 | 12/2010 |
| WO | 2010151273 | 12/2010 |
| WO | 2012070993 | 5/2012 |
| WO | 2014039772 | 3/2014 |
| WO | 2014039882 | 3/2014 |
| WO | 2014039918 | 3/2014 |
| WO | 2014039919 | 3/2014 |
| WO | 2014039921 | 3/2014 |
| WO | 2015191119 A1 | 12/2015 |

OTHER PUBLICATIONS

Non-Final Office Action mailed on Sep. 11, 2014 in U.S. Appl. No. 13/838,537, 22 pages.

Written Opinion mailed on Sep. 11, 2014 in International Application. No. PCT/US2013/058642, 8 pages.

Oracle—Breaking Cloud Security Barriers with Identity Management, Oracle, 2010, 37 pages.

Oracle Identity Management 11 g—An Oracle Whitepaper, Oracle, Jul. 2010, 61 pages.

Alcaraz Calero, Jose M. et al., "Toward a Multi-Tenancy Authorization System for Cloud Services", IEEE Computer and Realibily Societies, Nov./Dec. 2010, pp. 48-55.

Tsai, Wei-Tek et al., "Role-Based Access Control Using Reference Ontology in Clouds", IEEE, 2011 Tenth International Symposium on Autonomous Decentralized Systems, 2011, pp. 121-128.

Wainwright, Steve, "Oracle Public Cloud—An Enterprise Cloud for Business Critical Applications", Oracle, 2011, 39 pages.

Oracle Unveils Oracle Public Cloud, Oracle, Oct. 5, 2011, 2 pages.

Lau, Christina et al., "Best Practices for access control in multi-tenant cloud solutions using Tivoli Access Manager", IBM, DeveloperWorks, May 1, 2011, 8 pages.

Rashee, Haroon et al., "Multi-Tenancy on Private Cloud", Enlighten, Feb. 2012, 20 pages.

(56) References Cited

OTHER PUBLICATIONS

The Oracle Identity Management Platform: Identity Services at Internet Scale, Oracle, Jul. 2012, 20 pages.
U.S. Appl. No. 13/842,269, Notice of Allowance mailed on Nov. 3, 2014, 8 pages.
U.S. Appl. No. 13/842,833, Notice of Allowance mailed on Dec. 15, 2014, 11 pages.
U.S. Appl. No. 13/840,943, Non-Final Office Action mailed on Dec. 18, 2014, 10 pages.
U.S. Appl. No. 13/843,613, Non-Final Office Action mailed on Jan. 23, 2015, 17 pages.
U.S. Appl. No. 14/019,051, Non-Final Office Action mailed on Nov. 20, 2014, 5 pages.
U.S. Appl. No. 13/838,813, Final Office Action mailed on Dec. 4, 2014, 24 pages.
U.S. Appl. No. 13/907,689, Non-Final Office Action mailed on Jan. 7, 2015, 11 pages.
International Application No. PCT/US2013/058426, International Preliminary Report on Patentability mailed on Dec. 5, 2014, 6 pages.
International Application No. PCT/US2013/058596, International Preliminary Report on Patentability mailed on Dec. 5, 2014, 6 pages.
An Introduction to Role-Based Access Control, NIST/ITL Bulletin, retrieved from the Internet: URL: http://csrc.nist.gov/groups/SNS/rbac/documents/design_implementation/Intro_role_based_access.htm on Oct. 22, 2013, Dec. 1995, 5 pages.
Basic Traversals, The Neo4J Manual, Neo Technology, Inc. (copyright 2012), 7 Pages.
LDAP Authentication Overview, Juniper Networks, Inc. (copyright 1999-2010), 4 pages.
Oracle Internet Directory Administrator's Guide: Introduction to LDAP and Oracle Internet Directory, Oracle, 10g Release 2, B14082-02, retrieved from the Internet: URL: http://docs.oracle.com/cd/B14099_19/idmanage.1012/b14082/intro.htm on Oct. 1, 2013, 1999, 9 pages.
Using ldapsearch, *Red Hat Directory Server 8.2 Administration Guide for managing Directory Server instances Edition 8.2.8*, Red Hat, Inc. (copyright 2010), 3 pages.
XACML v3.0 Hierarchical Resource Profile Version 1.0, Oasis, Working Draft 7, retrieved from the Internet: URL: http://xml.coverpages.org/XACML-v30-HierarchicalResourceProfile-WD7.pdf on Aug. 29, 2013., Apr. 1, 2009, 22 pages.
Afgan et al., CloudMan as a Tool Execution Framework for the Cloud, IEEE Proceedings of The 35th International Convention on Information and Communication Technology, Electronics and Microelectronics (MIPRO 2012), pp. 437-441.
Anthony et al., Consolidation Best Practices: Oracle Database 12c plugs you into the cloud, Oracle White Paper, retrieved from the Internet: URL: http://www.oracle.com/us/products/database/database-private-cloud-wp-360048.pdf on Oct. 1, 2013, Jul. 2013, 30 pages.
Bastos et al., Towards a Cloud-Based Environment for Space Systems Concept Design, IEEE International Conference on Informational Society (I-Society 2012), pp. 478-483.
Bierman et al., Network Configuration Protocol (NETCONF) Access Control Model, Internet Engineering Task Force, RFC 6536, retrieved from the Internet: URL: http://tools.ietf.org/html/rfc6536 on Aug. 29, 2013, Mar. 2012, 50 pages.
Chanliau et al., Oracle Fusion Middleware: Oracle Platform Security Services (OPSS) FAQ, Oracle Corporation, retrieved from the Internet: URL: http://www.oracle.com/technetwork/testcontent/opss-faq-131489.pdf on Oct. 1, 2013, Jul. 2010, 6 pages.
Chiba et al., Dynamic Authorization Extension to Remote Authentication Dial in User Service (RADIUS), Network Working Group, RFC 5176, retrieved from the Internet: URL: http://tools.ietf.org/html/rfc5176 on Aug. 29, 2013, Jan. 2008, 35 pages.
Clemm et al., Web Distributed Authoring and Versioning (WebDAV) Access Control Protocol, Network Working Group, RFC 3744, retrieved from the Internet: URL: http://www.ietf.org/rfc/rfc3744.txt on Aug. 29, 2013, May 2004, 66 pages.
Datta et al., Oracle Fusion Middleware Developer's Guide for Oracle Identity Manager, Oracle Corporation, 11g Release 2, E27150-08, retrieved from the Internet: URL: http://docs.oracle.com/cd/E37115_01/dev.1112/e27150/toc.htm on Oct. 1, 2013, Sep. 2013, 1102 pages.
Demarest et al., Oracle Cloud Computing, An Oracle White Paper, Oracle Corporation, Redwood Shores, CA, May 2010, 22 pages.
Hunter, LDAP Searching—Setting the SCOPE Parameters, available at http://www.idevelopment.info/data/LDAP/LDAP_Resources/SEARCH_Setting_the_SCOPE_Parameter.shtml, (copyright 1998-2013), 2 pages.
Paul et al., Architectures for the future networks and the next generation Internet: A survey, Computer Communications 34: 2-42 (2011).
International Patent Application No. PCT/US2013/058426, International Search Report and Written Opinion mailed on Nov. 8, 2013, 9 pages.
International Patent Application No. PCT/US2013/058596, International Search Report and Written opinion mailed on Nov. 22, 2013, 9 pages.
International Patent Application No. PCT/US2013/058638, International Search Report and Written Opinion mailed on Jan. 8, 2014, 11 pages.
International Patent Application No. PCT/US2013/058639, International Search Report and Written Opinion mailed on Jan. 8, 2014, 10 pages.
International Patent Application No. PCT/US2013/058642, International Search Report & Written Opinion mailed on Feb. 7, 2014, 17 pages.
Subi et al., Oracle Fusion Middleware Application Security Guide, Oracle Corporation, 11g Release 1, E10043-09, retrieved from the Internet: URL: http://docs.oracle.com/cd/E21764_01/core.1111/e10043/underjps.htm on Oct. 1, 2013, May 2011, 834 pages.
Teger et al., Oracle Fusion Middleware Developer's Guide for Oracle Access Management, Oracle Corporation, 11g Release 2, E27134-06, retrieved from the Internet: URL: http://docs.oracle.com/cd/E37115_01/dev.1112/e27134/toc.htm on Oct. 1, 2013, Jul. 2013, 372 pages.
Teger, Oracle Fusion Middleware Developer's Guide for Oracle Entitlements Server, Oracle Corporation, 11g Release 1, E27154-01, retrieved from the Internet: URL: http://docs.oracle.com/cd/E27559_01/dev.1112/e27154/handle_auth_calls.htm on Oct. 1, 2013, Jul. 2012, 132 pages.
U.S. Appl. No. 13/842,269, Non Final Office Action mailed on Jun. 5, 2014, 12 pages.
U.S. Appl. No. 13/838,813, Non Final Office Action mailed on Aug. 14, 2014, 22 pages.
International Application No. PCT/US2013/058642, Invitation to restrict or pay additional fees mailed on Jul. 23, 2014, 3 pages.
International Patent Application No. PCT/US2013/058426, Written Opinion, mailed Aug. 19, 2014, 7 pages.
International Patent Application No. PCT/US2013/058596, Written Opinion, mailed Aug. 19, 2014, 6 pages.
U.S. Appl. No. 13/907,689, Notice of Allowance mailed Apr. 22, 2016, 8 pages.
U.S. Appl. No. 14/877,835, Non-Final Office Action mailed Jun. 17, 2016, 12 pages.
U.S. Appl. No. 13/844,018, Notice of Allowance mailed Jul. 14, 2016, 9 pages.
International Patent Application No. PCT/US2015/016214, Written Opinion mailed Jun. 3, 2016, 5 pages.
U.S. Appl. No. 14/624,356, Non-Final Office Action mailed on Sep. 15, 2016, 9 pages.
U.S. Appl. No. 13/907,728, Notice of Allowance mailed on Aug. 25, 2016, 13 pages.
Ranganathan, Architecting the Oracle VM solution using the Oracle Sun ZFS Storage Appliances and Oracle Sun Servers, http://www.oracle.com/technetworklarticles/systems-hardware-architecture/vm-solution-using-zfs-storage-1 74070.pdf, Sep. 2010, 18 pages.

(56) References Cited

OTHER PUBLICATIONS

International Application No. PCT/US2013/058638, International Preliminary Report on Patentability mailed on Jun. 12, 2015, 8 pages.
U.S. Appl. No. 13/835,307, Notice of Allowance mailed on Jul. 7, 2015, 5 pages.
International Application No. PCT/US2013/058639, Written Opinion mailed on Jul. 7, 2015, 6 pages.
International Application No. PCT/US2013/058639, International Preliminary Report on Patentability mailed on Sep. 24, 2015, 8 pages.
EP Patent Application No. 13766777.0, Office Action mailed on Feb. 10, 2016, 5 pages.
Oracle, Identity Manager Design Console Guide, Release 9.1.0, Jun. 2008, 208 pages.
Buyya, Cloud Computing Principles and Paradigms, 2011, 674 pages.
Chong et al., ISVs are from Mars, and Hosters are from Venus, https://msdn.microsoft.com/en-us/library/bb891759.aspx, Nov. 2007, 28 pages.
Dan et al., Web services on demand: WSLA-driven automated management, IBM Systems Journal vol. 43 Issue: 1, 2004, pp. 136-158.
Haslam, Simon. Virtualisation arrives for Exalogic 2—Details from Launch Event. Jul. 26, 2012 [retrieved on Jun. 2, 2015]. Retrieved from the Internet <URL: http://www.veriton.co.uk!roller/fmw/entry/exalogic_2_details_from_launch>.
Keahey et al., Virtual Workspaces for Scientific Applications, 2007, pp. 1-5.
U.S. Appl. No. 13/907,728, Non-Final Office Action mailed on Jul. 2, 2015, 14 pages.
U.S. Appl. No. 13/844,018, Final Office Action mailed on Dec. 14, 2015, 21 pages.
U.S. Appl. No. 13/907,652, Final Office Action mailed on Dec. 17, 2015, 10 pages.
U.S. Appl. No. 13/907,728, Final Office Action mailed on Dec. 17, 2015, 16 pages.
U.S. Appl. No. 14/618,791, Notice of Allowance mailed on Dec. 21, 2015, 7 pages.
U.S. Appl. No. 14/618,791, Supplemental Notice of Allowability mailed on Jan. 6, 2016, 2 pages.
U.S. Appl. No. 13/836,625, Final Office Action mailed on Jan. 13, 2016, 46 pages.
U.S. Appl. No. 13/907,652, Non-Final Office Action mailed on Feb. 19, 2016, 11 pages.
Oracle Service Contracts, User Guide, Release 12, Oracle, Part No. B25717-02, Jun. 2007, 534 pages.
International Application No. PCT/US2013/058642, International Preliminary Report on Patentability mailed on Jan. 20, 2015, 10 pages.
International Application No. PCT/US2015/016214, International Search Report and Written Opinion mailed on May 11, 2015, 11 pages.
U.S. Appl. No. 13/840,943, Notice of Allowance mailed on Jun. 29, 2015, 10 pages.
U.S. Appl. No. 13/841,243, Non-Final Office Action mailed on Jul. 15, 2015, 15 pages.
U.S. Appl. No. 13/841,768, Non-Final Office Action mailed on Oct. 6, 2015, 11 pages.
U.S. Appl. No. 13/841,994, Non-Final Office Action mailed on Oct. 26, 2015, 8 pages.
U.S. Appl. No. 13/843,613, Final Office Action mailed on Jun. 2, 2015, 20 pages.
U.S. Appl. No. 13/906,835, Final Office Action mailed on Aug. 7, 2015, 21 pages.
U.S. Appl. No. 13/906,835, Non-Final Office Action mailed on Mar. 20, 2015, 16 pages.
U.S. Appl. No. 13/907,652, Non-Final Office Action mailed on Jun. 3, 2015, 10 pages.
U.S. Appl. No. 13/909,795, Non-Final Office Action mailed on Apr. 23, 2015, 9 pages.
U.S. Appl. No. 13/909,795, Notice of Allowance mailed on Sep. 18, 2015, 5 pages.
U.S. Appl. No. 14/618,791, Non-Final Office Action mailed on Sep. 4, 2015, 17 pages.
U.S. Appl. No. 13/836,625, Non-Final Office Action mailed on Nov. 18, 2016, 41 pages.
International Application No. PCT/US2015/016214, International Preliminary Report on Patentability mailed on Sep. 19, 2016, 6 pages.
European Patent Application EP13766777.0, Examiner Report mailed Nov. 30, 2016, 5 pages.
U.S. Appl. No. 14/877,835, Notice of Allowance mailed on Jan. 10, 2017, 13 pages.

\* cited by examiner

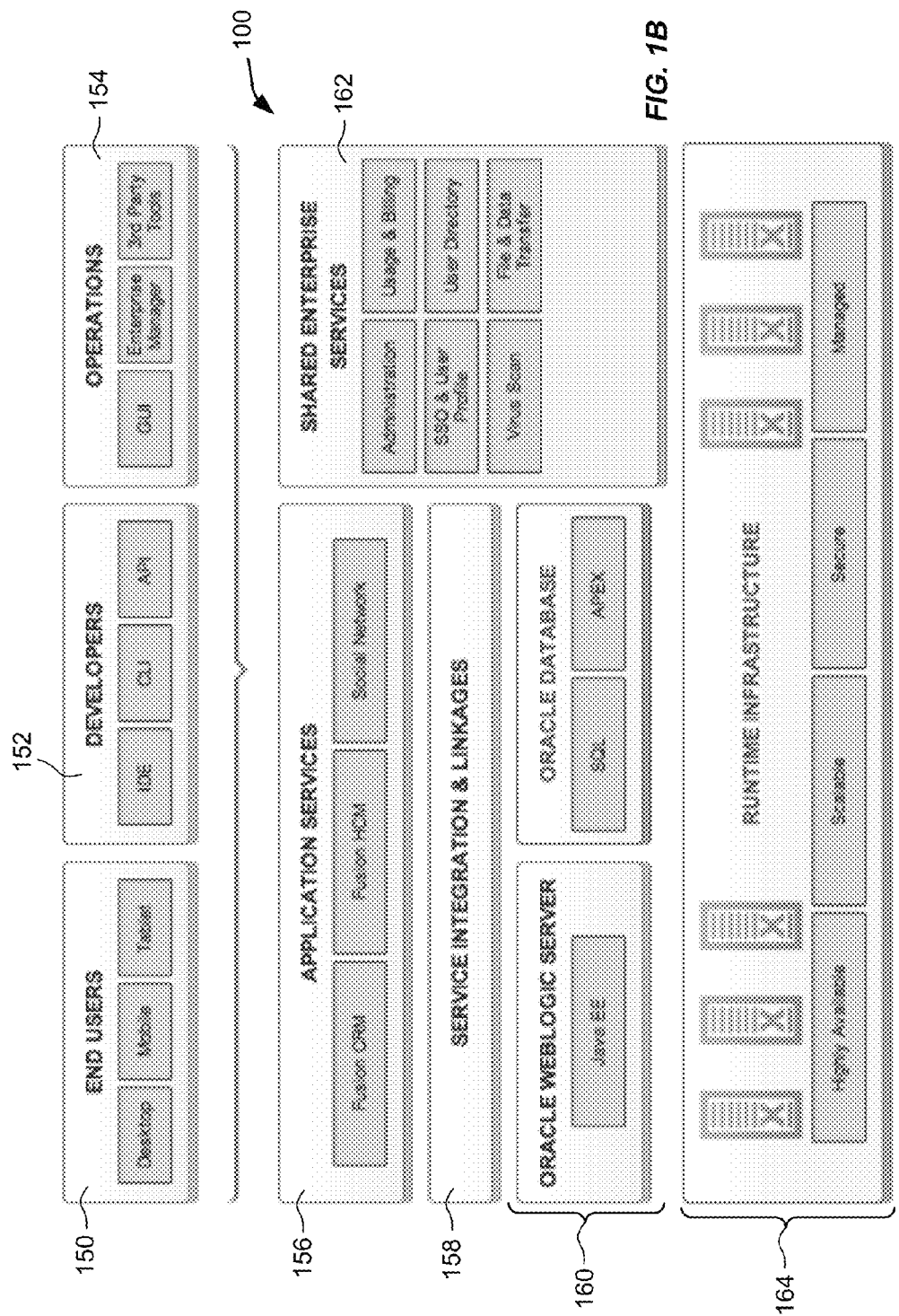

DECLARATIVE AND EXTENSIBLE MODEL FOR PROVISIONING OF CLOUD BASED SERVICES

CROSS-REFERENCES TO RELATED APPLICATIONS

The present application is a non-provisional of and claims the benefit and priority under 35 U.S.C. 119(e) of the following applications, the entire contents of which are incorporated herein by reference for all purposes:
(1) U.S. Provisional Application No. 61/698,413, filed Sep. 7, 2012, entitled TENANT AUTOMATION SYSTEM;
(2) U.S. Provisional Application No. 61/698,459, filed Sep. 7, 2012, entitled SERVICE DEVELOPMENT INFRASTRUCTURE;
(3) U.S. Provisional Application No. 61/785,299, filed Mar. 14, 2013, entitled CLOUD INFRASTRUCTURE;
(4) U.S. Provisional Application No. 61/794,269, filed Mar. 15, 2013, entitled DECLARATIVE AND EXTENSIBLE MODEL FOR PROVISIONING OF CLOUD BASED SERVICES; and
(5) U.S. Provisional Application No. 61/794,427, filed Mar. 15, 2013, entitled CLOUD INFRASTRUCTURE.

BACKGROUND

The present disclosure relates to computer systems and software, and more particularly to techniques for facilitating and automating the provision of services in a cloud environment.

Cloud computing is a model for enabling convenient, on-demand network access to a shared pool of configurable computing resources (e.g., networks, servers, storage, applications, and services). The services provided or accessed through the cloud (or network) are referred to as cloud services. There is a lot of processing that needs to be performed by a cloud service provider to make cloud services available to a subscribing customer. Due to its complexity, much of this processing is still done manually. For example, provisioning resources for providing such cloud services can be a very labor intensive process.

SUMMARY

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to some embodiments, a method for offering a set of services is disclosed. The method may comprise storing, by a cloud infrastructure system, subscription order information identifying a service from a set of services provided by the cloud infrastructure system, the cloud infrastructure system comprising one or more computing devices. A computing device from the one or more computing devices may determine a service declaration for the service, the service declaration comprising information indicative of procedures for provisioning resources for enabling the service. A computing device from the one or more computing devices may cause the service to be provisioned based on the service declaration.

According to some embodiments, a system may comprise: one or more computing devices configurable to offer a set of cloud services; a memory configurable to store subscription order information identifying a service from the set of cloud services; and wherein a computing device from the one or more computing devices is configurable to: determine a service declaration for the service, the service declaration comprising information indicative of procedures for provisioning resources for enabling the service; and cause the service to be provisioned based on the service declaration.

According to some embodiments, one or more computer-readable media storing computer-executable instructions for a cloud infrastructure system configured to offer a set of cloud services that, when executed, may cause one or more computing devices in the cloud infrastructure system to: store subscription order information identifying a service from the set of cloud services; determine a service declaration for the service, the service declaration comprising information indicative of procedures for provisioning resources for enabling the service; and cause the service to be provisioned based on the service declaration.

BRIEF DESCRIPTION OF THE DRAWINGS

Illustrative embodiments of the present invention are described in detail below with reference to the following drawing figures:

FIG. 1B is a simplified block diagram of a hardware/software stack that may be used to implement a cloud infrastructure system according to an embodiment of the present invention.

DETAILED DESCRIPTION

Figure 1A:
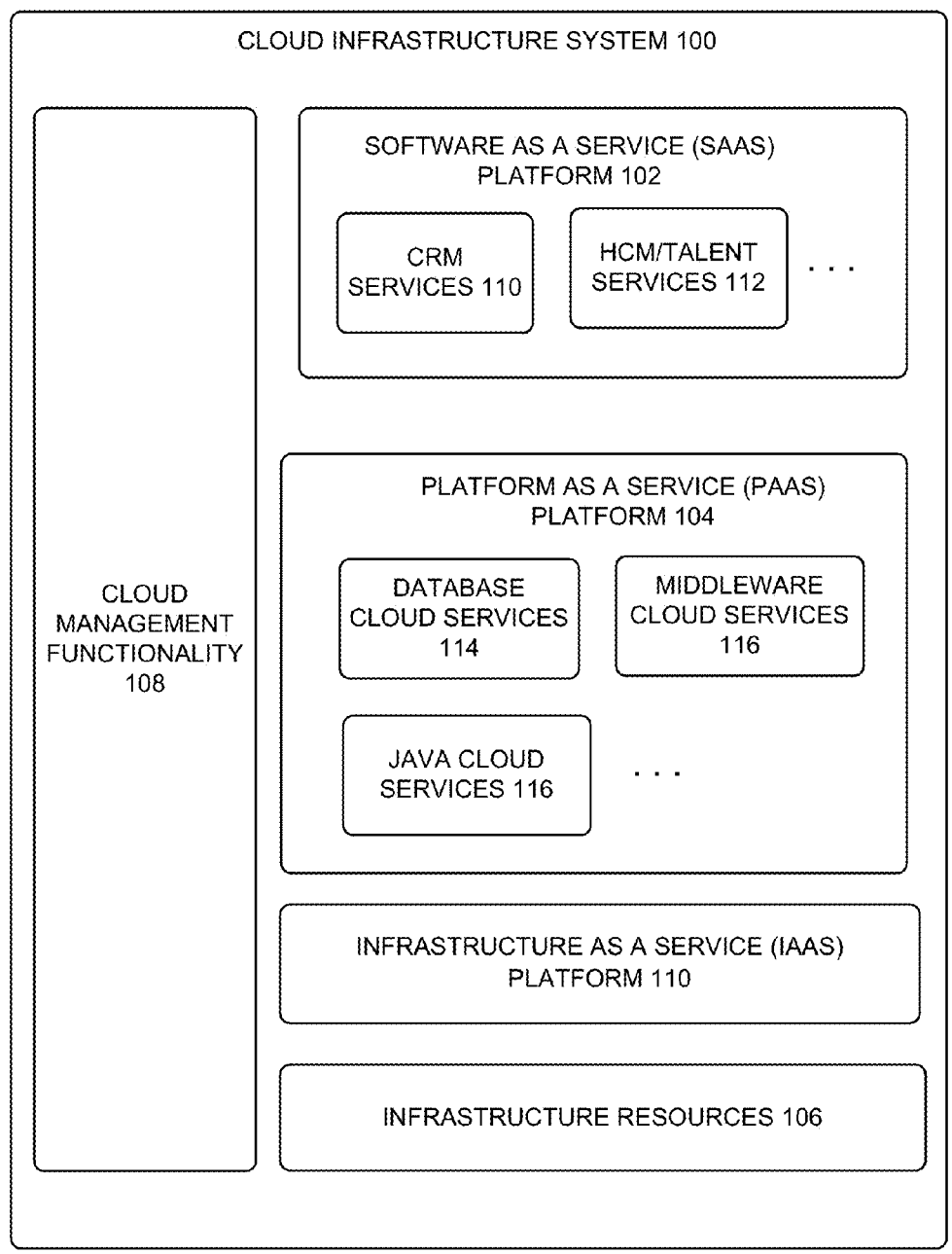
FIG. 1A is a logical view of a cloud infrastructure system according to one embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Certain embodiments of the present invention provide techniques for automating the provisioning, managing and tracking of services provided by a cloud infrastructure system.

In certain embodiments, a cloud infrastructure system may include a suite of applications, middleware and database service offerings that are delivered to a customer in a self-service, subscription-based, elastically scalable, reliable, highly available, and secure manner. An example of such a cloud infrastructure system is the Oracle Public Cloud provided by the present assignee.

A cloud infrastructure system may provide many capabilities including, but not limited to, provisioning, managing and tracking a customer's subscription for services and resources in the cloud infrastructure system, providing predictable operating expenses to customers utilizing the services in the cloud infrastructure system, providing robust identity domain separation and protection of a customer's data in the cloud infrastructure system, providing customers with a transparent architecture and control of the design of the cloud infrastructure system, providing customers assured data protection and compliance with data privacy standards and regulations, providing customers with an integrated development experience for building and deploying services in the cloud infrastructure system and providing customers with a seamless integration between business software, middleware, database and infrastructure services in the cloud infrastructure system.

In certain embodiments, services provided by the cloud infrastructure system may include a host of services that are made available to users of the cloud infrastructure system on demand such as online data storage and backup solutions, Web-based e-mail services, hosted office suites and document collaboration services, database processing, managed technical support services and the like. Services provided by the cloud infrastructure system can dynamically scale to meet the needs of its users. A specific instantiation of a service provided by cloud infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

A service in a computer network cloud infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

FIG. 1A is a logical view of a cloud infrastructure system according to one embodiment of the present invention. Cloud infrastructure system 100 may provide a variety of services via a cloud or networked environment. These services may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 100. Cloud infrastructure system 100 then performs processing to provide the services in the customer's subscription order.

Cloud infrastructure system 100 may provide the cloud services via different deployment models. For example, services may be provided under a public cloud model where cloud infrastructure system 100 is owned by an organization selling cloud services (e.g., owned by Oracle) and the services are made available to the general public or different industry enterprises. As another example, services may be provided under a private cloud model where cloud infrastructure system 100 is operated solely for a single organization and may provide services for one or more entities within the organization. The cloud services may also be provided under a community cloud model where cloud infrastructure system 100 and the services provided by system 100 are shared by several organizations in a related community. The cloud services may also be provided under a hybrid cloud model, which is a combination of two or more different models.

As shown in FIG. 1A, cloud infrastructure system 100 may comprise multiple components, which working in conjunction, enable provision of services provided by cloud infrastructure system 100. In the embodiment illustrated in FIG. 1A, cloud infrastructure system 100 includes a SaaS platform 102, a PaaS platform 104, an IaaS platform 110, infrastructure resources 106, and cloud management functionality 108. These components may be implemented in hardware, or software, or combinations thereof.

SaaS platform 102 is configured to provide cloud services that fall under the SaaS category. For example, SaaS platform 102 may provide capabilities to build and deliver a suite of on-demand applications on an integrated development and deployment platform. SaaS platform 102 may manage and control the underlying software and infrastructure for providing the SaaS services. By utilizing the services provided by SaaS platform 102, customers can utilize applications executing on cloud infrastructure system 100. Customers can acquire the application services without the need for customers to purchase separate licenses and support.

Various different SaaS services may be provided. Examples include without limitation services that provide solutions for sales performance management, enterprise integration and business flexibility for large organizations, and the like. In one embodiment, the SaaS services may include Customer Relationship Management (CRM) services 110 (e.g., Fusion CRM services provided by the Oracle cloud), Human Capital Management (HCM)/Talent Management services 112, and the like. CRM services 110 may include services directed to reporting and management of a sales activity cycle to a customer, and others. HCM/Talent services 112 may include services directed to providing global workforce lifecycle management and talent management services to a customer.

Various different PaaS services may be provided by PaaS platform 104 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 104 may manage and control the underlying software and infrastructure for providing the PaaS services. Customers can acquire the PaaS services provided by cloud infrastructure system 100 without the need for customers to purchase separate licenses and support. Examples of PaaS services include without limitation Oracle Java Cloud Service (JCS), Oracle Database Cloud Service (DBCS), and others.

By utilizing the services provided by PaaS platform 104, customers can utilize programming languages and tools supported by cloud infrastructure system 100 and also control the deployed services. In some embodiments, PaaS services provided by the cloud infrastructure system 100 may include database cloud services 114, middleware cloud services (e.g., Oracle Fusion Middleware services) 116 and Java cloud services 117. In one embodiment, database cloud services 114 may support shared service deployment models that enable organizations to pool database resources and offer customers a database-as-a-service in the form of a database cloud, middleware cloud services 116 provides a platform for customers to develop and deploy various business applications and Java cloud services 117 provides a platform for customers to deploy Java applications, in the cloud infrastructure system 100. The components in SaaS platform 102 and PaaS platform 104 illustrated in FIG. 1A are meant for illustrative purposes only and are not intended to limit the scope of embodiments of the present invention. In alternate embodiments, SaaS platform 102 and PaaS platform 104 may include additional components for providing additional services to the customers of cloud infrastructure system 100.

Various different IaaS services may be provided by IaaS platform 110. The IaaS services facilitate the management and control of the underlying computing resources such as storage, networks, and other fundamental computing resources for customers utilizing services provided by the SaaS platform and the PaaS platform.

In certain embodiments, cloud infrastructure system 100 includes infrastructure resources 106 for providing the resources used to provide various services to customers of the cloud infrastructure system 100. In one embodiment, infrastructure resources 106 includes pre-integrated and optimized combinations of hardware such as servers, storage and networking resources to execute the services provided by the PaaS platform and the SaaS platform.

In certain embodiments, cloud management functionality 108 provides comprehensive management of cloud services (e.g., SaaS, PaaS, IaaS services) in the cloud infrastructure system 100. In one embodiment, cloud management functionality 108 includes capabilities for provisioning, managing and tracking a customer's subscription received by the cloud infrastructure system 100, and the like.

FIG. 1B is a simplified block diagram of a hardware/software stack that may be used to implement cloud infrastructure system 100 according to an embodiment of the present invention. It should be appreciated that implementation depicted in FIG. 1B may have other components than those depicted in FIG. 1B. Further, the embodiment shown in FIG. 1B is only one example of a cloud infrastructure system that may incorporate an embodiment of the invention. In some other embodiments, cloud infrastructure system 100 may have more or fewer components than shown in FIG. 1B, may combine two or more components, or may have a different configuration or arrangement of components. In certain embodiments, the hardware and software components are stacked so as to provide vertical integration that provides optimal performance.

Various types of users may interact with cloud infrastructure system 100. These users may include, for example, end users 150 that can interact with cloud infrastructure system 100 using various client devices such as desktops, mobile devices, tablets, and the like. The users may also include developers/programmers 152 who may interact with cloud infrastructure system 100 using command line interfaces (CLIs), application programming interfaces (APIs), through various integrated development environments (IDEs), and via other applications. User may also include operations personnel 154. These may include personnel of the cloud service provider or personnel of other users.

Application services layer 156 identifies various cloud services that may be offered by cloud infrastructure system 100. These services may be mapped to or associated with respective software components 160 (e.g., Oracle WebLogic server for providing Java services, oracle database for providing database services, and the like) via a service integration and linkages layer 158.

In certain embodiments, a number of internal services 162 may be provided that are shared by different components or modules of cloud infrastructure system 100 and by the services provided by cloud infrastructure system 100. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 164 represents the hardware layer on which the various other layers and components are built. In certain embodiments, runtime infrastructure layer 164 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software engineered solution that delivers high-performance, highly available, scalable, secure, and a managed platform for providing cloud services.

Figure 2:
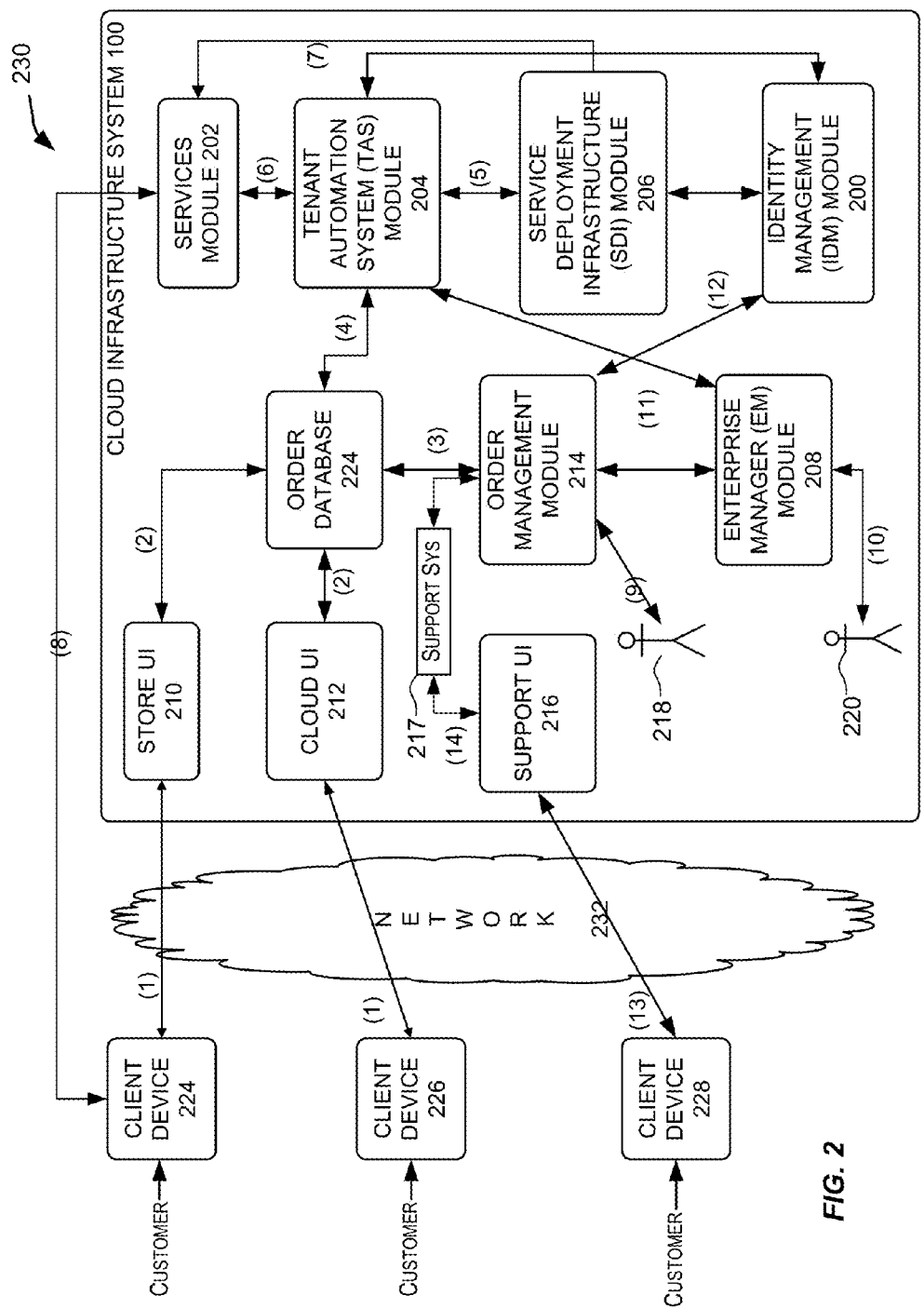
FIG. 2 is a simplified block diagram of a system environment for implementing the cloud infrastructure system shown in FIG. 1A.

FIG. 2 is a simplified block diagram of a system environment for implementing the cloud infrastructure system shown in FIG. 1A according to an embodiment of the present invention. In the illustrated embodiment, system environment 230 includes one or more client computing devices 224, 226 and 228 that may be used by users to interact with cloud infrastructure system 100. A client device may be configured to operate a client application such as a web browser, a proprietary client application (e.g., Oracle Forms), or some other application, which may be used by a user of the client device to interact with cloud infrastructure system 100 to utilize services provided by cloud infrastructure system 100.

It should be appreciated that cloud infrastructure system 100 depicted in FIG. 2 may have other components than those depicted in FIG. 2. Further, the embodiment shown in FIG. 2 is only one example of a cloud infrastructure system that may incorporate an embodiment of the invention. In some other embodiments, cloud infrastructure system 100 may have more or fewer components than shown in FIG. 2, may combine two or more components, or may have a different configuration or arrangement of components.

Client computing devices 224, 226 and 228 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, client computing devices 224, 226 and 228 may be any other electronic device, such as a thin-client computer, Internet-enabled gaming system, and/or personal messaging device, capable of communicating over a network (e.g., network 232 described below). Although exemplary system environment 230 is shown with three client computing devices, any number of client computing devices may be supported. Other devices such as devices with sensors, etc. may interact with cloud infrastructure system 100.

A network 232 may facilitate communications and exchange of data between clients 224, 226 and 228 and cloud infrastructure system 100. Network 232 may be any type of network familiar to those skilled in the art that can support data communications using any of a variety of commercially-available protocols, including without limitation TCP/IP, SNA, IPX, AppleTalk, and the like. Merely by way of example, network 232 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1x suite of protocols, the Bluetooth protocol known in the art, and/or any other wireless protocol), and/or any combination of these and/or other networks.

Cloud infrastructure system 100 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up cloud infrastructure system 100 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, cloud infrastructure system 100 may be adapted to automatically provision, manage and track a customer's subscription to services offered by cloud infrastructure system 100. In one embodiment, as depicted in FIG. 2, the components in cloud infrastructure system 100 include an Identity Management (IDM) module 200, a services module 202, a Tenant Automation System (TAS) module 204, a Service Deployment Infrastructure (SDI) module 206, an Enterprise Manager (EM) module 208, one or more front-end web interfaces such as a store user interface (UI) 210, a cloud user interface (UI) 212, and a support user interface (UI) 216, an order management module 214, sales personnel 218, operator personnel 220 and an order database 224. These modules may include or be provided using one or more computers and/or servers which may be general purpose computers, specialized server computers, server farms, server clusters, or any other appropriate arrangement and/or combination. In one embodiment, one or more of these modules can be provided by cloud management functionality 108 or IaaS platform 110 in cloud infrastructure system 100. The various modules of the cloud infrastructure system 100 depicted in FIG. 2 are meant for illustrative purposes only and are not intended to limit the scope of embodiments of the present invention. Alternative embodiments may include more or fewer modules than those shown in FIG. 2.

In an exemplary operation, at (1) a customer using a client device such as client device 224 or 226 may interact with cloud infrastructure system 100 by browsing the various services provided by cloud infrastructure system 100 and placing an order for a subscription for one or more services offered by cloud infrastructure system 100. In certain embodiments, the customer may access store UI 210 or cloud UI 212 and place a subscription order via these user interfaces.

The order information received by cloud infrastructure system 100 in response to the customer placing an order may include information identifying the customer and one or more services offered by the cloud infrastructure system 100 that the customer intends to subscribe to. A single order may include orders for multiple services. For instance, a customer may login to cloud UI 212 and request a subscription for a CRM service and a Java cloud service in the same order.

Additionally, the order may also include one or more service levels for the ordered services. As used herein, and as will be discussed in greater detail below, a service level for a service determines the amount of resources to be allocated for providing the requested service in the context of the subscription, such as the amount of storage, amount of computing resources, data transfer facilities, and the like. For example, a basic service level may provide a minimum level of storage, data transmission, or number of users, and higher service levels may include additional resources.

In addition, in some instances, the order information received by cloud infrastructure system 100 may include information indicative of a customer level, and the time period during which the service is desired. The customer level specifies the priority of the customer making the subscription request. In one example, the priority may be determined based on the quality of service that the cloud infrastructure system 100 guarantees or promises the customer as specified by a Service Level Agreement (SLA) agreed to between the customer and the provider of the cloud services. In one example, the different customer levels include a basic level, a silver level and a gold level. The time period for a service may specify the start date and time for the service and the time period for which the service is desired (e.g., a service end date and time may be specified).

In one embodiment, a customer may request a new subscription via store UI 210 or request for a trial subscription via cloud UI 212. In certain embodiments, store UI 210 may represent the service provider's eCommerce store front (e.g., www.oracle.com/store for Oracle Cloud services). Cloud UI 212 may represent a business interface for the service provider. Consumer can explore available services and sign up for interested services through cloud UI 212. Cloud UI 212 captures user input necessary for ordering trial subscriptions provided by cloud infrastructure system 100. Cloud UI 212 may also be used to view account features and configure the runtime environment located within cloud infrastructure system 100. In addition to placing an order for a new subscription, store UI 210 may also enable the customer to perform other subscription-related tasks such as changing the service level of a subscription, extending the term of the subscription, increasing the service level of a subscription, terminating an existing subscription, and the like.

After an order has been placed per (1), at (2), the order information that is received via either store UI 210 or cloud UI 212 is stored in order database 224, which can be one of several databases operated by cloud infrastructure system 100 and utilized in conjunction with other system elements. While order database 224 is shown logically as a single database in FIG. 2, in actual implementation, this may comprise one or more databases.

At (3), the order is forwarded to order management module 214. Order management module 214 is configured to perform billing and accounting functions related to the order such as verifying the order and upon verification, booking the order. In certain embodiments, order management module 214 may include a contract management module and an install base module. The contract management module may store contract information associated with the customer's subscription order such as the customer's service level agreement (SLA) with cloud infrastructure system 100. The install base module may include detailed descriptions of the services in the customer's subscription order. In addition to order information, the install base module may track installation details related to the services, product status and support service history related to the services. As a customer orders new services or upgrades existing ones, the install base module may automatically add new order information.

At (4), information regarding the order is communicated to TAS module 204. In one embodiment, TAS module 204 utilizes the order information to orchestrate the provisioning of services and resources for the order placed by the customer. At (5), TAS component 204 orchestrates the provisioning of resources to support the subscribed services using the services of SDI module 206. At (6) TAS module 204 provides information related to the provisioned order received from SDI module 206 to services module 202. In some embodiments, at (7), SDI module 206 may also use services provided by services module 202 to allocate and configure the resources needed to fulfill the customer's subscription order.

At (8), services module 202 sends a notification to the customers on client devices 224, 226 and 228 regarding the status of the order.

In certain embodiments, TAS module 204 functions as an orchestration component that manages business processes associated with each order and applies business logic to determine whether an order should proceed to provisioning. In one embodiment, upon receiving an order for a new subscription, TAS module 204 sends a request to SDI module 206 to allocate resources and configure those resources needed to fulfill the subscription order. SDI module 206 enables the allocation of resources for the services ordered by the customer. SDI module 206 provides a level of abstraction between the cloud services provided by cloud infrastructure system 100 and the physical implementation layer that is used to provision the resources for providing the requested services. TAS module 204 may thus be isolated from implementation details such as whether or not services and resources are actually provisioned on the fly or pre-provisioned and only allocated/assigned upon request.

In certain embodiments, a user may use store UI 210 to directly interact with order management module 214 to perform billing and accounting related functions such as verifying the order and upon verification, booking the order. In some embodiments, instead of a customer placing an order, at (9), the order may instead be placed by sales personnel 218 on behalf of the customer such as a customer's service representative or sales representative. Sales personnel 218 may directly interact with order management module 214 via a user interface (not shown in FIG. 2) provided by order management module 214 for placing orders or for providing quotes for the customer. This, for example, may be done for large customers where the order may be placed by the customer's sales representative through order management module 214. The sales representative may set up the subscription on behalf of the customer.

EM module 208 is configured to monitor activities related to managing and tracking a customer's subscription in cloud infrastructure system 100. EM module 208 collects usage statistics for the services in the subscription order such as the amount of storage used, the amount data transferred, the number of users, and the amount of system up time and system down time. At (10), a host operator personnel 220, who may be an employee of a provider of cloud infrastructure system 100, may interact with EM module 208 via an enterprise manager user interface (not shown in FIG. 2) to manage systems and resources on which services are provisioned within cloud infrastructure system 100.

Identity management (IDM) module 200 is configured to provide identity services such as access management and authorization services in cloud infrastructure system 100. In one embodiment, IDM module 200 controls information about customers who wish to utilize the services provided by cloud infrastructure system 100. Such information can include information that authenticates the identities of such customers and information that describes which actions those customers are authorized to perform relative to various system resources (e.g., files, directories, applications, communication ports, memory segments, etc.) IDM module 200 can also include the management of descriptive information about each customer and about how and by whom that descriptive information can be accessed and modified.

In one embodiment, information managed by the identity management module 200 can be partitioned to create separate identity domains. Information belonging to a particular identity domain can be isolated from all other identity domains. Also, an identity domain can be shared by multiple separate tenants. Each such tenant can be a customer subscribing to services in the cloud infrastructure system 100. In some embodiments, a customer can have one or many identity domains, and each identity domain may be associated with one or more subscriptions, each subscription having one or many services. For example, a single customer can represent a large entity and identity domains may be created for divisions/departments within this large entity. EM module 208 and IDM module 200 may in turn interact with order management module 214 at (11) and (12) respectively to manage and track the customer's subscriptions in cloud infrastructure system 100.

In one embodiment, at (13), support services may also be provided to the customer via a support UI 216. In one embodiment, support UI 216 enables support personnel to interact with order management module 214 via a support backend system to perform support services at (14). Support personnel in the cloud infrastructure system 100 as well as customers can submit bug reports and check the status of these reports via support UI 216.

Other interfaces, not shown in FIG. 2 may also be provided by cloud infrastructure system 100. For example, an identity domain administrator may use a user interface to IDM module 200 to configure domain and user identities. In addition, customers may log into a separate interface for each service they wish to utilize. In certain embodiments, a customer who wishes to subscribe to one or more services offered by cloud infrastructure system 100 may also be assigned various roles and responsibilities. In one embodiment, the different roles and responsibilities that may be assigned for a customer may include that of a buyer, an account administrator, a service administrator, an identity domain administrator or a user who utilizes the services and resources offered by cloud infrastructure system 100. The different roles and responsibilities are described more fully in FIG. 4 below.

Figure 3A:
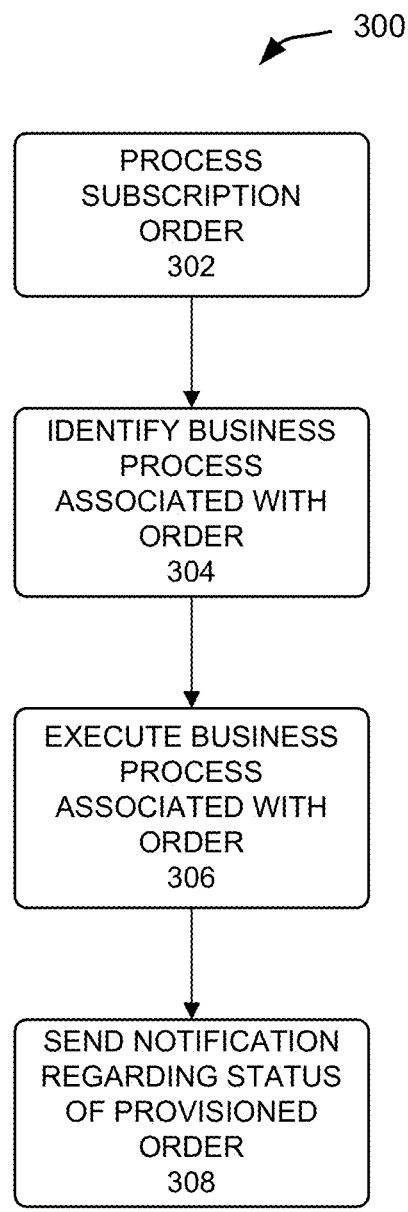
FIG. 3A depicts a simplified flowchart 300 depicting processing that may be performed by the TAS module in the cloud infrastructure system, in accordance with an embodiment of the present invention.

FIG. 3A depicts a simplified flowchart 300 depicting processing that may be performed by the TAS module in the cloud infrastructure system, in accordance with an embodiment of the present invention. The processing depicted in FIG. 3A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 3A is not intended to be limiting. Other sequences of steps may also be performed according to alternative embodiments. For example, alternative embodiments of the present invention may perform the steps outlined above in a different order. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 3A may be performed by one or more components in TAS component 204 as will be described in detail in FIG. 3B.

At 302, a customer's subscription order is processed. The processing may include validating the order, in one example. Validating the order includes ensuring that the customer has paid for the subscription and ensuring that the customer does not already have subscriptions with the same name or that the customer is not attempting to create multiple subscriptions of the same type in the same identity domain for subscription types for which this is disallowed (such as, in the case of a CRM service). Processing may also include tracking the status of an order for each order that is being processed by cloud infrastructure system 100.

At 304, a business process associated with the order is identified. In some instances, multiple business processes may be identified for an order. Each business process identifies a series of steps for processing various aspects of the order. As an example, a first business process may identify one or more steps related to provisioning physical resources for the order, a second business process may identify one or more steps related to creating an identity domain along with customer identities for the order, a third business process may identify one or more steps for related to performing back office functions such as creating a customer record for the user, performing accounting functions related to the order, and the like. In certain embodiments, different business processes may also be identified for processing different services in an order. For example, different business process may be identified to process a CRM service and a database service.

At 306, the business process identified for the order in 304 is executed. Executing the business process associated with the order may include orchestrating the series of steps associated with the business process identified in step 304. For example, executing a business process related to provisioning physical resources for the order may include sending a request to SDI module 206 to allocate resources and configure those resources needed to fulfill the subscription order.

At 308, a notification is sent to the customer regarding the status of the provisioned order. Additional description related to performing steps 302, 304, 306 and 308 is provided in detail in FIG. 3B.

Figure 3B:
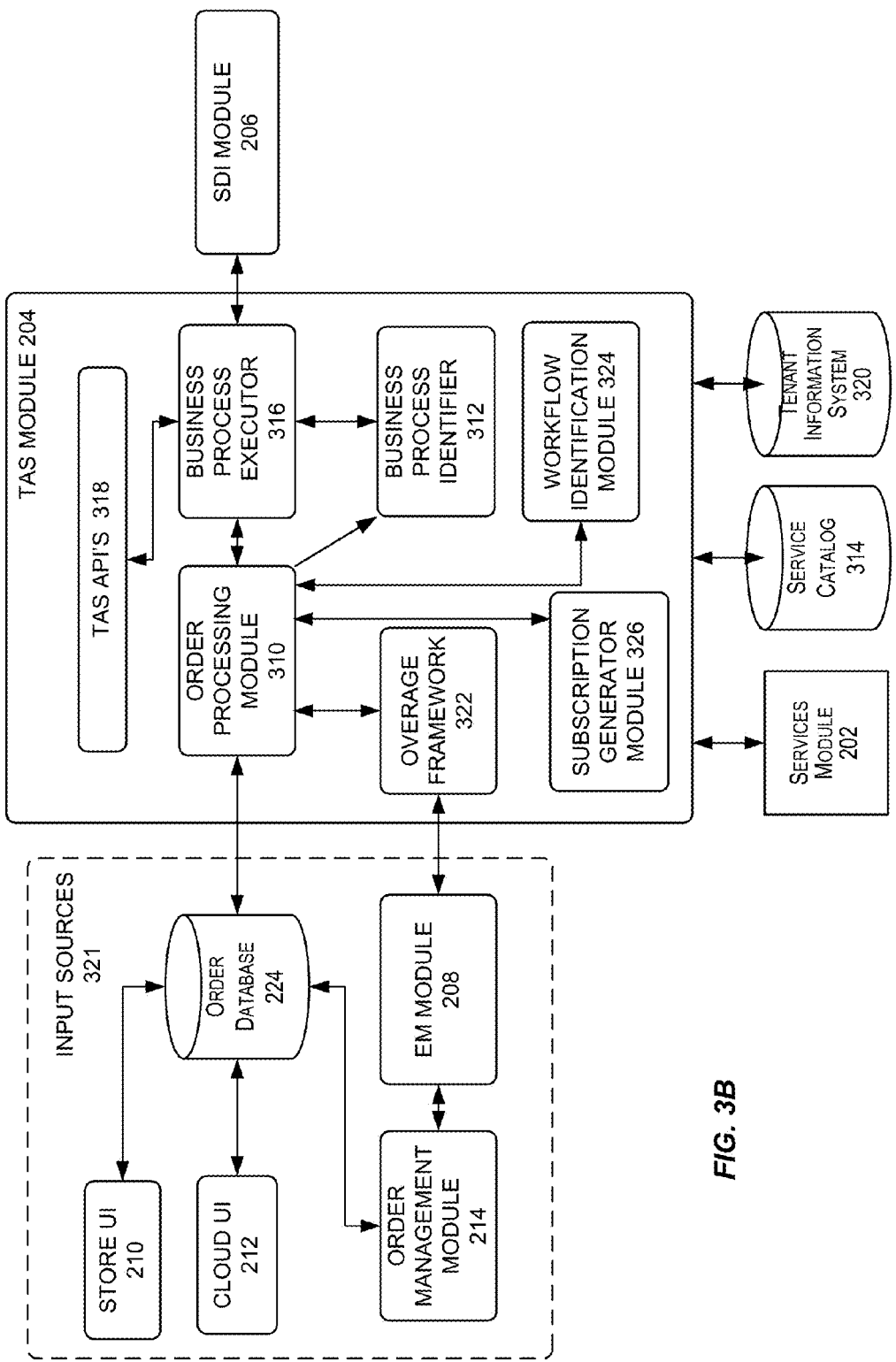
FIG. 3B depicts a simplified high level diagram of one or more sub-modules in the TAS module in the cloud infrastructure system, in accordance with an embodiment of the present invention.

FIG. 3B depicts a simplified high level diagram of one or more sub-modules in the TAS module in the cloud infrastructure system, in accordance with an embodiment of the present invention. In one embodiment, the modules depicted in FIG. 3B perform the processing described in steps 302-308 discussed in FIG. 3A. In the illustrated embodiment, TAS module 204 comprises an order processing module 310, a business process identifier 312, a business process executor 316, an overage framework 322, a workflow identification module 324, and a bundled subscription generator module 326. These modules may be implemented in hardware, or software, or combinations thereof. The various modules of the TAS module depicted in FIG. 3B are meant for illustrative purposes only and are not intended to limit the scope of embodiments of the present invention. Alternative embodiments may include more or fewer modules than those shown in FIG. 3B.

In one embodiment, order processing module 310 receives an order from a customer from one or more input sources 321. For example, order processing module 310 may directly receive an order via cloud UI 212 or store UI 210, in one embodiment. Alternatively, order processing module 310 may receive an order from order management module 214 or order database 224. Order processing module 310 then processes the order. In certain embodiments, processing the order includes generating a customer record which includes information about the order such as a service type, a service level, a customer level, the type of resources, the amount of the resources to be allocated to the service instance and a time period during which the service is desired. As part of the processing, order processing module 310 also determines whether the order is a valid order. This includes ensuring that the customer does not already have subscriptions with the same name or that the customer is not attempting to create multiple subscriptions of the same type in the same identity domain for subscription types where this is disallowed (such as, in the case of a fusion CRM service).

Order processing module 310 may also perform additional processing on the order. Processing may include tracking the status of an order for each order that is being processed by cloud infrastructure system 100. In one embodiment, order processing module 310 may process each order to identify a number of states pertaining to the order. In one example, the different states of an order may be an initialized state, a provisioned state, an active state, an administration required state, an error state, and the like. An initialized state refers to the state of a new order; a provisioned state refers to the state of an order once the services and resources for the order have been provisioned. An order is in an active state when the order has been processed by TAS module 204 and a notification to that effect has been delivered to the customer. An order is in an administration required state when intervention by an administrator is needed to resolve the issue. The order is in an error state when the order cannot be processed. In addition to maintaining the order progress status, order processing module 310 also maintains detailed information about any failures encountered during process execution. In other embodiments, and as will be discussed in detail below, the additional processing performed by order processing module 310 may also include changing the service level for a service in the subscription, changing the services included in the subscription, extending the time period of the subscription, and canceling the subscription or specifying different service levels for different time periods in the subscription.

After an order has been processed by order processing module 310, business logic is applied to determine whether the order should proceed to provisioning. In one embodiment, as part of orchestrating the order, business process identifier 312 receives the processed order from order processing module 310 and applies business logic to identify a particular business process to use for the order being processed. In one embodiment, business process identifier 312 may utilize information stored in a service catalog 314 to determine the particular business process to be used for the order. In one embodiment, and as discussed in FIG. 3A, multiple business processes may be identified for an order and each business process identifies a series of steps for processing various aspects of the order. In another embodiment, and as discussed above, different business processes may be defined for different types of services, or combinations of services such as a CRM service or a database service. In one embodiment, service catalog 314 may store information mapping an order to a particular type of business process. Business process identifier 312 may use this information to identify a specific business process for the order being processed.

Once a business process has been identified, business process identifier 312 communicates the particular business process to be executed to business process executor 316. Business process executor 316 then executes steps of the identified business process by operating in conjunction with one or more modules in the cloud infrastructure system 100. In some embodiments, business process executor 316 acts as an orchestrator for performing the steps associated with a business process. For example, the business process executor may interact with order processing module 310 to execute steps in a business process that identifies workflows related to the order, determines the overage of services in the order or identifies service components related to the order.

In one example, business process executor 316 interacts with SDI module 206 to execute steps in a business process for allocating and provisioning resources for services requested in the subscription order. In this example, for each step in the business process, business process executor 316 may send a request to SDI component 206 to allocate resources and configure resources needed to fulfill the particular step. SDI component 206 is responsible for the actual allocation of the resources. Once all the steps of the business processes of an order have been executed, business process executor 316 may send a notification to the customer of the processed order by utilizing the services of services component 202. The notification may include sending an email notification to the customer with details of the processed order. The email notification may also include deployment information related to the order to enable the customer to access the subscribed services.

In certain embodiments, TAS module 204 may provide one or more TAS Application Programming Interfaces (APIs) 318 that enable TAS module 204 to interact with other modules in cloud infrastructure system 100 and for other modules to interact with TAS module 204. For example, the TAS APIs may include a system provisioning API that interacts with SDI module 206 via an asynchronous Simple Object Access Protocol (SOAP) based web services call to provision resources for the customer's subscription order. In one embodiment, TAS module 204 may also utilize the system provisioning API to accomplish system and service instance creation and deletion, switch a service instance to an increased service level, and associate service instances. An example of this is the association of a Java service instance to a fusion applications service instance to allow secure web service communications. The TAS APIs may also include a notification API that interacts with the services module 202 to notify the customer of a processed order. In certain embodiments, the TAS module 204 also periodically propagates subscription information, outages, and notifications (e.g. planned downtime) to services component 202.

In certain embodiments, TAS module 204 periodically receives usage statistics for each of the provisioned services such as the amount of storage used, the amount data transferred, the number of users, and the amount of system up time and system down time from EM module 208. Overage framework 322 utilizes the usage statistics to determine whether over use of a service has occurred, and if so, to determine how much to bill for the overage, and provides this information to order management module 214.

In certain embodiments, TAS module 204 includes an order workflow identification module 324 that is configured to identify one or more workflows associated with processing a customer's subscription order. In certain embodiments, TAS module 204 may include a subscription order generation framework 326 for generating subscription orders for a customer when the customer places a subscription order for one or more services offered by the cloud infrastructure system 100. In one embodiment, a subscription order includes one or more service components responsible for providing the services requested by a customer in the subscription order.

Additionally, TAS module 204 may also interact with one or more additional databases such as a Tenant Information System (TIS) database 320 to enable the provisioning of resources for one or more services subscribed by the customer while taking into consideration historical information, if any, available for the customer. TIS database 320 may include historical order information and historical usage information pertaining to orders subscribed by the customer.

TAS module 204 may be deployed using different deployment models. In certain embodiments, the deployment includes a central component that interfaces with one or more distributed components. The distributed components may, for example, be deployed as various data centers and accordingly may also be referred to as data center components. The central component includes capabilities to process orders and co-ordinate services in cloud infrastructure system 100, while the data center components provide capabilities for provisioning and operating the runtime system that provides the resources for the subscribed services.

Figure 4:
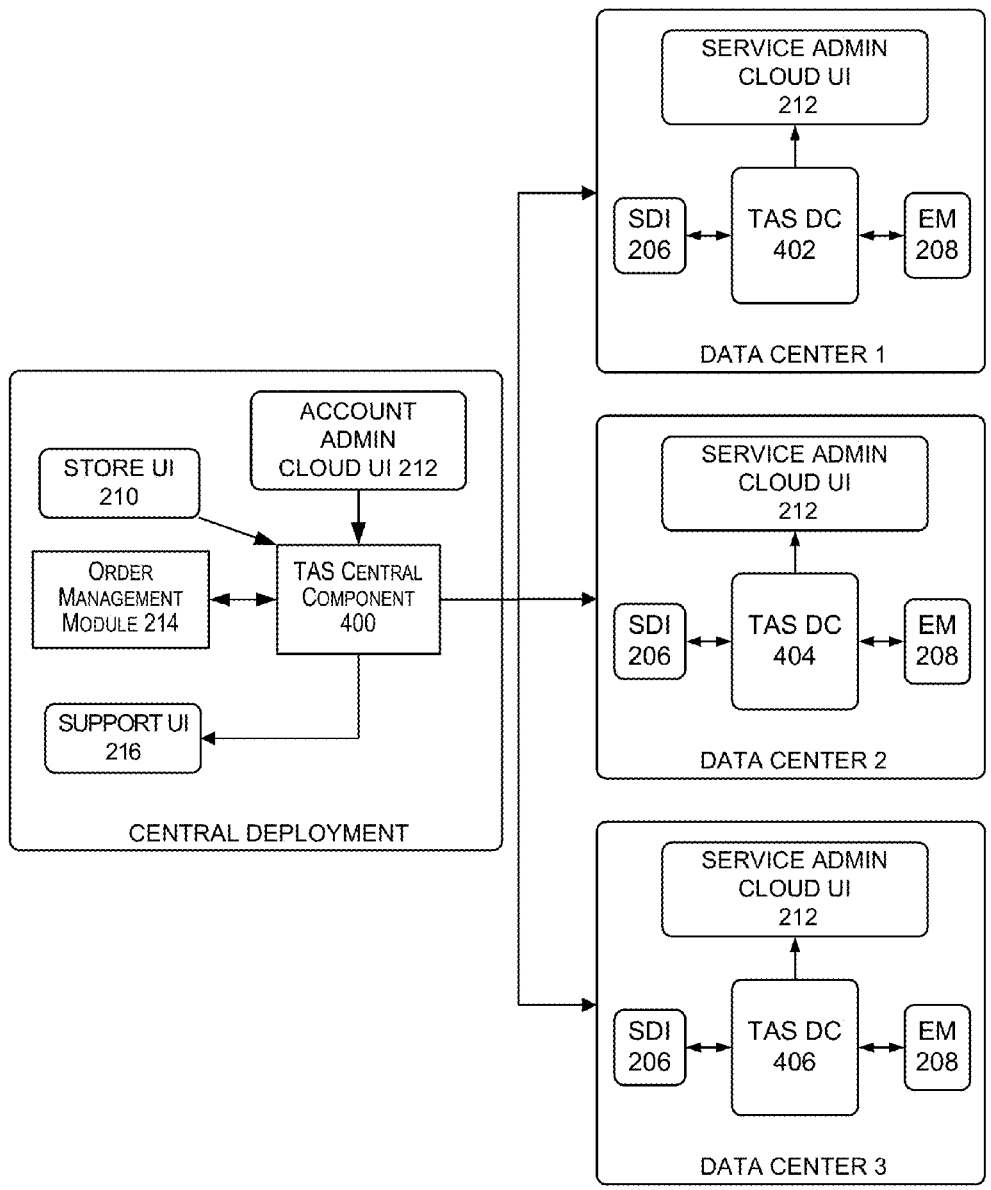
FIG. 4 depicts an exemplary distributed deployment of the TAS component, according to an embodiment of the present invention.

FIG. 4 depicts an exemplary distributed deployment of the TAS module, according to an embodiment of the present invention. In the embodiment depicted in FIG. 4, the distributed deployment of TAS module 204 includes a TAS central component 400 and one or more TAS Data Centers (DCs) components 402, 404 and 406. These components may be implemented in hardware, or software, or combinations thereof.

In one embodiment, the responsibilities of TAS central component 400 include, without limitation, to provide a centralized component for receiving customer orders, performing order-related business operations such as creating a new subscription, changing the service level for a service in the subscription, changing the services included in the subscription, and extending the time period of the subscription, or canceling the subscription. The responsibilities of TAS central component 400 may also include maintaining and serving subscription data needed by cloud infrastructure system 100 and interfacing with order management module 214, support UI 216, cloud UI 212 and store UI 210 to handle all the back-office interactions.

In one embodiment, the responsibilities of TAS DCs 402, 404 and 406 include, without limitation, performing runtime operations for orchestrating the provisioning the resources for one or more services subscribed by the customer. TAS DCs 402, 404 and 406 also include capabilities to perform operations such as locking, unlocking, enabling, or disabling a subscription order, collecting metrics related to the order, determining the status of the order, and sending notification events related to the order.

In an exemplary operation of the distributed TAS system shown in FIG. 4, TAS central component 400 initially receives an order from a customer via cloud UI 212, store UI 210, via order management system 214, or via order database 224. In one embodiment, the customer represents a buyer who has financial information and the authority to order and/or change a subscription. In one embodiment, the order information includes information identifying the customer, the type of services that the customer wishes to subscribe to, and an account administrator who will be responsible for handling the request. In certain embodiments, the account administrator may be nominated by the customer when the customer places an order for a subscription to one or more services offered by cloud infrastructure system 100. Based on the order information, the TAS central component 400 identifies the data region of the world such as Americas, EMEA, or Asia Pacific in which the order originates and the particular TAS DCs (for e.g., 402, 404 or 406) that will be deployed for provisioning the order. In one embodiment, the particular TAS DC (for e.g., from among DCs 402, 404 or 406) that will be deployed for provisioning the order is determined based on the geographical data region in which the request originated.

TAS central component 400 then sends the order request to the particular TAS DC in which to provision services for the order request. In one embodiment, TAS DCs 402, 404 or 406 identify a service administrator and an identity domain administrator responsible for processing the order request at the particular TAS DC. The service administrator and the identity administrator may be nominated by the account administrator identified in the subscription order. TAS DCs 402, 404 or 406 communicate with SDI module 204 to orchestrate the provisioning of physical resources for the order. SDI component 204 in respective TAS DCs 402, 404 or 406 allocates resources and configures those resources needed to fulfill the subscription order.

In certain embodiments, TAS DCs, 402, 404 or 406 identify an identity domain associated with the subscription. SDI component 206 may provide the identity domain information to IDM component 200 (shown in FIG. 2) for identifying an existing identity domain or creating a new identity domain. Once the order is provisioned by the SDI module at respective TAS DCs, 402, 404 or 406, TAS central component 400 may place information regarding the provisioned resources in a support system, via support UI 216. Information may include, for example, displaying resource metrics related to the services and usage statistics of the services.

Once in operation, at each data center, EM module 208 to periodically collects usage statistics for each of the provisioned services provisioned at that data center, such as the amount of storage used, the amount data transferred, the number of users, and the amount of system up time and system down time. These statistics are provided to the TAS DC that is local to EM module 208 (i.e., at the same data center). In an embodiment, the TAS DCs may use the usage statistics to determine whether overuse of a service has occurred, and if so, to determine how much to bill for the overage, and provide the billing information to order management system 214.

Figure 5:
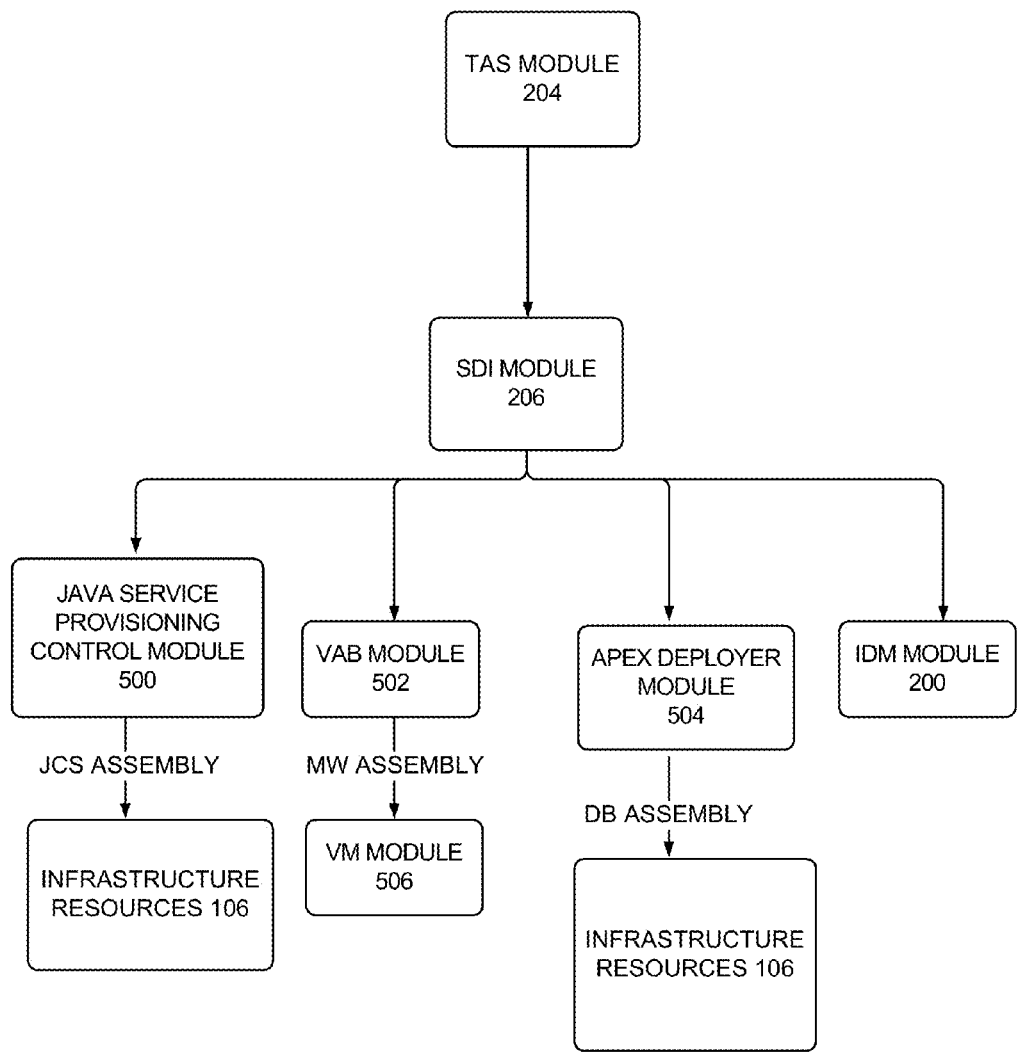
FIG. 5 is a simplified block diagram illustrating the interactions of the SDI module with one or more modules in the cloud infrastructure system, in accordance with an embodiment of the present invention.

FIG. 5 is a simplified block diagram illustrating the interactions of the SDI module with one or more modules in the cloud infrastructure system, in accordance with an embodiment of the present invention. In one embodiment, SDI module 206 interacts with TAS module 204 to provision resources for services in a subscription order received by TAS module 204. In certain embodiments, one or more of the modules illustrated in FIG. 5 may be modules within cloud infrastructure system 100. In other embodiments, one or more of the modules that interact with SDI module 206 may be outside cloud infrastructure system 100. In addition, alternative embodiments may have more or less modules than those shown in FIG. 5. These modules may be implemented in hardware, or software, or combinations thereof.

In one embodiment, the modules in SDI module 206 may include one or more modules in SaaS platform 102 and PaaS platform 104 in cloud infrastructure system 100. In order to perform provisioning of resources for various services, SDI module 206 may interact with various other modules, each customized to help with provisioning resources for a particular type of service. For example, as illustrated in FIG. 5, SDI module 206 may interact with a Java service provisioning control module 500 to provision Java cloud services. In one embodiment, Java service provisioning control component 500 may deploy a Java Cloud Service (JCS) assembly specified by SDI module 206 that includes a set of tasks to be performed to provision Java cloud services. Infrastructure resources 106 then determines the resources needed to provision the Java cloud services.

As other examples, SDI module 206 may interact with one or more modules such as a Virtual Assembly Builder (VAB) module 502, an Application Express (APEX) deployer module 504, a Virtual Machine (VM) module 506, an IDM module 200, and a database machine module 118. VAB module 502 includes capabilities to configure and provision complete multi-tier application environments. In one embodiment, VAB module 502 deploys a Middleware (MW) service assembly specified by SDI module 206 to provision a MW service in cloud infrastructure system 100 using the services provided by VM module 506. APEX deployer module 504 includes capabilities to configure and provision database services. In one embodiment, APEX deployer module 504 deploys a database service assembly specified by SDI module 206 to provision a database service in cloud infrastructure system 100 using the resources provided by infrastructure resources 106. SDI module 206 interacts with IDM module 200 to provide identity services such as access management across multiple applications in cloud infrastructure system 100.

Figure 6:
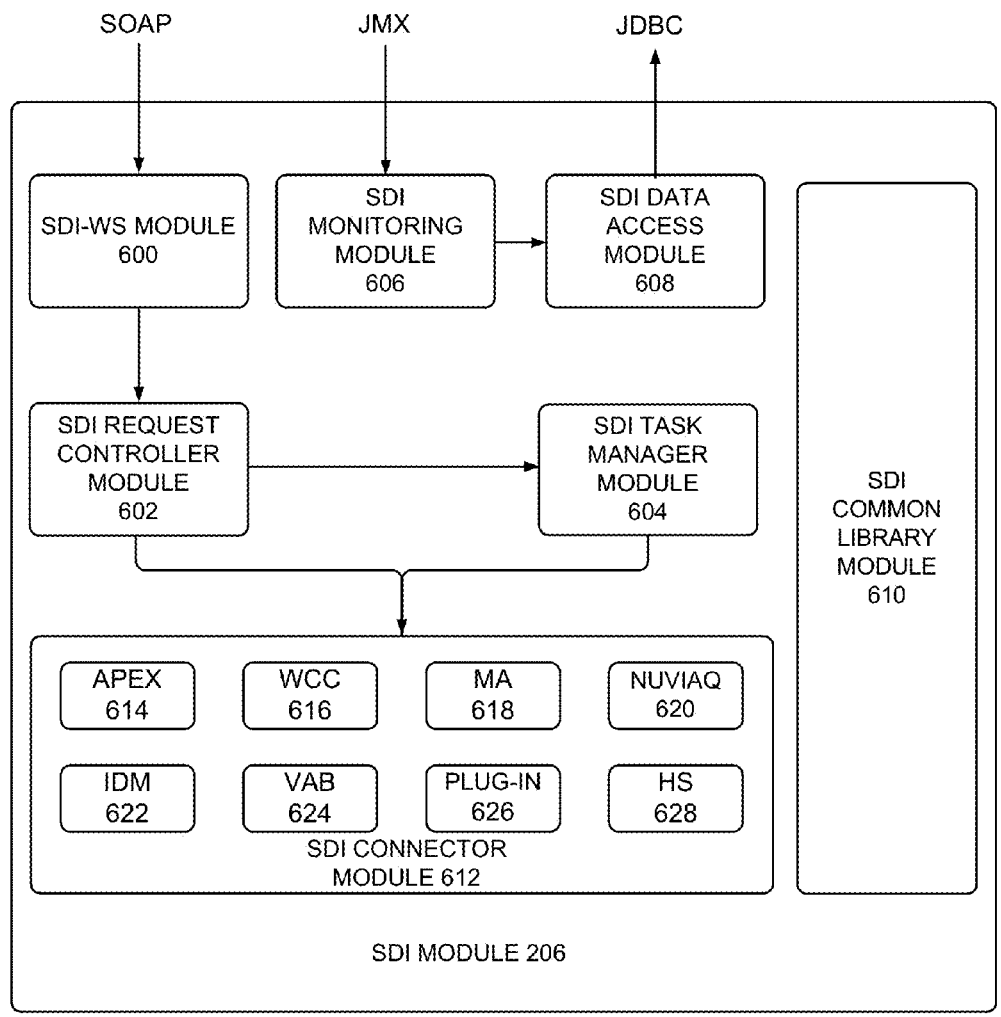
FIG. 6 depicts a simplified high level diagram of sub-modules of the SDI module according to an embodiment of the present invention.

FIG. 6 depicts a simplified high level diagram of sub-modules of the SDI module according to an embodiment of the present invention. In the embodiment depicted in FIG. 6, SDI module 206 includes a SDI-Web Services (WS) module 600, an SDI request controller module 602, an SDI task manager module 604, an SDI monitoring module 606, an SDI data access module 608, an SDI common library module 610, and an SDI connector module 612. These modules may be implemented in hardware, or software, or combinations thereof. SDI module 206 depicted in FIG. 6 and its various modules are meant for illustrative purposes only and are not intended to limit the scope of embodiments of the present invention. Alternative embodiments may have more or less modules than those shown in FIG. 6. These modules and their functions are described in detail below.

SDI-WS module 600 includes capabilities for receiving a step in the business associated with an order from business process executor 316 of TAS component 204. In one embodiment, SDI-WS module 600 parses each step of the business process and converts the step into an internal representation used by SDI module 206. In one embodiment, each step of the business process associated with the order arrives through a web service processing layer (for example, via System Provisioning API discussed in FIG. 3B) in the form of a SOAP request to SDI-WS module 600.

SDI request controller module 602 is the internal request processing engine in SDI module 206 and includes capabilities for performing asynchronous request processing, concurrent request processing, concurrent task processing, fault tolerant and recovery and plug-in support related to the order requests. In one embodiment, SDI request controller module 602 accepts each step of the business process associated with the order from SDI-WS module 600 and submits the step to SDI task manager module 604.

SDI task manager module 604 translates each step specified in the business process into a series of tasks for provisioning the particular step. Once the set of tasks for a specific step have been provisioned, SDI task manager module 604 responds to business process executor 316 in TAS module 204 with operation results that includes an order payload with details of the resources provisioned to fulfill the particular step. SDI task manager module 604 repeats this process until all the steps of the particular business process associated with the order are complete.

In certain embodiments, SDI task manager module 604 translates each step specified in the business process into a series of tasks by utilizing the services of SDI connector module 612. SDI connector module 612 includes one or more connectors for handling the deployment of tasks specified by SDI task manager module 604 to provision one or more services related to the order request. In certain embodiments, one or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, Application Express (APEX) connector 614 interfaces with APEX deployer module 504 to provision database services. Web Center Connector 616 (WCC) interfaces with a web center module in cloud infrastructure system 100 to provision web services. The web center module is a user engagement platform and includes capabilities for delivering connectivity between people and information in cloud infrastructure system 100.

In certain embodiments, Middleware Applications (MA) connector 618 interfaces with VAB module 502 in cloud infrastructure system 100 to provision middleware application services. NUVIAQ connector 620 interfaces with VAB module 502 to provision Java services. IDM connector 622 interfaces with IDM module 200 to provide identity and access management for users subscribing to services and resources in cloud infrastructure system 100. Virtual Assembly Builder (VAB) connector 624 interfaces with VAB module 502 in cloud infrastructure system 100 to configure and provision complete multi-tier application environments. Plug-in connector 626 interfaces with EM module 208 to manage and monitor the components in cloud infrastructure system 100. HTTP server connector 628 interfaces with one or more web servers in the PaaS platform to provide connection services to users in cloud infrastructure system 100.

SDI monitoring module 606 in SDI module 206 provides an inbound interface for receiving Java Management Extensions (JMX) requests. SDI monitoring module 606 also provides tools for managing and monitoring applications, system objects and devices in cloud infrastructure system 100. SDI-data access module 608 provides an inbound interface for receiving Java Database Connectivity (JDBC) requests. SDI-data access module 608 supports data access and provides object relational mapping, java transaction API services, data access objects, and connection pooling in cloud infrastructure system 100. The SDI-common library module 610 provides configuration support for the modules in SDI module 206.

Figure 7A:
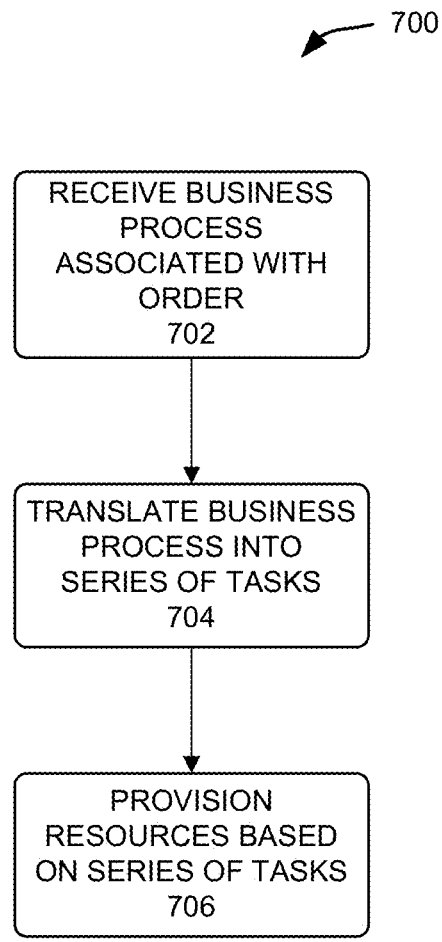
FIG. 7A depicts a simplified flowchart depicting processing that may be performed by the SDI component in the cloud infrastructure system, in accordance with an embodiment of the present invention.

The embodiment of FIG. 6 discussed above describes modules in the SDI module according to an embodiment of the present invention. FIG. 7A depicts a simplified flowchart 700 depicting processing that may be performed by the modules of the SDI module in the cloud infrastructure system, in accordance with an embodiment of the present invention. The processing depicted in FIG. 7A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 7A is not intended to be limiting. Other sequences of steps may also be performed according to alternative embodiments. For example, alternative embodiments of the present invention may perform the steps outlined above in a different order. Moreover, the individual steps illustrated in FIG. 7A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 7A may be performed by one or more modules in the SDI module 206 discussed in detail in FIG. 6.

At 702, a business process associated with a subscription order is received. In one embodiment, SDI-WS module 600 in SDI module 206 receives one or more steps in the business process associated with the subscription order from business process executor 316. At 704, each step in the business process is translated into a series of tasks for provisioning resources for the subscription order. In one embodiment, SDI task manager module 604 in SDI module 206 translates each step specified in the business process into a series of tasks by utilizing the services of SDI connector module 612. At 706, the subscription order is provisioned based on the series of tasks. In one embodiment, and as discussed in FIG. 6, SDI connector module 612 includes one or more connectors for handling the deployment of tasks specified by SDI task manager module 604 to provision resources for the services in the subscription order.

As described above with respect to FIG. 6, SDI task manager module 604 translates each step specified in a business process into a series of tasks by utilizing the services of SDI connector module 612, which may include one or more connectors for handling the deployment of tasks specified by SDI task manager module 604 to provision one or more services related to the order request. One or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, a NUVIAQ connector 620 interfaces with VAB module 502 to provision Java services.

Figure 7B:
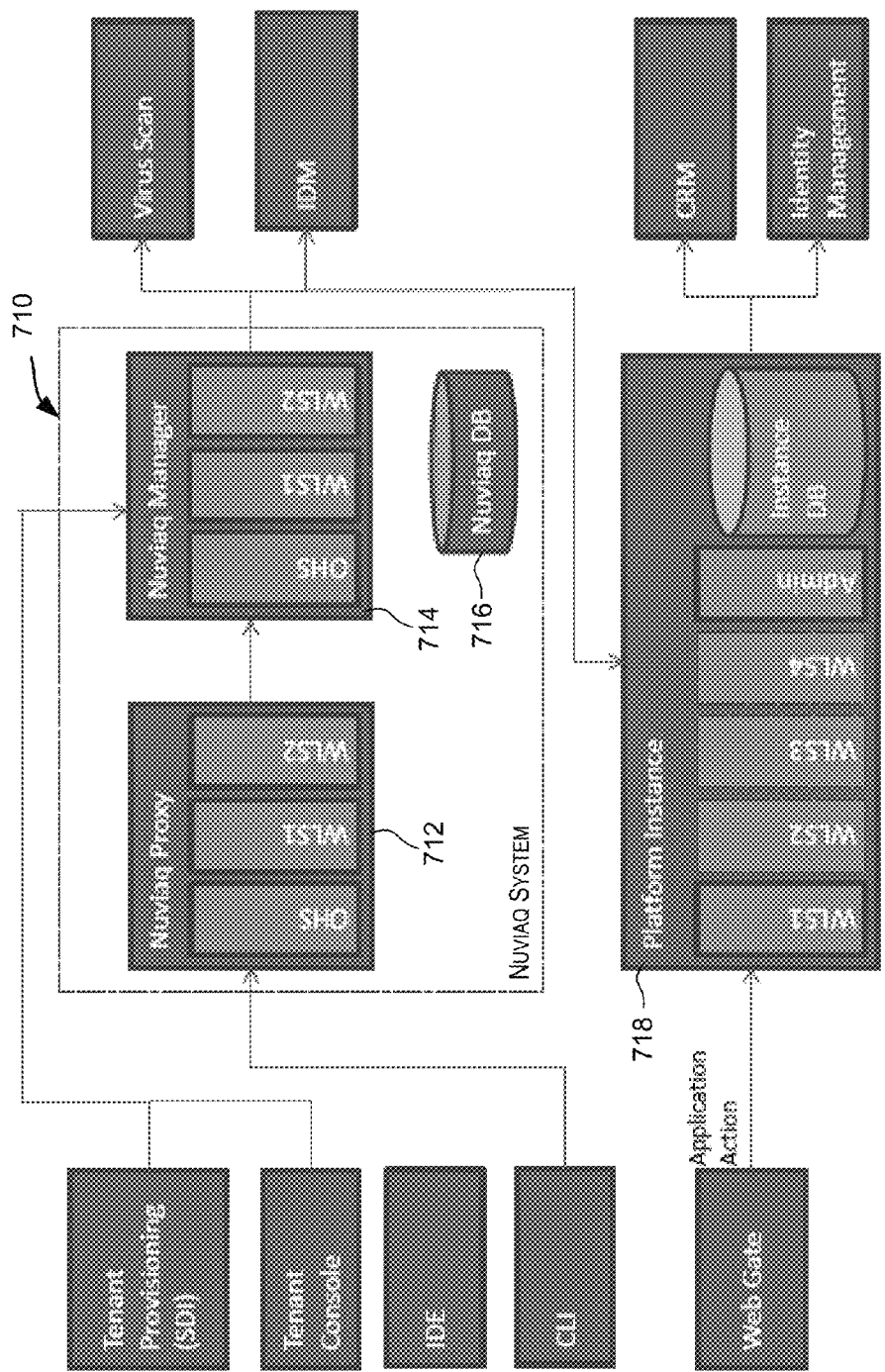
FIG. 7B depicts a simplified block diagram showing the high-level architecture of a Nuviaq system 710 and its relationships with other cloud infrastructure components according to an embodiment of the present invention.

FIG. 7B depicts a simplified block diagram showing the high-level architecture of a Nuviaq system 710 and its relationships with other cloud infrastructure components according to an embodiment of the present invention. It should be appreciated that Nuviaq system 710 depicted in FIG. 7B may have other components than those depicted in FIG. 7B. Further, the embodiment shown in FIG. 7B is only one example of a cloud infrastructure system that may incorporate an embodiment of the invention. In some other embodiments, Nuviaq system 710 may have more or fewer components than shown in FIG. 7B, may combine two or more components, or may have a different configuration or arrangement of components.

In certain embodiments, Nuviaq system 710 may be configured to provide a runtime engine for orchestrating PaaS operations. Nuviaq system 710 may provide a web service API to facilitate integration with other products and services. Nuviaq system 710 also provides support for complex workflows in system provisioning, application deployment and associated lifecycle operations and integrates with management and monitoring solutions.

In the embodiment depicted in FIG. 7B, Nuviaq system 710 comprises a Nuviaq proxy 712, a Nuviaq manager 714, and a Nuviaq database 716. In certain embodiments, Nuviaq manager 714 provides an entry point into Nuviaq system 710, providing secure access to PaaS operations via the web service API. Internally, it tracks system state in the database and controls job execution on the workflow engine. In a public cloud, Nuviaq manager 714 may be accessed by the Tenant Provisioning system (SDI 206) and the Tenant Console, to drive provisioning and deployment operations respectively.

In one embodiment, Nuviaq manager 714 executes jobs asynchronously via an internal workflow engine. A job may be a sequence of actions specific to a given PaaS workflow. Actions may be performed in order, with failure in any step resulting in failure of the overall job. Many workflow actions delegate to external systems relevant to the workflow, such as the EM command line interface (cli). In one implementation, Nuviaq manager 714 application may be hosted in a 2-node WebLogic cluster with associated HTTP server (e.g., Oracle HTTP Server or OHS) instance, running inside a firewall.

In certain embodiments, Nuviaq proxy 712 is the public access point to the Nuviaq API. In one embodiment, only Public API may be exposed here. Requests received by proxy 712 may be forwarded to Nuviaq manager 714. In one embodiment, Nuviaq proxy 712 runs outside the firewall, whereas manager 714 runs within the firewall. In one implementation, Nuviaq proxy 712 application runs on a WebLogic cluster running outside the firewall.

In certain embodiments, Nuviaq database 716 tracks various domain entities such as, without limitation, platform instance, deployment plan, application, WebLogic domain, jobs, alerts, and the like. Primary keys may be aligned with the Service Database where appropriate.

In one embodiment, Platform Instance 718 may contain all resources required for a WebLogic service for a given tenant.

Nuviaq system 710 may rely on additional systems of cloud infrastructure system 100 to carry out the workflows used the WebLogic cloud service. These dependencies may include dependencies on SDI 206, IDM 200, a virus scan system, a service database, CRM instances, and the like. For example, Nuviaq system 710 may depend upon functions performed by an Assembly Deployer in SDI 206. In one embodiment, the Assembly Deployer is a system to manage interactions with OVAB (Oracle Virtual Assembly Builder) and OVM (Oracle Virtual Machine). Capabilities of the Assembly Deployer used by Nuviaq system 710 may include, without limitation, functions for deploying an assembly, un-deploying an assembly, describing assembly deployment, scaling appliance, and the like. In one implementation, Nuviaq system 710 accesses the Assembly Deployer via a web service API.

In certain embodiments, security policies may require certain artifacts to be scanned for viruses before being deployed to an application. Cloud infrastructure system 100 may provide a virus scan system for this purpose that provides scanning as a service for multiple components of the public cloud.

In certain embodiments, a public cloud infrastructure may maintain a Service Database containing information about tenants (e.g., customers) and their service subscriptions. Nuviaq workflows may access to this data in order to properly configure a WebLogic service as a client to other services that the tenant also subscribes to.

Nuviaq system 710 may depend on IDM 200 for its security integration. In certain embodiments, Java Service instances can be associated with a CRM instance. The association allows user applications deployed to their Java Service instance to access a CRM instance though Web Service calls.

Various entities may use services provided by Nuviaq system 710. These clients of Nuviaq system 710 may include: a Tenant Console, which is an management server (e.g., Oracle Management Server) based user interface that customers may access to manage their applications on their platform instances; several IDEs such as Oracle IDEs (JDeveloper, NetBeans, and OEPE) have been extended to offer access to application lifecycle management operations; one or more Command Line Interfaces (CLIs) that are available to access lifecycle operations on the platform instances.

Provisioning use case for Nuviaq system 710—A Provision Platform Instance use case is realized via the Create Platform Instance operation of the Nuviaq API. In the context of cloud infrastructure system 100, a service instance with respect to the Nuviaq system corresponds to a Nuviaq platform instance. A platform instance is assigned a unique identifier is used on all subsequent operations related to this instance. A Platform Deployment descriptor provided to the Create Platform Instance action allows for properties to be set that modify the configuration of the platform instance to meet the subscription requirements of the tenant. These properties may include for example:

Property#1: oracle.cloud.service.weblogic.size
   Values: BASIC, STANDARD, ENTERPRISE
   Description: Specifies the subscription type. This impacts the number of servers, database limits and quality of service settings.
Property#2: oracle.cloud.service.weblogic.trial
   Values: TRUE, FALSE
   Description: Indicates whether or not this is a trial subscription.
Property#3: oracle.cloud.service.weblogic.crm
   Values: CRM Service ID
   Description: Identifies a CRM service to be associated with this WebLogic service instance.

Figure 7C:
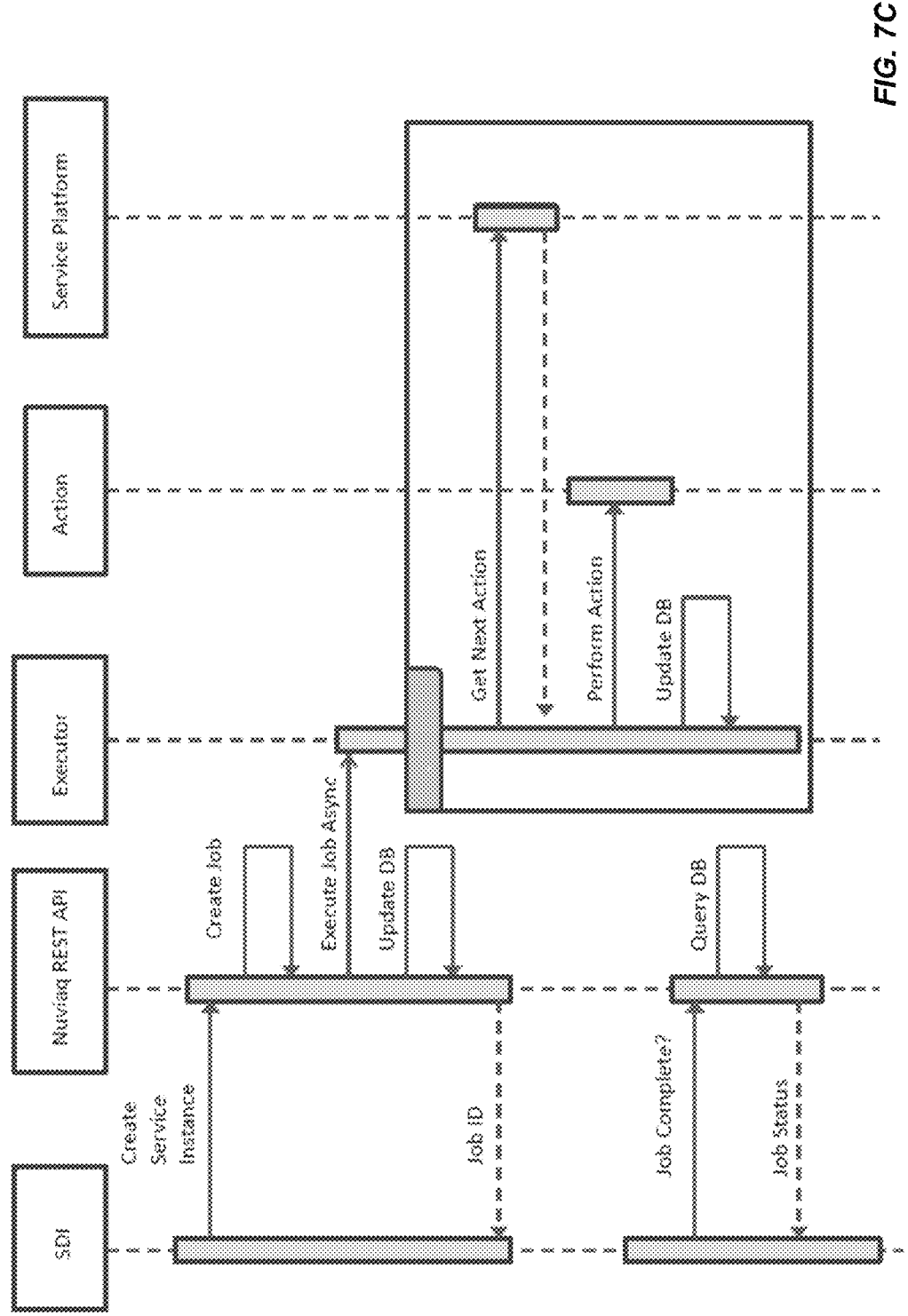
FIG. 7C depicts an example sequence diagram illustrating steps of a provisioning process using a Nuviaq system according to an embodiment of the present invention.

FIG. 7C depicts an example sequence diagram illustrating steps of a provisioning process using a Nuviaq system according to an embodiment of the present invention. The sequence diagram depicted in FIG. 7C is only an example and is not intended to be limiting.

Install/Update Application use case—The Install Application operation deploys an application to a running WebLogic Server after validating that the application archive meets the security requirements of the Public Cloud. In one embodiment, the Application Deployment descriptor provided to the Install Application action allows for properties to be set that modify the configuration of the application to meet the subscription requirements of the tenant. These properties may include for example:
Property: oracle.cloud.service.weblogic.state
Values: RUNNING, STOPPED Description: Specifies the initial state of the application after deployment.

Figure 7D:
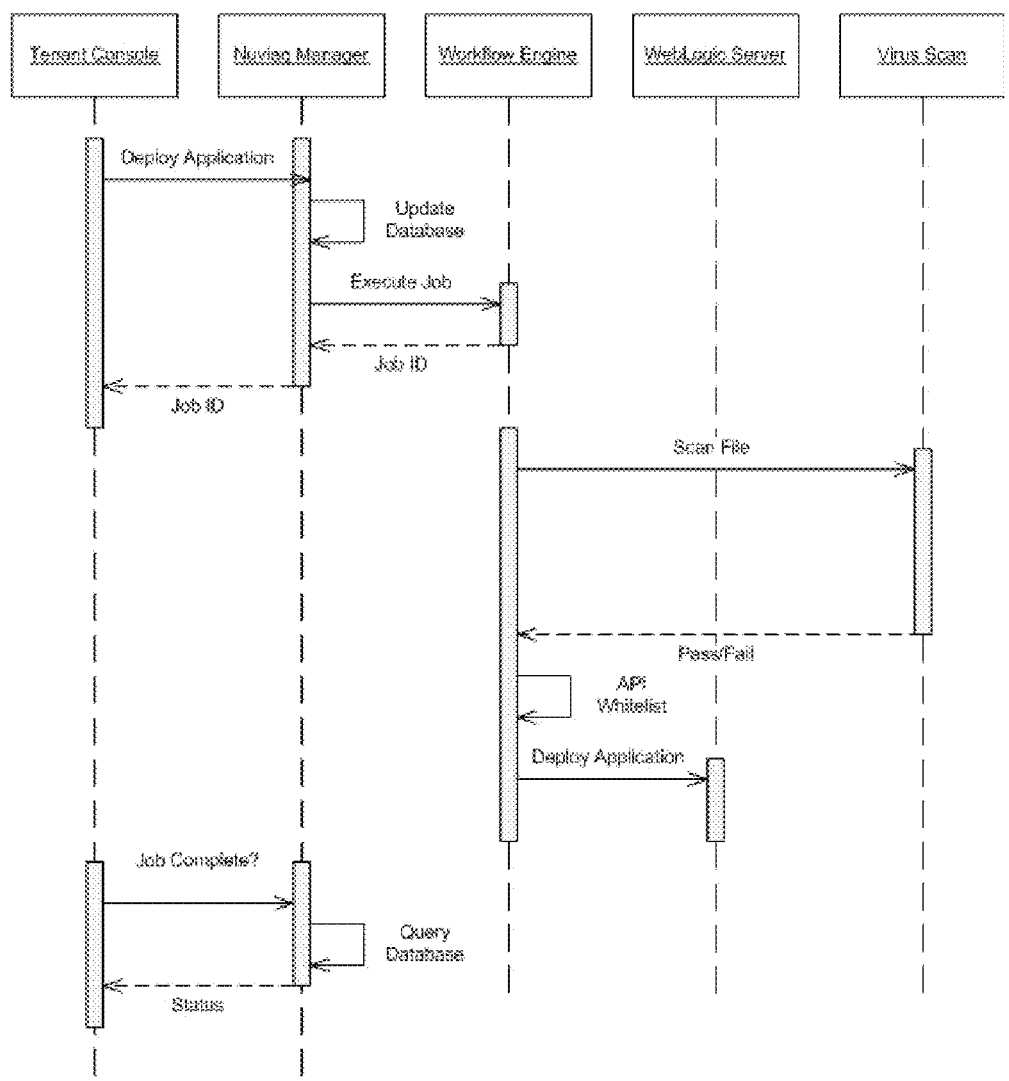
FIG. 7D depicts an example sequence diagram illustrating steps of a deployment process using a Nuviaq system according to an embodiment of the present invention.

FIG. 7D depicts an example sequence diagram illustrating steps of a deployment process using a Nuviaq system according to an embodiment of the present invention. The sequence diagram depicted in FIG. 7D is only an example and is not intended to be limiting.

Referring back to FIG. 2, in certain embodiments, TAS 204 and SDI 206 working in cooperation are responsible for provisioning resources for one or more services ordered by a customer from a set of services offered by cloud infrastructure system 100. For example, in one embodiment, for provisioning a database service, the automated provisioning flow may be as follows for a paid subscription:

(1) Customer places an order for a paid subscription to a service via Store UI 210.
(2) TAS 204 receives the subscription order.
(3) When services are available TAS 204 initiates provisioning by using the services of SDI 206. TAS 204 may perform business process orchestration, which will execute the relevant business process to complete the provisioning aspect of the order. In one embodiment, TAS 204 may use a BPEL (Business Process Execution Language) Process Manager to orchestrate the steps involved in the provisioning and handle the lifecycle operations.
(4) In one embodiment, to provision a database service, SDI 206 may call PLSQL APIs in the CLOUD_UI to associate a schema for the requesting customer.
(5) After successful association of a schema to the customer, SDI signals TAS and TAS send a notification to the customer that the database service is now available for use by the customer.
(6) The customer may log into cloud infrastructure system 100 (e.g., using an URAL such as cloud.oracle.com) and activate the service.

In some embodiments, a customer may also be allowed to subscribe to a service on a trial basis. For example, such a trial order may be received via cloud UI 212 (e.g., using cloud.oracle.com).

Figure 7E:
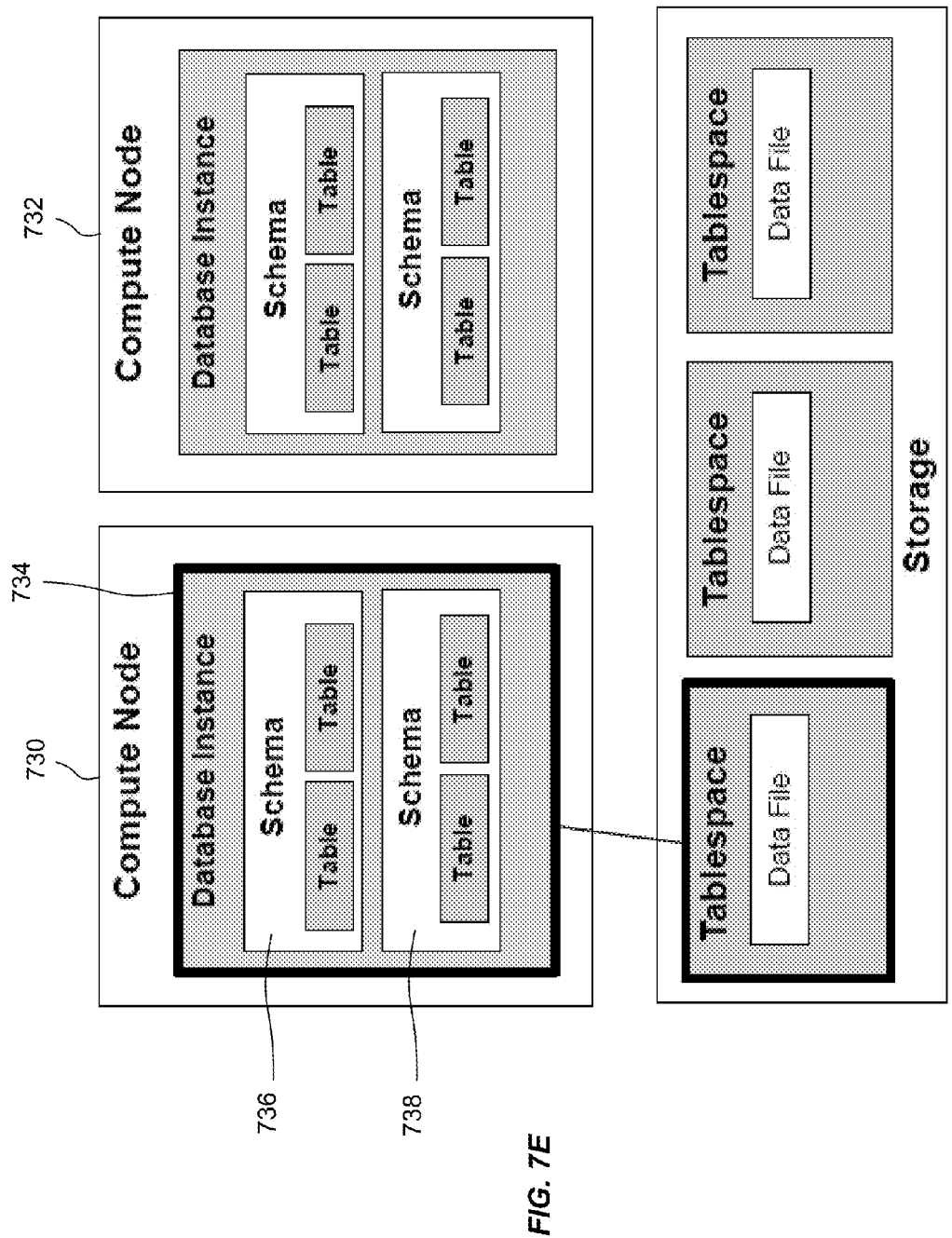
FIG. 7E depicts an example of database instances provisioned for a database service according to an embodiment of the present invention.

In certain embodiments, cloud infrastructure system 100 enables underlying hardware and service instances to be shared between customers or tenants. For example, the database service may be provisioned as shown in FIG. 7E in one embodiment. FIG. 7E depicts multiple Exadata compute nodes 730 and 732, each providing a database instance provisioned for the database service. For example, compute node 730 provides a database instance 734 for a database service. Each Exadata compute node may have multiple database instances.

In certain embodiments, each database instance can comprise multiple schemas and the schemas may be associated with different customers or tenants. For example, in FIG. 7E, database instance 734 provides two schemas 736 and 738, each with its own tables. Schema 736 may be associated with a first customer or tenant subscribing to a database service and schema 738 may be associated with a second customer or tenant subscribing to the database service. Each tenant gets a completely isolated schema. Each schema acts like a container that can manage database objects including tables, views, stored procedures, triggers, etc. for the associated tenant. Each schema may have one dedicated tablespace, with each tablespace having one data file.

In this manner, a single database instance can provide database services to multiple tenants. This not only enables sharing of underlying hardware resources but also enables sharing of service instance between tenants.

In certain embodiments, such a multi-tenancy system is facilitated by IDM 200, which beneficially enables multiple separate customers, each having their own separate identity domains, to use hardware and software that is shared in the cloud. Consequently, there is no need for each customer to have its own dedicated hardware or software resources, and in some cases resources that are not being used by some customers at a particular moment can be used by other customers, thereby preventing those resources from being wasted. For example, as depicted in FIG. 7E, a database instance can service multiple customers each with their respective identity domains. Although each such database service instance can be a separate abstraction or view of a single physical multi-tenant database system that is shared among the many separate identity domains, each such database service instance can have a separate and potentially different schema than each other database service instance has. Thus, the multi-tenant database system can store mappings between customer-specified database schemas and the identity domains to which those database schemas pertain. The multi-tenant database system can cause the database service instance for a particular identity domain to use the schema that is mapped to that particular identity domain.

The multi-tenancy can also be extended to other services such as the Java Service. For example, multiple customers can have a JAVA service instance placed within their respective identity domains. Each such identity domain can have a JAVA virtual machine, which can be viewed as being a virtual "slice" of hardware. In one embodiment, a job-monitoring service (e.g., Hudson) can be combined with a JAVA enterprise edition platform (e.g., Oracle WebLogic) in the cloud to enable each separate identity domain to have its own separate virtual "slice" of the JAVA enterprise edition platform. Such a job-monitoring service can, for example, monitor the execution of repeated jobs, such as building a software project or jobs run by an operating system's time-based job scheduler. Such repeated jobs can include the continuous building and/or testing of software projects. Additionally or alternatively, such repeated jobs can include the monitoring of executions of operating system-run jobs that are executed on machines that are remote from the machine on which the job-monitoring service executes.

Figure 8:
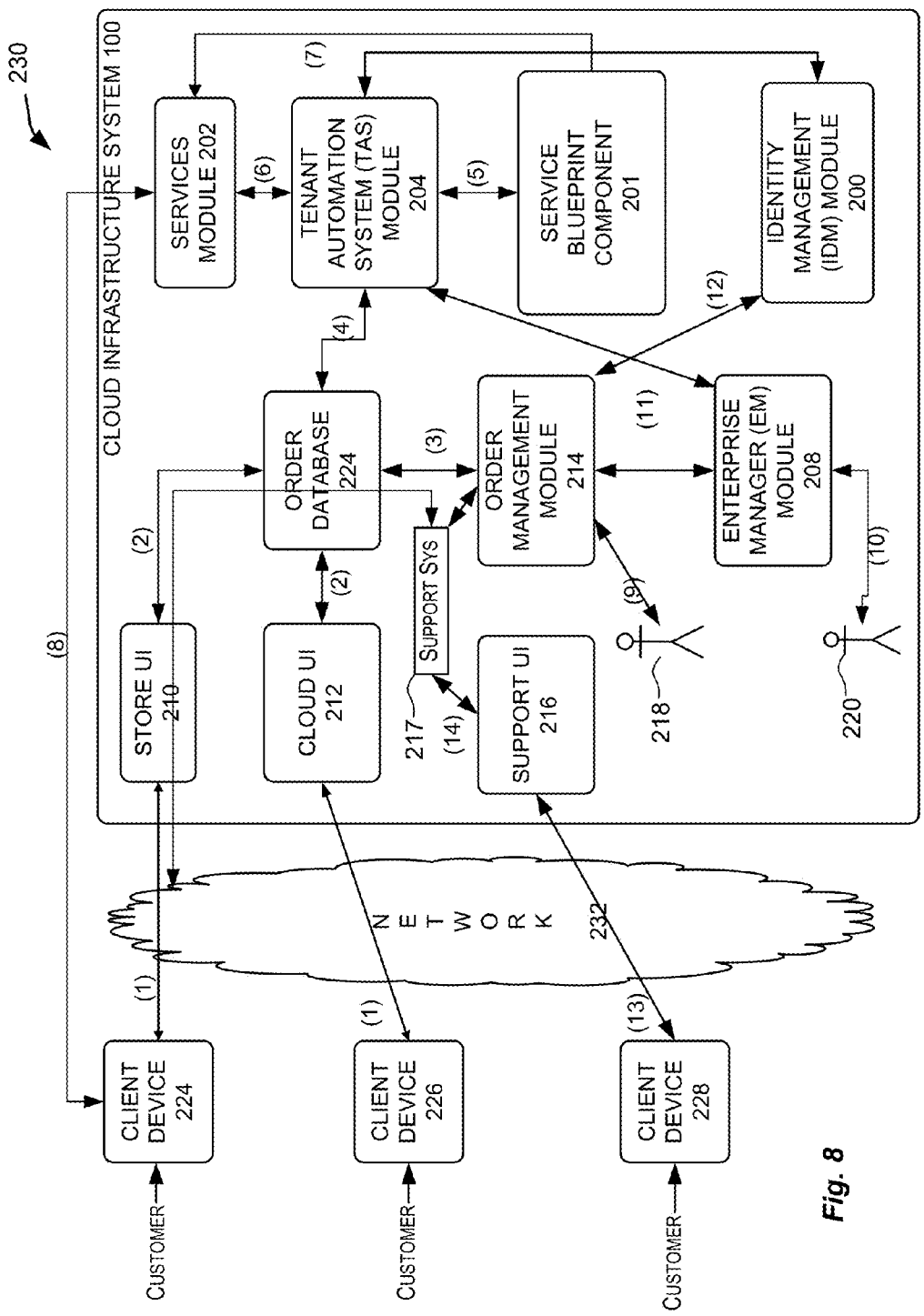
FIG. 8 depicts a simplified high level diagram of one or more sub-modules in the TAS module in the cloud infrastructure system, in accordance with an embodiment of the present invention.

FIG. 8 depicts a simplified high level diagram of one or more sub-modules in the TAS module in the cloud infrastructure system, in accordance with an embodiment of the present invention. FIG. 8 is similar to FIG. 2 with the addition of service blueprint component 201.

The service blueprint component may include one or more computers and/or severs which may be general purpose computers, specialized server computers, server farms, server clusters, or any other appropriate arrangement and/or combination. The various components of the cloud infrastructure system 100 depicted in FIG. 8 are meant for illustrative purposes only and are not intended to limit the scope of embodiments of the present invention. Alternative embodiments may include more or fewer components than those shown in FIG. 8.

According to this embodiment, at (5), TAS component 204 orchestrates the provisioning of resources to support the subscribed services using the services of service blueprint component 201. At (6) TAS module 204 provides information related to the provisioned order received from service blueprint component 201 to services module 202. In some embodiments, at (7), service blueprint component 201 may also use services provided by services module 202 to allocate and configure the resources needed to fulfill the customer's subscription order.

At (8), services module 202 sends a notification to the customers on client devices 224, 226 and 228 regarding the status of the order.

In certain embodiments, service blueprint component 201 functions as an orchestration component that manages business processes associated with each order and applies business logic to determine whether an order should proceed to provisioning. In one embodiment, upon receiving an order for a new subscription, service blueprint component 201 allocates resources and configures those resources needed to fulfill the subscription order. Service blueprint component 201 enables the allocation of resources for the services ordered by the customer. Service blueprint component 201 provides a level of abstraction between the cloud services provided by cloud infrastructure system 100 and the physical implementation layer that is used to provision the resources for providing the requested services.

Figure 9:
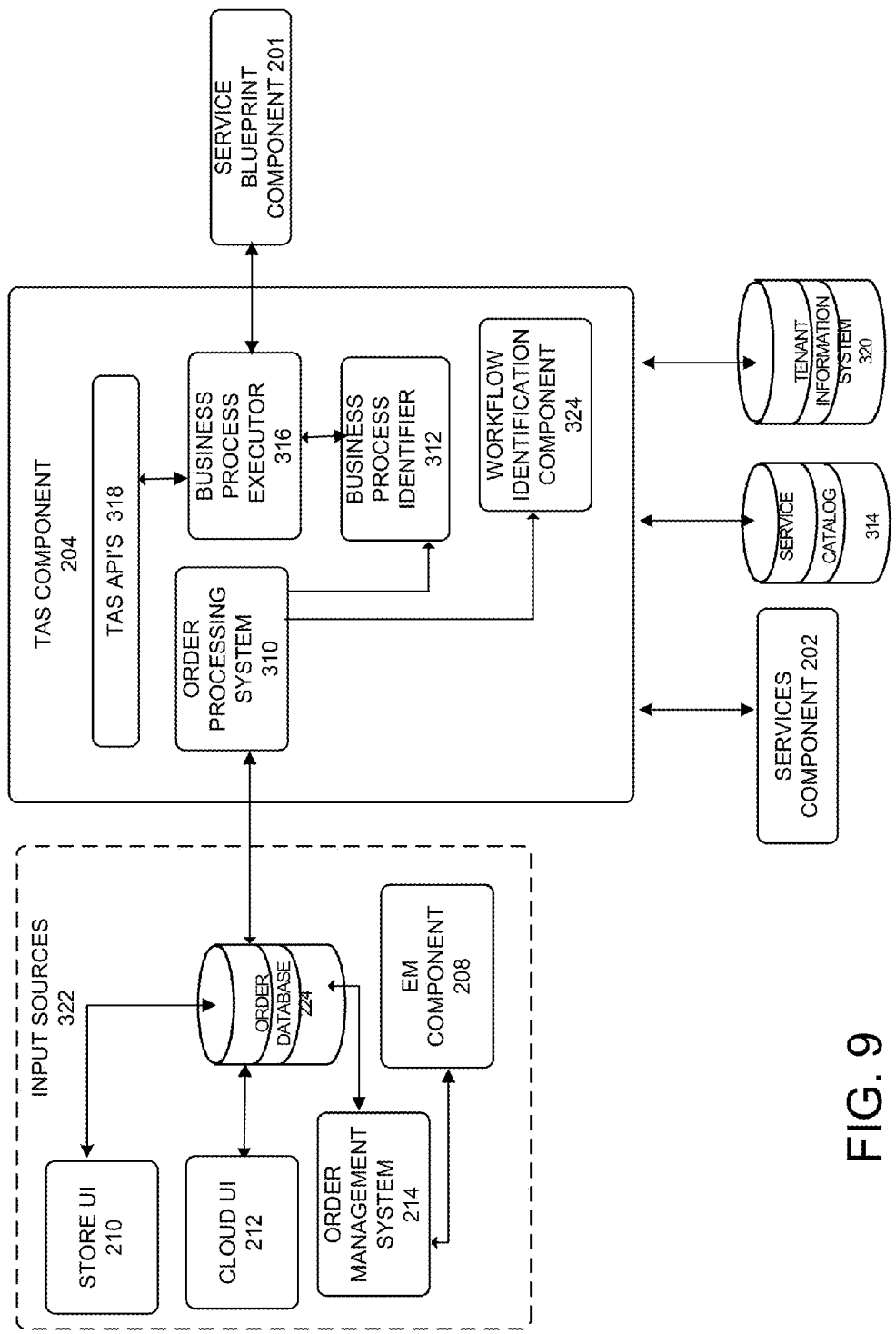
FIG. 9 depicts a simplified high level diagram of one or more sub-modules in the TAS module in the cloud infrastructure system, in accordance with an embodiment of the present invention.

In one embodiment, the processing depicted in FIG. 3A may be performed by one or more components in the TAS component 204 and service blueprint component 201 as will be described in detail in FIG. 9. Additional description related to performing steps 302, 304, 306 and 308 is provided in detail in FIG. 9. FIG. 9 is similar to FIG. 3B with the addition of service blueprint component 201.

In one embodiment, the components depicted in FIG. 9 perform the processing described in steps 302-308 discussed in FIG. 3A.

In some instances, after an order has been processed by the order processing system 310, the TAS component 204 and service blueprint component 201 apply business logic to determine whether the order should proceed to provisioning. In one embodiment, service blueprint component 201 allocates resources and configures those resources needed to fulfill the subscription order. Service blueprint component 201 enables the allocation of resources for the services ordered by the customer.

As described above, cloud infrastructure system 100 may offer one or more cloud services that can be ordered or subscribed to by a customer. Each service generally has associated parameters and procedures for provisioning the computing resources needed for providing the service. For example, the parameters may related to various business processing aspects of the service such as, without limitation, different service offerings, proprietary client information used by the service, ordering details for the services, procedures for computing overages (i.e., over use of the service), usage metrics to be used for the service, various custom attributes, service associations, customer notification templates, pricing information, billing information, and the like. The procedures for provisioning computing resources may include, without limitation, procedures for allocation of physical storages, physical components, EM Integration, creating an IDM footprint, URL routing, pod definitions, tenant placement plugins, per-tenant footprint creation plugins, monitoring configuration, identity management footprint configuration, network configuration, and the like.

When cloud infrastructure system 100 receives a subscription order from a customer ordering a service, cloud infrastructure system 100 performs processing to gather information related to the various parameters associated with the ordered service (e.g., parameters related to business processing aspects of the ordered service) and then use the provisioning procedures for the ordered service to order the service. Since one cloud service is different from another cloud service, the parameters (e.g., parameters related to business processing aspects) and the provisioning procedures for the different services are typically very different.

This diversity on a per service basis makes it quite difficult and complicated for cloud infrastructure system 100 to automate service provisioning. This also cause the process of adding a new cloud service, with its own new parameters and provisioning procedures, to services offered by cloud infrastructure system 100 to become difficult and complicated.

In certain embodiments, a service declaration template is provided by cloud infrastructure system 100 that can be "filled in" by a provider of a particular service and enables the service provider to declaratively specify the service-related parameters (e.g., business process aspects parameters), provisioning aspects or procedures, and other potential aspects for the particular service. The filled-in template for a particular service then represents the service declaration for the particular service (also sometime referred to as the service blueprint for the service). In certain embodiments, a service declaration for a service comprises business processing aspects information for the service and binaries that drive resources provisioning aspects for the service.

A service declaration for a service provides an interface between the service provider and cloud infrastructure system 100 that provisions the service. The service declaration template schema enables the service provider to specify service-related parameters and information related to procedures for provisioning the service. The service declaration for a service makes available to cloud infrastructure system 100 all the information that is needed by cloud infrastructure system 100 for provisioning the service in a response to a customer subscription order. Upon receiving a subscription order for a cloud service, cloud infrastructure system 100 is configured to access the service declaration for the ordered service and then use information from the service declaration to provision the service. Service declarations thus help to evolve the provisioning infrastructure to a fully declarative model.

In one embodiment, the service declaration template is an XSD document and a service declaration is an XML document. In another embodiment, the service declaration template is an XML document. The service declaration template provides a particular schema to allow a provider of a cloud service to declaratively specify the execution flow for various provisioning lifecycle operations such as creation of a new subscription for a tenant, termination of an existing subscription, modification of a subscription, etc. for the service.

The service declaration template may be used for "internal" cloud services provided by cloud infrastructure system 100 itself or for "external" cloud services provided by third-party service providers (e.g., via the application store) via cloud infrastructure system 100. For example, if a service provider wants to add a new cloud service to the services offered by cloud infrastructure system 100, the service provider create a service declaration for the new service by filling in the service declaration template. The service declaration is then provided to cloud infrastructure system 100, which then uses the service declaration to offer the service to customers and to perform provision-related processing when the new service is an ordered via a subscription order.

Service declarations provide an easy and flexible way for new services to be added to the service offerings of cloud infrastructure system 100. New services can be added to cloud infrastructure system 100 in a dynamic manner and reflected in service offerings of cloud infrastructure system 100.

Moreover, service declarations allow cloud infrastructure system 100 components (e.g., TAS, SDI, EM, IDM, URL Routing) to be able to support new services being added to cloud infrastructure system 100 without any code changes required to the components. In some instances, all the infrastructure components can be based upon the declarative model and not have any service-specific custom code.

For example, XML-based provisioning procedures specified in a service declaration for a service may include TAS business processing and multi-tenant pod provisioning. TAS business processing can include service offerings, custom attributes, metrics, overages, associations, and notification templates. Examples of multi-tenant pod provisioning can include a physical footprint definition, persistent schema to track relevant pod information (e.g., pods per service type, instances in a pod, pod physical layout) and per-tenant service provisioning. Moreover, per-tenant service provisioning can include tasks to execute during provisioning (e.g., IDM footprint, EM Target creation, URL routing, Service-specific plugin call), optional per-tenant physical footprint, and persistent schema to track service instance footprint, and id domain information.

In certain embodiments, processing related service declarations is performed by service blueprint component 201. Service blueprint component 201 may be configured to allow service providers to access a service declaration template and to submit service declarations. In one embodiment, service blueprint component 201 plays the role of SDI component 206 and can replace SDI component 206. In some other embodiments, service blueprint component XX may perform provisioning alongside SDI component 206.

In certain embodiments, services offered by cloud infrastructure system 100 are listed in a service catalog. Before a service can be offered to customers via the service catalog, the service has to be first registered with cloud infrastructure system 100. As part of registering a new service, a service declaration may be provided for the service that captures all aspects of how the service is to be provisioned. For example, an XML service declaration may be provided.

For example, a service provider may register a new database service. The service declaration for the new service may specify various parameters and provisioning procedures related to the database service. The parameters may identify the different service levels, metrics related to the service, and the like. For example, the parameters may indicate that certain customer-related information may be needed for provisioning the service such as a service name, a password, and the like. The business requirements-related parameters in the service declaration may thus identify information needed to obtain the database service. Service declaration may also comprise information identifying procedures to be used for provisioning the service. At the time of provisioning, cloud infrastructure system 100 may perform a backend orchestration (e.g., via BPEL based orchestrator) to provision the service. The service declaration may also specify that provisioning requirements for a database service include information for the number of virtual machines (VMs) requested, the scripts needed on the VMs, required interfaces between the database service and other services, and the like. In some instances, the provisioning can be done using APIs.

Once a service is registered with cloud infrastructure system 100, the service is added to the service catalog and offered to customers for ordering, for example, via the cloud UI. Once in the service catalog, the service becomes instantly orderable and deployable in the cloud.

For example, cloud infrastructure system 100 may offer a Web service, a Java service, a database service, and the like. Previously, a database service developer may have registered the database service to be available on the cloud. By providing parameters in the blueprint that are requested, the developer can define the database service in the blueprint and register the database. As a result, the database service can be available for ordering for customers from the cloud UI.

Service declarations thus provide an extensible model for adding cloud services and making them available through cloud infrastructure system 100. Any new service can be registered using a service declaration. Once that service becomes orderable, the service can be provisioned from by cloud infrastructure system 100 using the service declaration. Service declarations help to automate the provisioning of services by making each service extendable for new orders. For example, a customer may put in an order for a cloud service offered by cloud infrastructure system 100. The service declaration for the requested service provides into that is used for provisioning the service, including ensuring that the service-related business process aspects and the provisioning procedures are followed.

In certain embodiments, service blueprint component 201 may provide an interface that allows a service provider to fill a service declaration template. For example, the service provider may be provided an XML format template to be filled in. The schema of the template generalizes the service-related parameters so that the template can be used for multiple services.

In certain embodiments, a service declaration can capture all the various operations that are possible in provisioning a service. For example, the service declaration for a service may provide information indicating that an onboarding operation for the service involves creating an instance of the service and requires certain parameters (e.g., user requirements, if the service needs to scale out) to be specified. The service declaration may also identify procedures for scaling the service such as when a service is ordered for 50 users today but may go up to 5,000 users in the future. As part of service provisioning, TAS component 204 can use the information from the service declaration for the service to automatically perform onboarding and scale up functions.

Figure 10:
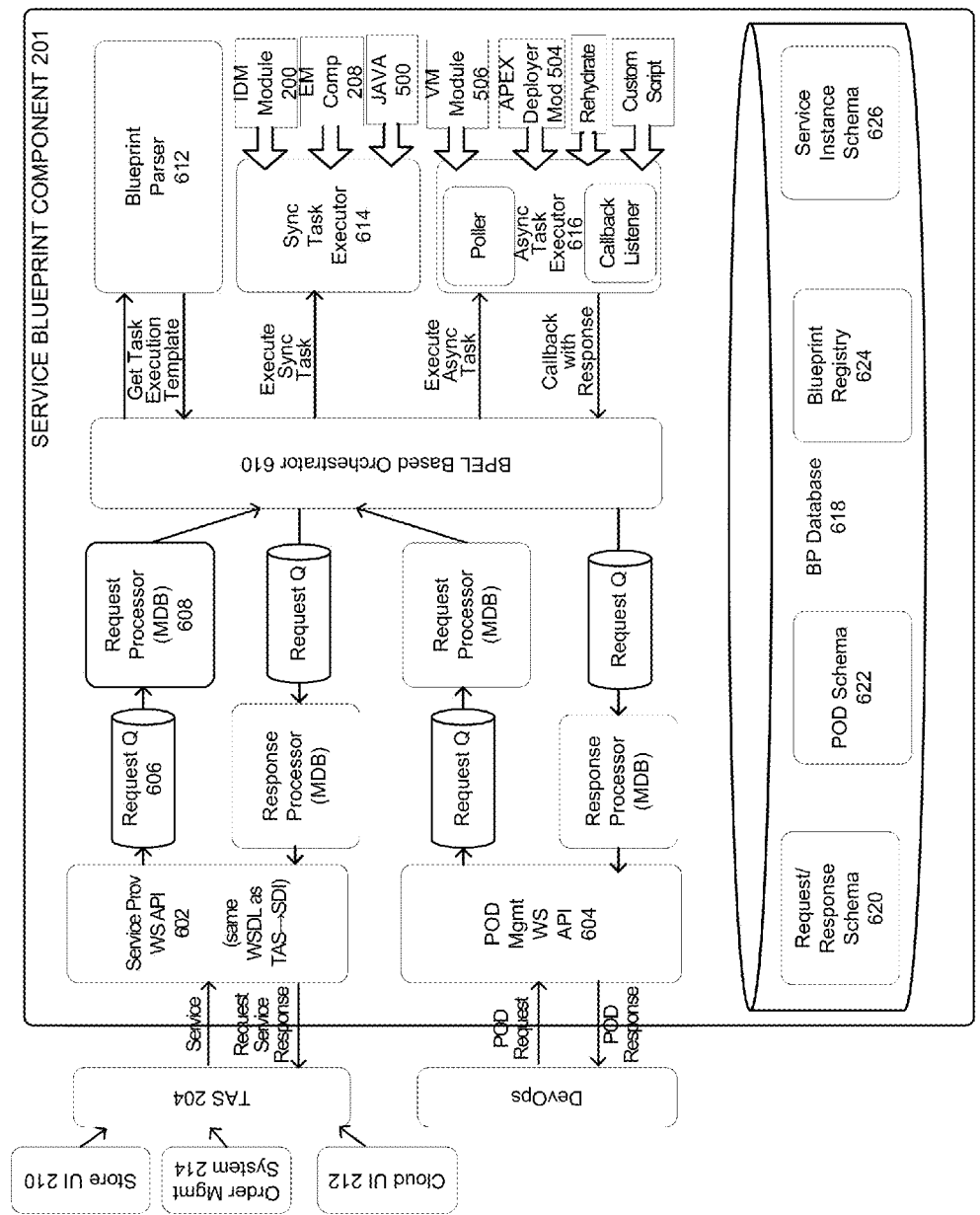
FIG. 10 illustrates a simplified high level diagram of a service blueprint component according to an embodiment of the present invention.

FIG. 10 illustrates a simplified high level diagram of a service blueprint component according to an embodiment of the present invention. As shown in FIG. 10, service blueprint component 201 includes various components, which may be implemented in hardware, or software, or combinations thereof. The service blueprint component 201 depicted in FIG. 10 and its various components are meant for illustrative purposes only and are not intended to limit the scope of embodiments of the present invention. Alternative embodiments may have more or fewer components than those shown in FIG. 6. These components and their functions are described in detail below.

As shown in FIG. 10, information related to service declaration templates and service declarations for one or more registered services may be stored in blueprint database 618. Database 618 may store a request/response schema 620, POD schema 622, blueprint registry 624, and service instance schema 626.

In the embodiment shown in FIG. 10, service blueprint component 201 interfaces with TAS component 204 and with DevOps (development and operations infrastructure). TAS 204 may use service provider APIs 602 to interact with service blueprint 201. DevOps may use POD management APIs 604 to interact with service blueprint component 201.

The service provisioning APIs 602 and pod management APIs 604 include capabilities for receiving information related a business process associated with an order from the business process executor 316 of the TAS component 204. In one embodiment, the service provisioning API 602 and pod management API 604 can parse each step of the business process and convert the step into an internal representation used by service blueprint component 201. This internal representation may be based upon the schema representation in a service declaration. In one embodiment, each step of the business process associated with the order arrives through a web service processing layer (for example, via the TAS API's 318 discussed in FIG. 9) in the form of a SOAP request to the service provisioning API 602 and pod management API 604.

In some instances, the service provisioning API 602 and pod management API 604 can be provides through a common API. However, in certain embodiments, there may be different pod instances for pod creation versus service installation creation. The service provisioning API 602 can initiate service instances based on customer requests. The pod management API 604 can initiate a pod creation.

The pod management API 604 can be used in the creation of multi-tenant services, where a single physical deployment supports a large number of tenants on the cloud. In some instances, the pods under the pod management API 604 are created beforehand and ready when a customer order comes in. For example, in the messaging service, a messaging pod capable of serving a thousand tenants can be created without a customer request. Therefore, when the customer request comes in, the messaging pod can be ready to be used.

In certain embodiments, requests received from TAS 204 or DevOps using service APIs 602 or POD management APIs 604 may be queued in one or more input queues provided by service blueprint 201. For example, a request received from TAS 204 (or alternatively, steps in the parsed business process) may be queued in queue 606. For example, a service request may be received from TAS 204 for provisioning a particular service ordered by a customer. TAS 204 can use the service blueprint component 201 to perform the provisioning of the service. A request to that effect may be received by service blueprint 201 from TAS 204 and queued in input request queue 606. A request processor 608 may be configured to pick up requests queued in queue and provide each request to orchestrator 610. Requests received via POD management APIs 604 may be queued in a corresponding input queue and a request processor corresponding to POD management 604 may be configured to pick up the request from the queue and provide it to orchestrator 610 to be fulfilled.

Request queue 606 and request processor 608 act as the internal request processing engines in the Service Blueprint component 201 and may include capabilities for performing asynchronous request processing, concurrent request processing, concurrent task processing, fault tolerance assessment and recovery and plug-in support related to the order requests. In one embodiment, the request queue 606 and request processor 608 can accept each step of the business process associated with the order from the service provisioning API 602 and/or the pod management API 604 and submit the step to the orchestrator 610.

A request processor can be a generic component that enables reliable asynchronous message processing by storing the incoming requests in a queue while managing the state lifecycle of these incoming requests. For example, a request processor maintains a queue of requests in a JMS queue and also maintains these requests in a request table.

By controlling the lifecycle of these requests, the request processor ensures reliable processing of these requests while supporting scale out deployments.

In certain embodiments, request pollers may be provided that can be polling threads that monitor the requests in the request Queue and process the requests. In some instances, every orchestration engine instance may have a pool of request pollers.

In certain embodiments, a request can come in either for the service provisioning API 602 or pod management API 604, and the request can go into different request queues 606 based on its origination. The request processor 608 can pick up the request for processing by sending it to the Orchestrator 610.

Orchestrator 610 is configured to execute requests received from the request processors. In certain embodiments, orchestrator 610 can be based upon BPEL (Business Process Execution Language). BPEL orchestrator 610 is configured to determine the service to which the request relates to and execute the request based upon the service declaration for the request service.

In one embodiment, orchestration engine 610 can include the following components: Orchestration Engine endpoints; Request Processor; Request Pollers; and BPEL-based request processing engine. The orchestration engine 610 can expose two endpoints: (a) Service Provisioning endpoint to allow the business orchestration layer to provision and manage services (e.g., for operations such as create, delete, associate, archive) and (b) the Management endpoint to manage the orchestration engine service itself (e.g., for operations such as cancelRequest, pauseRequest). The requests for service provisioning can be asynchronous requests and are queued by the request processor. In order to maintain compatibility with existing business orchestration layer (TAS), the orchestration engine can publish identical web services as existing SDI.

In certain embodiments, orchestrator 610 may be configured to access service declaration information stored in blueprint database 618 and determine, from the service declaration, a series of tasks to be performed for fulfilling the request received from TAS 204. For example, in one embodiment, a BPEL-based request processing engine can order the request and submit the request to BPEL orchestrator 610. BPEL orchestrator 610 process is configured to: fetching the service declaration Service Blueprint from the Service Blueprint endpoint; extract the Execution Template for the service id; and asynchronously calling the Task Executor Service Endpoint to execute the tasks defined in the template.

In another embodiment, orchestrator 610 may receive information stored in the service declaration for the service via blueprint parser 612. The BPEL based orchestrator 610 may send a message to parser 612 requesting task to be performed for fulfilling the request received from TAS 204 for the particular service.

In one embodiment, blueprint parser 612 is configured to access the service declaration for the service being provisioned from blueprint database 618 and determines, based upon the information in the service declaration, a series of tasks to be performed for fulfilling the provisioning request. In one embodiment, parser 618 may identify a business process specified in the service declaration and may translate each step specified in the process into a series of tasks for provisioning the particular step. Blueprint parser 612 may also can send the list of tasks to orchestrator 610 in the form of a task execution template, which may be XML (e.g., as an XML doc) based and have a schema. In one embodiment, the task execution template may be specified in the service declaration for the service being provisioned.

In certain embodiments, provisioning operations may be a sequence of task executions. The operations are driven OOTB by a seeded task execution template that defines a fixed set of actions. The template for a service may be defined in the service declaration for the service and may identify specific tasks and the order in which these tasks need to be executed. Depending on the lifecycle operation, a set of standard tasks can be executed for provisioning a service. Additionally, the service may need to provide plug-ins to perform certain tasks that are best handled by the service itself. The plug-ins are treated as a black box by the orchestration engine 610. As described in the Service Provisioning Plug-ins section, services can override the entire Task Execution template or provide custom tasks to be executed at controlled points in the execution flow. The Task Execution template may leverage the task and task executor model described below.

Figure 11:
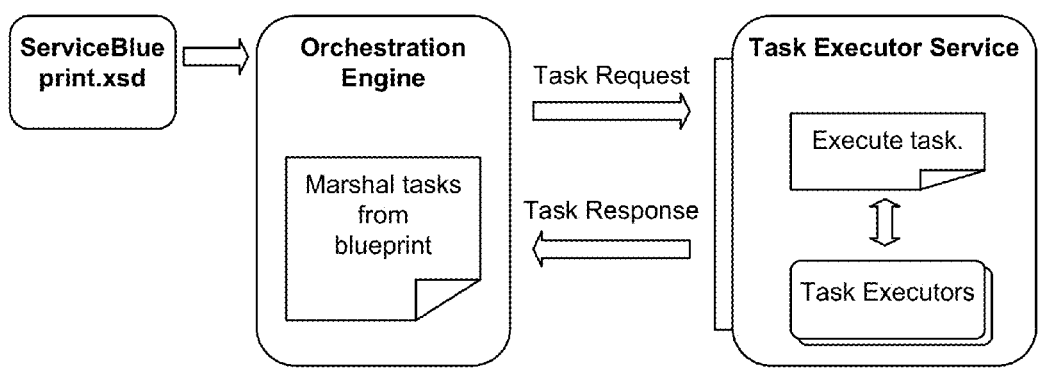
FIG. 11 illustrates an orchestration engine, according to an embodiment of the present invention.

In certain embodiments, the overall flow for a given provisioning lifecycle operation on a service can be carried out as a sequence of task executions. The sequence of actions can be captured in the task execution template for the service in the service declaration for the service. As shown in FIG. 11, the orchestration engine marshals a set of service agnostic tasks (e.g., "Create IDM Footprint" task) interleaved with any service specific tasks defined in the service declaration. According to one embodiment, a task can be executed sequentially by calling the Task Executor Service.

In certain embodiments, once the set of tasks for a specific step have been provisioned, the blueprint parser 612 responds to the business process executor 316 in the TAS component 204 with operation results that include an order payload with details of the resources provisioned to fulfill the particular step.

BPEL based orchestrator 610 is configured to execute tasks in the task execution received from parser 612. The task execution framework may provide facilities for performing the tasks in a synchronous or asynchronous manner. For example, as shown in FIG. 11, task execution framework may include a synchronous task executor 614 for synchronous execution of tasks and an asynchronous task executor 616 for asynchronous execution of tasks.

In certain embodiments, the task execution framework can be a common component that is used across the board by other modules to execute tasks. For instance, for each provisioning lifecycle operation for a given service, a task execution template can encapsulate the set of tasks that need to be executed. The template may be executed by the orchestration engine 610 using the task execution service. This template may be modeled as a sequence of tasks with associated task executors.

According to some embodiments, the synchronous task executor 614 and/or asynchronous task executor 616 can take the XML document identifying the tasks to be performed to create the service. By parsing the XML, the task executor can execute a sequence of actions to create a service. In some instances the sequences of action can be done sequentially. In other instances, the sequence of events can be done in or out of order.

For asynchronous tasks, the action itself may support polling. Therefore, the asynchronous task executor 616 can dispatch the action and keep polling until the action is done. Alternatively, the action can be capable of calling back. For example, the BPEL based orchestrator 610 can dispatch the action and then forward a callback point for the asynchronous task executor 616 to call back on.

The Task Execution framework can include a façade service, which accepts synchronous or asynchronous task execution requests, a set of task executors, and a library of resources to perform the tasks. Upon receiving a task, the service can invoke the task executor specified in the task with a bag of system and service properties. After completion, the service returns a set of pre-defined {key,value} pairs, which may be propagated to the next task by the caller.

Figure 12:
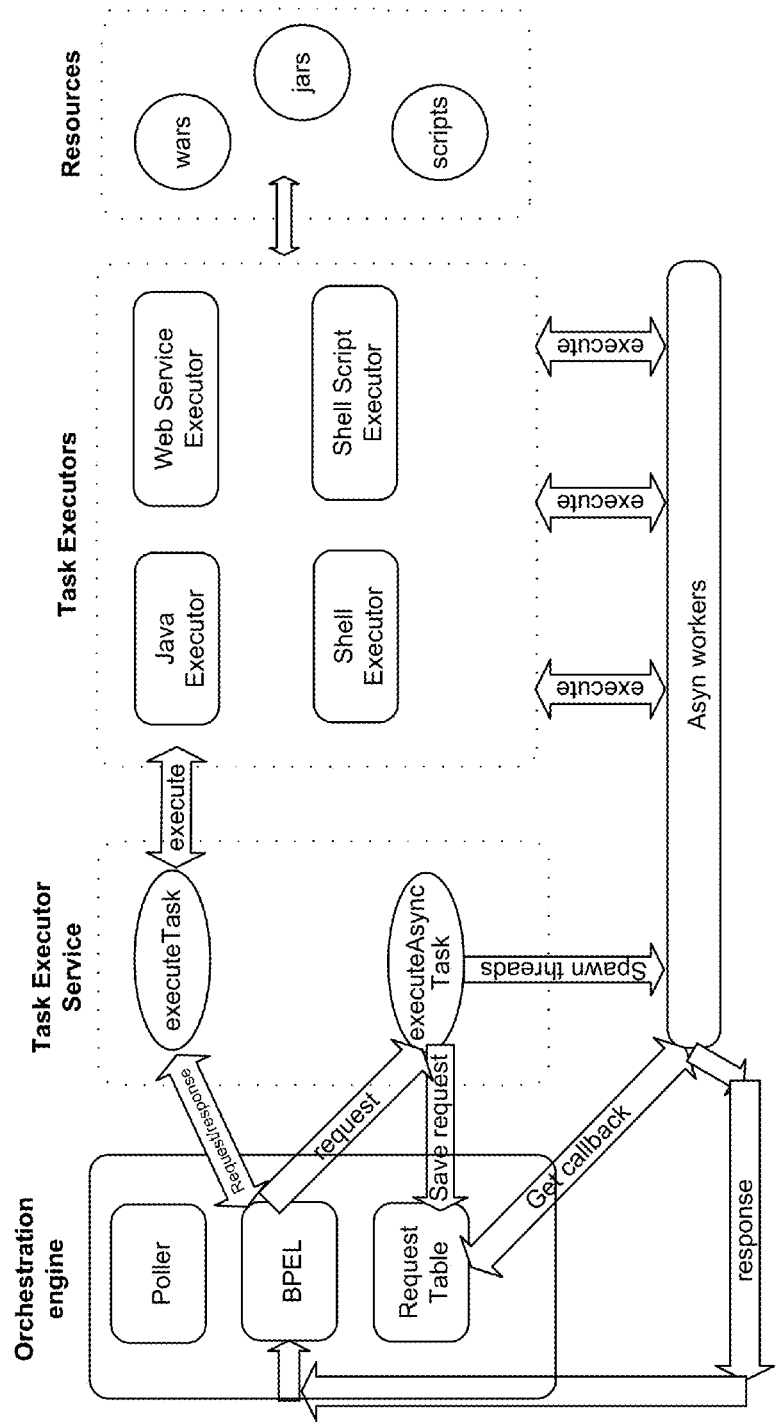
FIG. 12 illustrates the execution flow, according to an embodiment of the present invention.

In certain embodiments, as shown in FIG. 12, the task execution framework can include: tasks; task executors; task execution template; task executor service. In one embodiment, a task may encapsulate a unit of work. A task can include a unique name and a reference to an executor that is responsible for doing the unit of work the task encapsulates. This model makes it possible for services to provide required plug-ins by defining the executor for that particular task. For example, a task to create a system footprint in IDM can be run by executing the CreateSystemInIDMExecutor at a point in the execution sequence determined by the OOTB execution template.

In certain embodiments, a task executor can encapsulate the executable that needs to be called to perform the task. The task executor definition may include a unique name, the built-in executor type and a location parameter, which can be interpreted based on the executor type. The definition can also specify optional output parameters that are returned as {key,value} pairs after execution.

As shown in FIG. 12, an executor type can be of a pre-defined type, such as, but not limited to Java, web service, and shell script. For the Java type, the executor can make calls to Java libraries in the runtime. The location parameter can be of the form ClassName#MethodName. Reflection can be used to construct the object and invoke the method. The method to be invoked can accept a single Request parameter and return a Response object. For the web service type, the executor can makes calls to a service-supplied web service endpoint. For the shell script type, the executor can execute shell scripts.

The resources used by Task Executors can be, for example, jar files, war files, and shell scripts.

FIG. 12 illustrates the execution flow, according to one embodiment. Each request to the task executor service may encapsulate a task that specifies the task executor, a request bag with multiple request items, one for each service, and the index of the request item that is processed. The request contains the system specific properties that are common to all the request items, and the request item contains the service specific properties. The task executor can execute the task specified by passing in the system properties and the service properties.

Responses from the task execution framework may be provided to orchestrator 610. The responses may be queued in one or more output queues provided by service blueprint component 201. One or more response processor may be configured to pick the responses from the output queues and send the responses back to the request originators using APIS 602 or 604.

In certain embodiments, blueprint database 618 for physical provisioning can include: a pod Definition schema (e.g., pod Schema 622) to define the physical footprint of a Service; a Service Definition schema (e.g., Request/Response Schema 620) to capture Service specific plug-ins; and a Service Configuration schema (e.g., Service Instance Schema) to capture EM, IDM, URL Routing and other service specific configuration. Under the business processing blueprint, the blueprint database 618 can also include a blueprint registry 624. Additionally, the blueprint database 618 can contain information regarding the request response, the status changes and transitions. For example, once a pod is created, the entire definition of the pod can be stored in the blueprint database 618.

Figure 13:
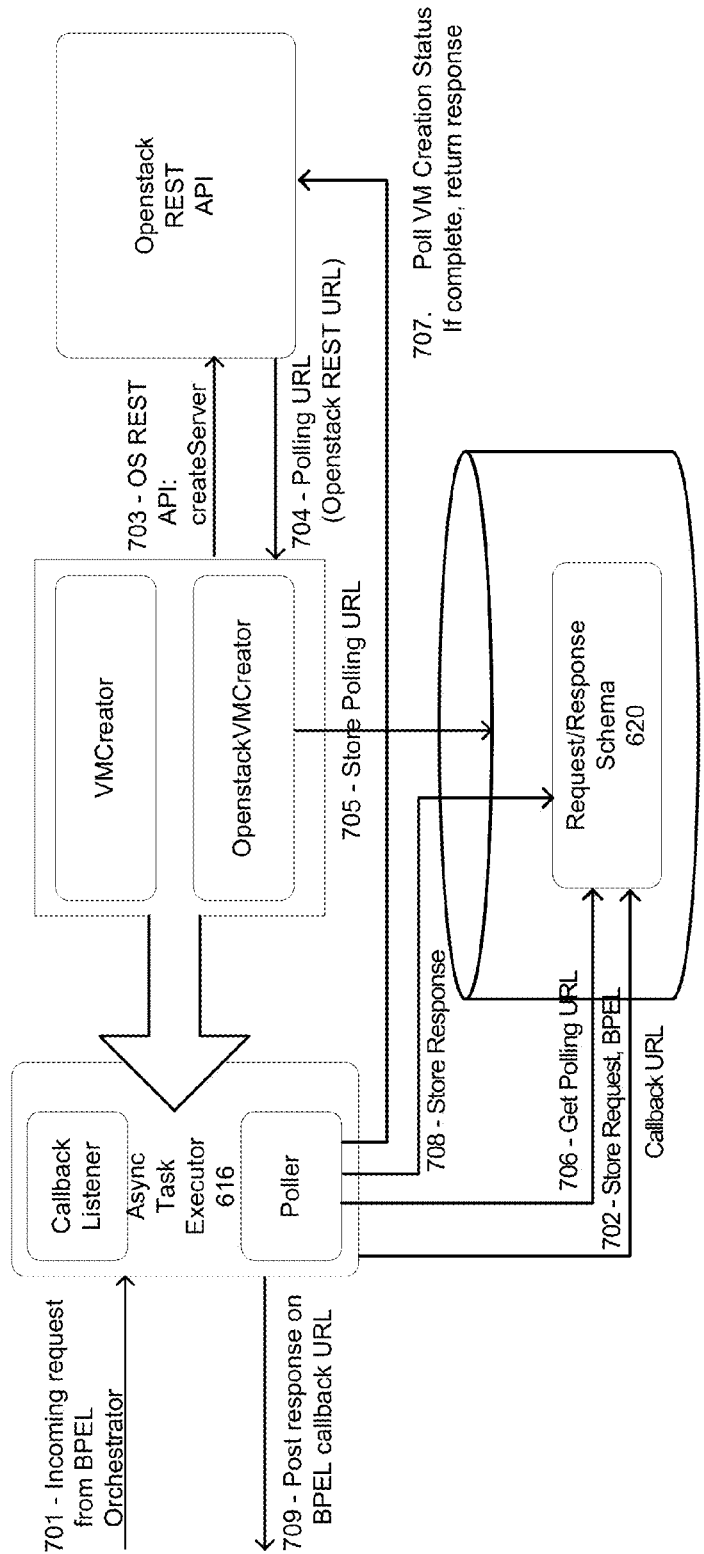
FIG. 13 illustrates an example of processing involved in performing a task asynchronously according to an embodiment of the present invention.

As described above with respect to FIG. 12, orchestrator 610 may use the services of a task execution framework to perform tasks. This task execution framework may include an asynchronous task executor 616 that is configured to perform tasks in an asynchronous manner. FIG. 13 illustrates an example of processing involved in performing a task asynchronously according to an embodiment of the present invention. In this example, the specific task may be the creation of a VM for a service.

At 701, an incoming request from the BPEL based Orchestrator 610 is received by the Asynchronous Task Executor 616. For example, the BPEL based Orchestrator 610 can call out the Asynchronous Task Executor 616 for a VM creation task.

At 702, the Asynchronous Task Executor 616 can store the request in the request/response schema 620, and request a BPEL callback URL from the request/response schema 620. For example the VM creation task can be a callback creation task, so the Asynchronous Task Executor 616 can callout the plug-in for creating the VM and.

At 703, the VMCreator can use the Openstack REST API to create a server. At 704, the Openstack REST API can return the polling URL to the VMCreator. At 705, the polling URL can be stored in the database. At 706, the Asynchronous task executor 616 can get the polling URL.

At 707 the Asynchronous task executor 616 can poll the Openstack REST API for the VM creation status. At 708 the Asynchronous task executor 616 can store the response in the blueprint database 618. At 709, the Asynchronous task executor 616 can post a response to the BPEL based Orchestrator 610 on the BPEL callback URL.

FIGS. 12 and 13 discussed above describe components in the service blueprint component that may incorporate an embodiment of the present invention.

Figure 14:
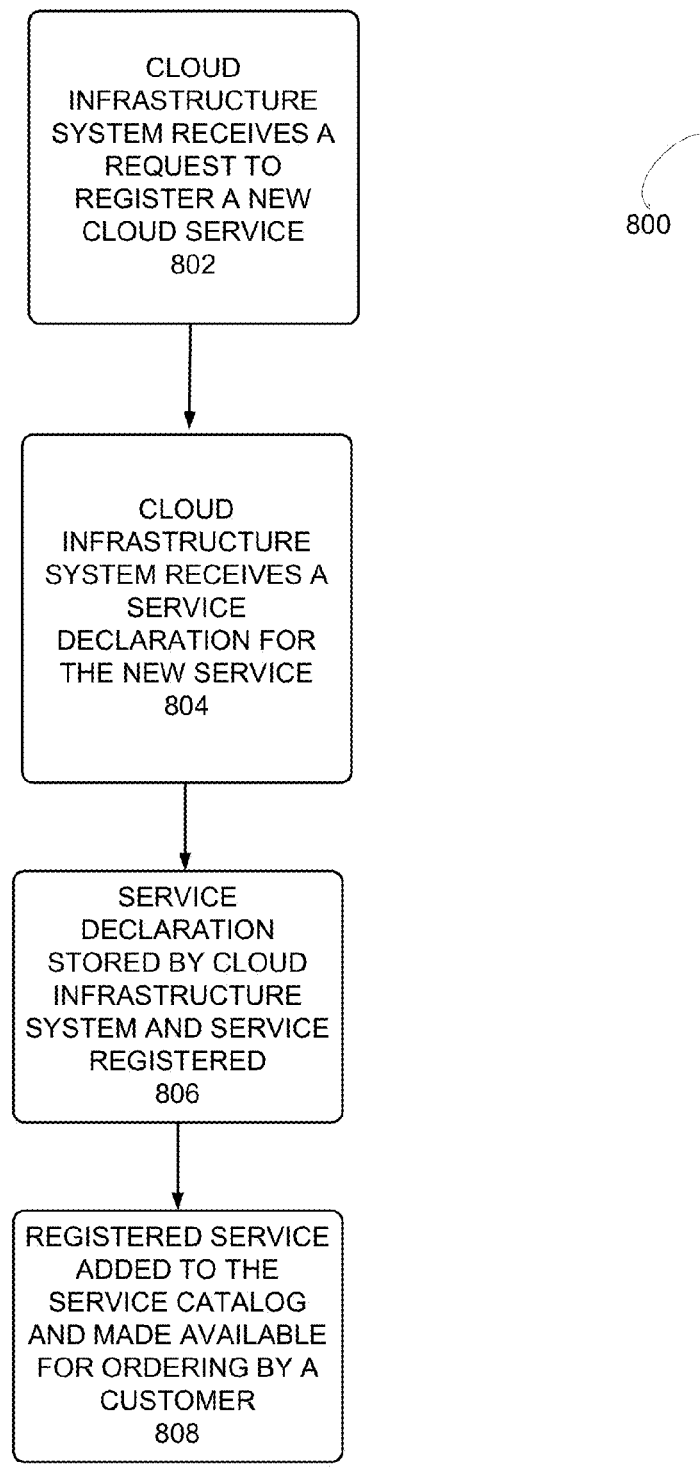
FIGS. 14 and 15 depict a simplified flowchart depicting service declaration-related processing that may be performed in accordance with an embodiment of the present invention.
Figure 15:
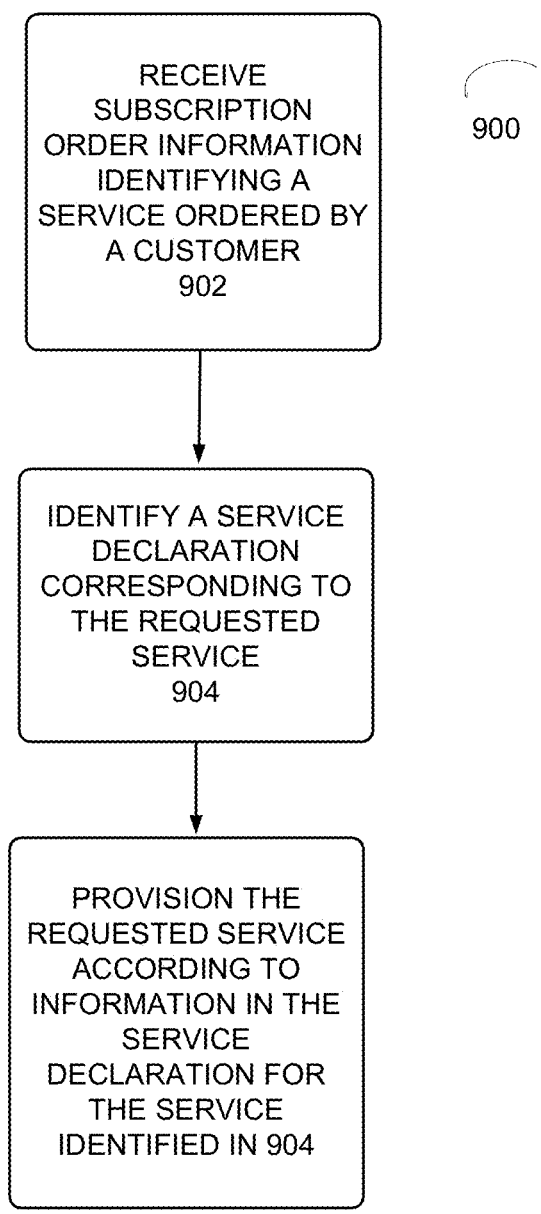

FIGS. 14 and 15 depict a simplified flowchart depicting service declaration-related processing that may be performed in accordance with an embodiment of the present invention. The processing 800 depicted in FIG. 14 and the processing 900 depicted in FIG. 15 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIGS. 14 and 15 are not intended to be limiting. Other sequences of steps may also be performed according to alternative embodiments. For example, alternative embodiments of the present invention may perform the steps outlined above in a different order. Moreover, the individual steps illustrated in FIGS. 14 and 15 may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIGS. 14 and 15 may be performed by one or more components in the service blueprint component 201 discussed in detail in FIG. 10.

FIG. 14 describing processing to make a service available, according to some embodiments.

At 802, cloud infrastructure system 100 receives a request to register a new cloud service. At 804, cloud infrastructure system 100 receives a service declaration for the new service. At 806, service declaration stored by cloud infrastructure system 100 and service registered. At 808, the registered service added to the service catalog and made available for ordering by a customer.

For example, a developer can register a specific service in a service catalog by providing a service declaration for the specific service. In some instances, a service can by registered into the service catalog by supplying an XML document conforming to the service blueprint (e.g., XML-schema) that captures all aspects of its provisioning. Once a service is registered in the service catalog, the service can become instantly orderable and deployable in the cloud, thereby providing an extensible model for services to become available in the cloud.

FIG. 15 describing processing performed upon getting a subscription order, according to some embodiments.

At 902, service blueprint component 201 can receive subscription order information identifying a service ordered by a customer. At 904, service blueprint component 201 can identify a service declaration corresponding to the requested service. At 906, service blueprint component can provision the requested service according to information in the service declaration for the service identified in 904.

For example, the service catalog includes a menu of registered services that are orderable by a customer. In some instances, a customer can request (e.g., order) a new service from service catalog. Additionally, according to one embodiment, there are certain requirements that a service developer may require from a customer in order for the customer to request the service. Service blueprint component 201 can provision the requested service based on the service declaration corresponding to the requested service.

As described above, a service declaration for a service may comprise various pieces of information that are used by the service blueprint component to automate provisioning of resource to enable the service. In certain embodiments, the service declaration for a service comprises information related to:

(1) Business processing aspects for the service;
(2) Physical Provisioning of the service; and
(3) POD provisioning.

(1) Business Processing Aspects Information

In certain embodiment, business processing aspects information in a service declaration may identify information related to business-level attributes of the service including, without limitation, information related to service catalog registration information, custom attributes information, associations information, service runtime information (e.g., Metrics, Scheduled Blackouts), purchasing information, overage information, and the like. Some of these are discussed below.

(a) Service Catalog Registration Information

The Service Catalog for cloud infrastructure system 100 identifies all the services provided by cloud infrastructure system 100 including all the options that each service may provide. The service catalog information for in the service declaration for a service (e.g., stored as Blueprint Registry 624) identifies the particular service and the various service-related information that is used and captured in the service catalog for the service. For example, the service declaration for a service may comprise information such as service details (e.g., various service components), service configurations, trial configurations for the service, and the like.

For example, service details may identify details (e.g., name, display name, description, marketing material) for the service. This information can be consumed by cloud infrastructure system 100 to dynamically reflect new orderable services. The service configurations information may identify various supported configurations such as Basic, Standard and Enterprise. The various configurations supported by a service are registered with TAS, which can be done with the use of the <serviceCatalog> element in the service declaration. A brief description and a display name (used in notifications by cloud infrastructure system 100) for this configuration can also be provided. Trial configuration elements information in the service declaration can be used by the service provider to control aspects of a service-related trial and may include information such as: trial duration, underutilization configuration and extensions. The underutilization configuration aspect can include metrics to be used for utilization checks, and the time periods to use for under-utilization warning notifications. The extensions aspect can determine if extensions are allowed, number of allowed extensions, duration of extensions, and other relevant information pertaining to extensions.

(b) Custom Attributes Information

According to some embodiments, every service registered in cloud infrastructure system 100 can specify a set of custom attributes for which values have to be provided by the customer when the customer purchases or orders the service. For instance, the CRM and HCM services require the values for service-related attributes such as enterprise name of the customer, language packs, corporate address, etc. to be supplied by the customer ordering the service. The custom attributes information in the service declaration for a service identifies these custom attributes. In one embodiment, the attributes may be stored in TAS and may allow cloud infrastructure system 100 Portal to use a model-driven user interface to present a service-specific UI for the customer. All attribute values collected in the UI may be propagated via TAS to the Physical Provisioning infrastructure (e.g., service blueprint component or SDI).

(c) Associations Information

A service instance for a service being deployed in cloud infrastructure system 100 can support associations with other service instances. In some instances, the associations can be subject to the user's privileges on the target service instance. The association can be declared to be mandatory or optional. Associations information in the service declaration for a service allows a service provider to identify such associations. Once associations are declared in the service declaration, cloud infrastructure system 100 may dynamically reflect the potential associations in the UI as part of the service creation purchase flow.

(d) Notification Templates Information

In certain embodiments, TAS can send notifications to customers for various interactions such as, but not limited to, order activation, order completion, passwords. The notification messages sent to customers can be customized for each service. According to some embodiments, the customizations can be classified into pluggable notification content and customized notification body.

A notification module may be provided to retrieve information from the TAS service catalog including, but not limited to, the service display name and description. In addition, using the service declaration and related the XML-based provisioning, there can be pluggable notification content such as, but not limited to, the logo and marketing blurb that can be supplied by the service as part of its blueprint.

Furthermore, in some rare cases, a service may want to change the overall structure of the notification message. For instance, the HCM service may require two SFTP accounts and the notification sent to the customer needs to provide information about both accounts, as opposed to just one account for most other services.

The service declaration for a service may contain notification templates information identifying the notifications to be used for the service. This enables a service provider to control and customize the notifications for the service.

(e) Service Runtime Information

A service provider may supply service runtime information for a service in the service declaration for the service. This is used by cloud infrastructure system 100 to process and present runtime information about the service. The runtime information processed by cloud infrastructure system 100 for a service can include: service metric data; service state; service availability data; events affecting the service; and the like.

Service metric data can include global information (e.g., information applicable to all metrics of the service such as the tag name used by EM web service) and metric specific information (e.g., metric Id, type, unit, current/historical, IsVisibleInPortal, display info, display name, display description). In some instances, IsVisibleInPortal can be specified if the metric is to be reported in the portal or if it is only used for intermediate computation of a derived metric. Furthermore, additional display specific elements like display order, and display category can be included in the metric specific information.

In certain embodiments, derivation computation can also be included in the metric specific information. Derivation computation can be information used to compute the derived metric from the various source metrics for a service. These computations can be an aggregation over some criteria on multiple source metrics (e.g., avg, min, max, sum, last). Additional parameters or details about the aggregation method can be captured by a list of properties. The exact details, names and values, of the properties can depend on the aggregation method and the fields over which the aggregation is required.

Service states (e.g., service instance states) can be pushed to TAS after collecting this information via the EM Agent. The EM Agent can use service provided Metric Collection APIs, which can include a metric for service state along with other usage metrics, to push the service states to the TAS. For example, a generic operation through a TAS Web Service applicable for all service types using any service provider which can update its service instance state. In some instances, EM can use a TAS Web Service API to push service instance states to TAS.

Accordingly, the service declaration for a service can comprise information specifying EM integration described herein may be sufficient to have service instance states be reflected in the TAS repository and hence in the cloud portal.

In certain embodiments, service availability information can be retrieved by TAS from EM using a Web Services API that is independent of the type of the service. Accordingly, the service declaration may not need to cover service availability. Events affecting the services can be retrieved by TAS from EM using a Web Services API that is independent of the type of the service. Accordingly, the service declaration may not need to cover scheduled blackouts.

(f) Purchasing Information

The service declaration for a service may specify purchasing information for the service. The purchasing information may be used for configuring the service in back-office accounting systems (GSI). For each offering or service level of the service, the service blueprint can specify the BOM (bill of materials). The BOM can include information such as: service part name and description; license part name and description; and pricing information. The pricing section of the BOM can include information such as: currency code; country code; price; and metric (e.g., "user/month").

(g) Overage Information

For each resource (e.g., file storage, data transfer) there may be a limit on the amount of that resource that can be used by a particular offering of the service. If a service instance uses any resource beyond the amount allowed for the offering level of the service instance, it incurs overage. The service declaration for a service can specify the information needed for calculating overage for the service.

The overage section of the service declaration can include information such as: overage limits; overage band definitions; overage aggregation rules. Overage limits can specify the amount of a resource that can be used by the service without incurring overage. Overage band definitions can specify the amount of a resource that one overage unit allows. For example, one overage unit may allow 5 GB of additional storage beyond the amount of storage allowed for the offering level. Overage aggregation rules can specify the aggregation operation to be used for aggregating resource usage values while calculating overage. For example, for storage, the aggregation operation may be "max", while for data transfer, the overage operation could be "sum."

(h) Service Instance Relationships/Dependent Service Instances Information

Some services have a requirement to have an implicit dependent service instance to be created as a by-product of creation of the primary service instance. For instance, for FA services, a pre-production instance gets created implicitly when a production service instance is created. In such scenarios, TAS can keep track of the dependent relationship between the service instances and ensures that the lifecycle of the two service instances is synchronized (e.g., implicitly delete pre-production instance when production instance is deleted, prevent deletion of pre-production instance by itself). TAS can also define the relationship between the service instances in the Cloud Portal.

The service declaration for a service may comprise information defining such relationships. In certain embodiments, the service declaration may model the relationships as a generic relationship model and not have explicit hard-coded notions of pre-production/stage instance.

(2) Physical Provisioning Information

The blueprint database 618 for physical provisioning can include: a pod Definition schema (e.g., pod Schema 622) to define the physical footprint of a Service; a Service Definition schema (e.g., Request/Response Schema 620) to capture Service specific plug-ins; and a Service Configuration schema (e.g., Service Instance Schema) to capture EM, IDM, URL Routing and other service specific configuration. As previously mentioned, under the business processing blueprint, the blueprint database 618 can also include a blueprint registry 624.

POD Definition

POD definition in the service declaration for a service can describe the various aspects that constitute a pod for the service. In certain embodiments, the elements that make up the pod definition can be: a Physical Footprint (e.g., Oracle Virtual Assembly Builder (OVAB) Assembly+OVAB Deployment Plan), Tenancy Type, On-Demand Provisioning selection, and Custom Attributes.

Physical Footprint

In some instances, the physical footprint for a pod can be specified in an OVAB assembly based definition or VM template based definition. The OVAB assembly based definition can be used by a service to model its physical footprint. Alternatively, a service can declare its physical footprint using VM templates and associated rehydration scripts. This may be useful if the OPC infrastructure supports a generic IaaS stack such as CloudStack or Openstack. This information may be included in the service declaration.

Furthermore, if a service does not declare a physical footprint in its blueprint, it may be assumed that the Service may set up its pods out-of-band and register the pods with cloud infrastructure system 100 using the registerpod API.

In defining the physical footprint, a service can specify the OVAB Assembly details, the Deployment Plan template, the Tenancy type, and whether the pod should be capable of being provisioned on-demand.

For the assembly location, services that deploy their physical footprint using built OVAB based assemblies may upload their assemblies to the Assembly Registry and can then reference the assembly in their service declaration definitions. For example, the element <assemblyLocation> can be used to specify the location of the assembly within the Assembly Registry. SDI can take the responsibility of registering the uploaded assembly with OVAB for a given OPC deployment. The element is one for each configuration (such as BASIC, STANDARD, ENTERPRISE) that the service supports.

Furthermore, the Assembly Registry can be a component that uses a file system store to upload large binaries and provide unique identifiers to the uploaded binaries that can then be used to reference the binary in other modules such as the blueprint.

In certain embodiments, for the deployment plan, and OVAB based assemblies, OVAB may need a deployment plan which aids OVAB with deployment and rehydration of the services. Services may need to supply a deployment plan template as part of their overall Service Archive package that the provisioning layer may use to create an actual deployment plan during service provisioning. The deployment plan template may have predefined placeholder tags, which may be replaced with actual values during provisioning to generate the OVAB deployment plan.

The tenancy type can specify if the service is a multi-tenant service or a single-tenant service.

The on-demand provisioning can specify if a service can be provisioned on demand. For example, if there is no available capacity for the service, the on-demand provisioning element determines if the provisioning infrastructure should deploy a pod on-the-fly during the service creation flow. In some instances, if this element is set to FALSE and there is no available capacity, the provisioning request may be paused and an alert may be raised to allow the administrator to provision additional capacity.

Custom Attributes

The custom attributes information in the service declaration can capture a set of keys and values that a service may use for a pod definition. The attributes could be a key/value pair or just a key whose values are realized at deployment by the provisioning infrastructure. An example of a custom attribute whose value is realized at deployment time could be pod usage. These attributes may be stored as part of the pod schema and passed to the pod APIs defined in the Tenant Placement section to allow the service to drive tenant placement decisions based on custom attribute values.

Pool of PODs

The pod Manager component in cloud infrastructure system 100 can support a formal notion of a pool of pods. DevOps/on-Demand service instance creation flows may use pod Manager APIs to create pods, to create pod pools, and to locate pods in a pod pool. Once pods are located in pod pools, services may be provided APIs to pull information about deployed pods/pod pools so they can make informed decisions on aspects such as Tenant Placement in their plug-ins. Alternatively, the pool of pods information may be passed to the service plug-ins.

POD and POD Pool Relationships

For a given service, multiple pods can be created a priori by DevOps or at runtime by service creation flows (for cases where on-demand pod creation is enabled in the blueprint). In some scenarios, these pods can be related to each other in some way. A typical example of such a relationship is when a DR pod is created for a primary pod. This relationship needs to be tracked by the Physical Provisioning layer (to accommodate DR flows) as well as the Business Processing layer (to expose DR instances via the Cloud Portal).

The service declaration for a service can declare any related pods that need to be created as part of creation of a primary pod for the service. It may be modeled as a generic pod relationship to allow room for other types of relationships (as opposed to supporting explicit hard-coded notions of DR).

Pod Pool relationships are more of a deployment aspect and may be established and maintained by DevOps. For instance, DevOps may designate a specific pod Pool to be the DR pool for a given pod Pool; this would imply that when a primary pod is created in pool-1, its DR-related pod may be housed in the DR Pool for pool-1. In this example, the decision to place the pod in the DR pool may be achieved using the service's tenant placement rules/plug-ins.

Service Definition

Custom plugins may be provided by a service such as Tenant Placement Plug-ins and Service Provisioning Plug-ins. Additionally, the plug-ins provided by a service may adhere to a common architecture comprising of tasks and TaskExecutors as described in the Task Execution Framework section. This information may be specified in the service declaration for the service.

Tenant Placement

The Tenant Placement module is responsible for determining the best pod to house a new service instance during instance creation. This placement can be based on various factors such as business requirements (such as Gold customers, SLA requirements, etc.) or physical constraints (such as available capacity, HA/DR support, etc.).

Service Provisioning Plug-ins

The cloud infrastructure system 100 provisioning infrastructure can automate the various lifecycle operations for each service in conjunction with service declaration provided plus-ins (i.e. callbacks). For instance, a service declaration for a service may provide plug-ins such as: provisioning lifecycle operation plug-ins; plug-ins to modify the provisioning flow; plug-ins for tenant placement; plug-ins for DevOps initiated operations, and the like. Provisioning lifecycle operation plug-ins can be plug-ins for the various operations such as, but not limited to, createService, deleteService, upsizeService, associate, and lock.

Plug-ins to modify the provisioning flow may be driven by a Task Execution template. The provisioning flow can include the overall provisioning flow for the various lifecycle operations that may be seeded out-of-the-box (OOTB) and further described in the physical provisioning orchestration engine section. A services can customize this execution flow by: providing a whole new task execution template; or injecting custom tasks into the execution flow at well-defined execution points. In some instances, the customized execution flow can be supported after the initial release. Additionally, the pre-defined provisioning flow may be modeled as a generic task execution template which can outline the set of tasks to be executed for each lifecycle operation. This information may be provided in the service declaration for the service.

Plug-ins for tenant placement can provide custom plug-ins to determine the best pod to house a newly created service instance. Plug-ins for DevOps initiated operations can provide custom plug-ins to allow DevOps to manage the services. These include operations such as, but not limited to, Start/Stop, RelocateInstance, and Quarantine. Additionally, the plug-ins may be exposed as EM custom jobs using the EM framework as described in the EM Integration section.

A standardized plug-in architecture can allow service teams to provide implementations for various provisioning actions. A plug-in can be expressed as a task in the service declaration for a service. As part of calling the service provided plug-in, a formalized runtime execution environment with runtime context and libraries may also be provided.

The plug-ins for lifecycle provisioning can be driven OOTB by a seeded task execution template. The template can determine the specific tasks and order. Depending on the operation, there can be a set of standard tasks that are executed. Additionally, services may be required to provide plug-ins to perform certain tasks that are best handled by the service itself and which can be treated as a black box by the orchestration engine.

For example, for each of create, upsize and terminate operations, a fixed set of tasks may be required as plug-ins from service teams. According to some embodiments, for the create service, if it is a new system, the plug-in can create an IDM footprint for the system and an SFTP account creation. Additionally, a create service plug-in can create an IDM footprint for the service. A service supplied plug-ins can: create the per-tenant footprint in a multi-tenant pod (e.g., DB Service); inject "personality" into a pre-provisioned anonymous instance from a pool of pods (e.g., Java Service); or create a pod on-demand (e.g., FA). In some instances, the input parameters can include: service name; identity domain name; size (e.g., MINI/BASIC/STANDARD/ENTERPRISE); subscription type (e.g., Trial/Paid); and all other properties as a list of key-value pairs.

Additionally, service supplied plug-ins, as specified in the service declaration for the service, can be used for post-deploy processes like installing language packs for FA or making the Enterprise Manager Grid Control (EMGC) discover DB. The SFTP account creation can be done at the service-level. Furthermore, if required by the network configuration element, the service declaration can enable OHS configuration changes for URL routing.

For upsize service, bookkeeping of additional resources may be reserved. Per the blueprint, if the service uses any of the resources tracked by the provisioning infrastructure (e.g., IP addresses), the upsizing plug-in can be required. The service supplied plug-in to scale up can include the following input parameters: new size; and all other properties as a list of key-value pairs.

For terminating service, associate service supplied plug-in can be used to disassociate. For instance, if Java and DB are associated and DB is being terminated, a plug-in from Java service can be used to remove the data source from the WebLogic server. The input parameters specified in the service declaration may include: service name; identity domain name of the service being terminated; and all other properties as a list of key-value pairs.

Furthermore, if required by the network configuration element in the blueprint, the termination plug-in can remove OHS configuration for URL routing. If archival is enabled, the termination plug-in can move service archive to an SFTP account. If archival is not enabled, the termination plug-in can delete all data and remove the SFTP accounts. Additionally, the termination plug-in can remove a target from the EMGC.

Additionally, a service can supply a plug-in for cleanup. The input parameters can include properties as a list of key-value pairs. The clean-up plug-in can destroy and recover all resources that are being tracked by the provisioning infrastructure (e.g., IP addresses, volumes, virtual OVAB home).

In addition to the required plug-ins, as part of the provisioning lifecycle operations, services can also provide custom plug-in. Plug-ins for custom operation flows can inject custom tasks into the execution flow. This can be done in a controlled manner and at specific points allowed in the task execution sequence. Services are free to enhance or alter the provisioning flow using these custom tasks to do service-specific actions. For example, we may allow a custom task to be executed after we have created the IDM footprint for the system before the SFTP account creation. Additionally, the whole flow for any operation can be overridden by providing a new Task Execution template.

Service Configuration

Service configuration information in the service declaration for a service allows service providers to define various configuration elements for the service. It may include, for example, an EM integration section, an IDM integration section and Network Configuration section to configure the network.

EM Integration

The EM integration information in the service declaration can provide definitions required to integrate with Enterprise Manager Cloud Control (EMCC) which allows monitoring and management of services via EM.

The main aspects of EM integration that each service may specify in the service declaration can include: target type; target discovery attributes and script; metric collection plug-in; metric collection intervals; monitoring account; and custom jobs.

The target type can define the metadata required by EM to model a new monitor-able target. The information provided in the service blueprint may be used to generate a target type XML document conforming to the EM target metadata XML schema. The target type XML document may then be registered with EM using an EM API. In some instances, the target type template can be generated using EM tools, edited manually as needed, and registered into EMCC as well as into the EMCC Agent via the EM Extensibility development Kit (EDK). The blueprint can further automate the target type using cleaner/simpler programmatic APIs that may be invoked from the provisioning infrastructure during the service publishing process when the service is registered in the service registry.

The target discovery attributes and script can be the service instance specific attributes that are used to create a target in EM. The information provided in the service declaration may be used to invoke an EM API to create the target during the service instance creation flow. In some instances, the target creation is done either by SDI (e.g., as is the case for the DB service) or by the service itself (e.g., as is the case for the Java Service wherein Nuviaq performs this function) using an EM CLI. The service declaration can evolve this into a REST API that can be invoked from the provisioning infrastructure in a common way across all services.

The metrics collection plug-in defines the path to the plug-in XML that may allow EM to collect metrics for the specific service instance. EM allows services to define the plug-in using various mechanisms such as JMX, REST, Web Services, Script, etc. The OPC Service Blueprint may expose the XML schema defined by EM to capture the definition of the Metric Collection plug-in.

The metric collection intervals aspect can control the schedule at which EMCC collects metrics for the service instance target.

The monitoring account aspect can define the account in the service to be used by the EMCC agent to collect metrics for the service instance target using the service provided metric collection plug-in.

In the custom jobs aspect, the EM can support the notion of custom jobs to be registered by services to perform custom functions such as Starting/Stopping a service. The custom functions are then exposed to DevOps via the EM console. The OPC provisioning framework may define a standard set of verbs (e.g., Start, Stop, Relocate, Quarantine) that may leverage the EM custom jobs framework to provide a common set of interfaces to DevOps across all services to perform service management functions via the EM console.

IDM Integration

These service definitions are elements that may be specified in a service declaration for a service and enables the creation of the per-Service-Instance footprint created in the shared IDM infrastructure as part of service creation. This can include for example: service name; role templates; and identity domain/service admin role mapping. For example, the service name can match the service name registered with TAS and SDI.

The role templates can be a set of per-Service-Instance roles that needs to be instantiated as part of service creation. Each of these roles may then become an assignable role for a service instance via the IDM console.

The identity domain admin/service admin role mapping can define the set of roles that need to be granted to the Identity Domain users/Service Admin users when these users get created as part of Service Instance creation.

In some instances, the following aspects in the service declaration may be finalized with respect to IDM integration to define the XML schema to capture the following: OAM policies; CSR privileges; SAML ID propagation during Association; AppIDs; Bind Credentials for the service runtime code to access ID Store/OPSS store; and Lifecycle of credentials/keys to leverage OPC key refresh automation.

Network Configuration (URL Routing)

The network configurations can contain elements that define firewall rules, URL routing, and information required for defining consistent cloud URL name spaces. furthermore, the Provisioning infrastructure layer may configure the BigIP load balancer and a pool of OHS nodes to route the URLs for the service.

(3) POD Provisioning Information

In certain embodiments, information related to the creation and use of pods for a service may be specified in the service declaration for the service. This information is then used by a pod manager during service provisioning.

In certain embodiments, a pod manager is a module that is responsible for creation and management of pods across all services. According to some embodiments, the pod manager can manage objects, maintain a persistent schema, monitor the capacity of available pods, and support programmatic APIs to be used by DevOps. In some instances, the pod manager can manage a pod or a pod pool.

For example, a pod can be a logical entity that can represent: a pre-provisioned anonymous single-tenant deployment (e.g., as is the case for the Java service); or a multi-tenant stack (i.e., physical or virtualized) that serves multiple tenants (e.g., as is the case for the DB service). In other words, a pod can be a deployment of a service on a physical stack. A pod can house one or more service instances. Pods can be created a priori or can be created on-demand when a service instance is created for a given customer.

For example, a pod pool can be a pool of single-tenant or multi-tenant pods. A pool can be created to segregate collections of pods for many reasons (e.g., different SLA requirements, preferred customers, variation in service configurations). When a Service Instance is created for a given customer, the service instance may be housed in a pod from a given pool based on various criteria as defined in the tenant placement section.

Additionally, the pod manager can maintain a persistent schema to track a list of pods per service, a list of service instances in a pod, a list of pod Pools, Physical Footprint of each pod, and Capacity information for each pod, among other pod relevant information.

Moreover, the pod manager can monitor the capacity of available pods and resources within each pod and raise alerts when a capacity threshold is hit.

Furthermore, the pod manager can support programmatic APIs to be used by DevOps. The programmatic APIs can include: createpod; createpodPool; listpods; listpodPools; registerpod (for pods created out-of-band); listServiceInstancesInpod; and scalepod.

Figure 16:
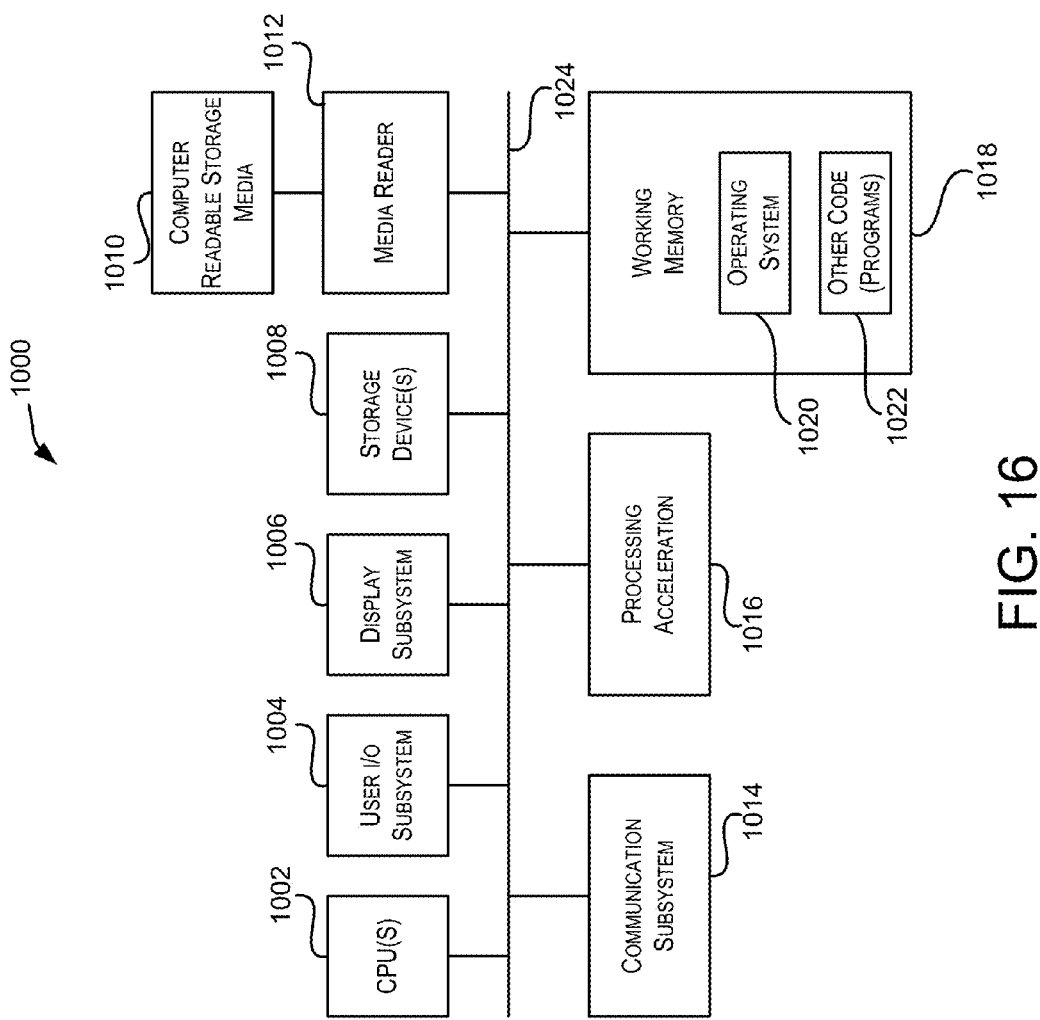
FIG. 16 is a simplified block diagram of a computing system 1000 that may be used in accordance with embodiments of the present invention.

FIG. 16 is a simplified block diagram of a computing system 1000 that may be used in accordance with embodiments of the present invention. For example, cloud infrastructure system 100 may comprise one or more computing devices. System 1000 depicted in FIG. 10 may be an example of one such computing device. Computer system 1000 is shown comprising hardware elements that may be electrically coupled via a bus 1024. The components may include one or more processing units 1002, an input subsystem 1004, an output subsystem 1006, storage devices 1008, a computer-readable storage media reader 1012 connected to a computer-readable storage medium 1010, a communication subsystem 1014, a processing acceleration subsystem 1016, and working memory 1018.

Bus subsystem 1024 provides a mechanism for letting the various components and subsystems of computer system 1000 communicate with each other as intended. Although bus subsystem 1024 is shown schematically as a single bus, alternative embodiments of the bus subsystem may utilize multiple busses.

Input subsystem 1004 may include one or more input devices such as a mouse, a keyboard, a pointing device, a touchpad, etc. In general, input subsystem 1004 may include any device or mechanism for inputting information to computer system 1000.

Output subsystem 1006 may include one or more output devices for outputting information from computer system 1000. Examples of output devices include without limitation a display device, a printer, a projection device, etc. In general, output subsystem 1006 may include any device or mechanism for outputting information from computer system 1000.

Processing unit(s) 1002 can include one or more processors, one or more cores of processors, combinations thereof, and the like. In some embodiments, processing unit(s) 1002 can include a general purpose primary processor as well as one or more special purpose co-processors such as graphics processors, digital signal processors, or the like. In some embodiments, some or all processing units 1002 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1002 can execute instructions stored in working memory 1018 or on storage devices 1008. In various embodiments, processing units 1002 can execute a variety of programs or code instructions and can maintain multiple concurrently executing programs or processes. At any given time, some or all of the program code to be executed can be resident in system working memory 1018, storage devices 1008, and/or on computer-readable storage media 1010. Through suitable programming, processing units 1002 can provide various functionalities described above for performing event stream-related processing. In some embodiments, computer system 1000 may also include a processing acceleration unit 1016, which can include a digital signal processor (DSP), a special-purpose processor, and/or the like.

Storage device(s) 1008 may include memory devices such as disk drives, optical storage devices, and solid-state storage devices such as a random access memory (RAM) and/or a read-only memory (ROM), which can be programmable, flash-updateable and/or the like. Software (programs, code modules, instructions), which when executed by processing unit(s) 1002 to provide the functionality described above, may be stored on storage devices 1008. Storage devices 1008 may also provide a repository for storing data used in accordance with embodiments of the present invention.

Computer-readable storage media reader 1012 can further be connected to a computer-readable storage medium 1010, together (and, optionally, in combination with storage device (s) 1008) comprehensively representing remote, local, fixed, and/or removable memory storage devices plus storage media for temporarily and/or more permanently containing computer-readable information.

Communications subsystem 1014 may permit data to be exchanged with network and/or any other computers. Communication subsystem 1014 serves as an interface for receiving data from and transmitting data to other systems from computer system 1000. The communication may be provided using wired or wireless protocols. For example, communication subsystem 1014 may enable computer 1000 to connect to a client device via the Internet. Communication subsystem 1014 may comprise a modem, a network card (wireless or wired), an infra-red communication device, a GPS receiver, etc.

Working memory subsystem 1018 may include a number of memories including a main random access memory (RAM) for storage of instructions and data during program execution and a read only memory (ROM) in which fixed instructions are stored. Software elements such as an operating system 1020 and/or other code 1022, such as an application program (which may be a client application, Web browser, mid-tier application, RDBMS, etc.), may be stored in working memory 1018. In an exemplary embodiment, working memory 1018 may include executable code and associated data structures (such as caches) used for processing events and enabling variable duration windows processing as described above.

It should be appreciated that alternative embodiments of computer system 1000 may have more or less components with numerous variations from that described above. For example, customized hardware might also be used and/or particular elements might be implemented in hardware, software (including portable software, such as applets), or both. Further, connection to other computing devices such as network input/output devices may be employed.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
    receiving, by a cloud infrastructure system comprising one or more computing devices, an order for a first service from a plurality of services provided by the cloud infrastructure system;
    storing, by the cloud infrastructure system, subscription order information related to the order;
    selecting, by the cloud infrastructure system, based on the first service, a first service declaration from a plurality of service declarations, each of the plurality of service declarations comprising:
    (1) resource information defining one or more resources for enabling a service of the plurality of services provided by the cloud infrastructure system; and
    (2) information indicative of one or more procedures for provisioning the one or more resources for enabling the service; and enabling, by the cloud infrastructure system, the first service, the enabling including provisioning the one or more resources defined by the resource information in the first service declaration, wherein the provisioning includes executing the one or more procedures indicated by the information in the first service declaration; and wherein the first service declaration is created using a service declaration template, the service declaration template including one or more fields, wherein each of the one or more fields are modified from the service declaration template to create the first service declaration, and wherein a field of the one or more fields is associated with the information indicative of the one or more procedures for provisioning the one or more resources for enabling the first service.

2. The method of claim 1, further comprising:
prior to the storing the subscription order information, receiving one or more input parameters from a service provider, wherein the one or more procedures indicated by the information in the first service declaration is defined based on the one or more input parameters.

3. The method of claim 1, wherein the one or more procedures for provisioning the one or more resources for enabling the service include at least one of: a procedure for Enterprise Manager (EM) Integration, a procedure for creation of an Identity Management (IDM), a procedure for uniform resource locator (URL) Routing, a procedure for creation of pod definitions, a procedure for creation of tenant placement plugins, a procedure for creation of per-tenant footprint plugins, a procedure for monitoring configuration, or a procedure for network configuration.

4. The method of claim 1, wherein the first service declaration further includes information indicative of one or more service parameters, the one or more service parameters including one or more of: client information used by the service, ordering details for the service, service parameters for computing overages, usage metrics for managing usage of the service, various custom attributes, one or more service associations, one or more customer notification templates, pricing information, or billing information.

5. The method of claim 1, wherein the first service is enabled by an orchestration engine, wherein the orchestration engine executes a task execution template for each lifecycle operation of the first service in accordance with the first service declaration, and wherein the one or more procedures indicated by the information in the first service declaration indicate an execution flow for the lifecycle operation.

6. The method of claim 5, wherein the lifecycle operation includes a creation of a new subscription for a tenant, a termination of an existing subscription for a tenant, or a modification of a subscription for a tenant.

7. A system comprising: one or more computing devices that provides a plurality of services; and a memory configurable to store subscription order information identifying a service ordered from the plurality of services provided by a cloud infrastructure system, wherein the memory stores one or more instructions that, upon execution by the one or more computing devices, causes the one or more computing devices to: receive an order for a first service from the plurality of services; store, in the memory, subscription order information related to the order; select, based on the first service, a first service declaration from a plurality of service declarations, each of the plurality of service declarations comprising: (1) resource information defining one or more resources for enabling a service of the plurality of services provided by the cloud infrastructure system; and (2) information indicative of one or more procedures for provisioning the one or more resources for enabling the service; and enable the first service, the enabling including provisioning the one or more resources defined by the resource information in the first service declaration, wherein the provisioning includes executing the one or more procedures indicated by the information in the first service declaration; and wherein the first service declaration is created using a service declaration template, the service declaration template including one or more fields, wherein each of the one or more fields are modified from the service declaration template to create the first service declaration, and wherein a field of the one or more fields is associated with the information indicative of the one or more procedures for provisioning the one or more resources for enabling the first service.

8. The system of claim 7, wherein the one or more instructions that, upon execution by the one or more computing devices, further causes the one or more computing devices to: prior to the storing the subscription order information, receive one or more input parameters from a service provider, wherein the one or more procedures indicated by the information in the first service declaration are defined based on the one or more input parameters define the one or more procedures.

9. The system of claim 7, wherein the one or more procedures for provisioning the one or more resources for enabling the service include at least one of: a procedure for provisioning physical components, a procedure for Enterprise Manager (EM) Integration, a procedure for creation of an Identity Management (IDM) Footprint, a procedure for uniform resource locator (URL) Routing, a procedure for creation of pod definitions, a procedure for creation of tenant placement plugins, a procedure for creation of per-tenant footprint plugins, a procedure for monitoring configuration, a procedure for identity management footprint configuration, or a procedure for network configuration.

10. The system of claim 7, wherein the first service declaration further includes information indicative of one or more service parameters, the one or more service parameters including two or more of: proprietary client information used by the service, ordering details for the service, service parameters for computing overages, usage metrics to be used for the service, various custom attributes, service associations, customer notification templates, pricing information, or billing information.

11. The system of claim 7, wherein the first is enabled by an orchestration engine, wherein the orchestration engine executes a task execution template for each lifecycle operation of the first service in accordance with the service declaration, and wherein the one or more procedures indicated by the information in the first service declaration indicate an execution flow for the lifecycle operation.

12. The system of claim 11, wherein the lifecycle operation includes a creation of a new subscription for a tenant, a termination of an existing subscription for a tenant, or a modification of a subscription for a tenant.

13. One or more non-transitory computer-readable media storing computer-executable instructions for a cloud infrastructure system configured to offer a set of cloud services that, the computer-executable instructions that, when executed by one or more computing devices in the cloud infrastructure system, cause the one or more computing devices to:
receive an order for a first service from a plurality of services provided by the cloud infrastructure system;

store subscription order information related to the order;

select, based on the first service, a first service declaration from a plurality of service declarations, each of the plurality of service declarations comprising:
- (1) resource information defining one or more resources for enabling a service of the plurality of services provided by the cloud infrastructure system; and
- (2) information indicative of one or more procedures for provisioning the one or more resources for enabling the service; and enable the first service, the enabling including provisioning the one or more resources defined by the resource information in the first service declaration, wherein the provisioning includes executing the one or more procedures indicated by the information in the first service declaration; and wherein the first service declaration is created using a service declaration template, the service declaration template including one or more fields, wherein each of the one or more fields are modified from the service declaration template to create the first service declaration, and wherein a field of the one or more fields is associated with the information indicative of the one or more procedures for provisioning the one or more resources for enabling the first service.

14. The one or more non-transitory computer-readable media of claim 13, the computer-executable instructions that, when executed by the one or more computing devices in the cloud infrastructure system, further cause the one or more computing devices to:

receive one or more input parameters from a customer, wherein the one or more input parameters are required by the first service declaration in order for provisioning the one or more resources for enabling the first service.

15. The one or more non-transitory computer-readable media of claim 13, wherein the first service declaration is an Extensible Markup Language (XML) document that includes processing aspects and physical aspects for provisioning the one or more resources for enabling the first service.

16. The one or more non-transitory computer-readable media of claim 15, wherein the processing aspects of provisioning include at least one of: information about different service offerings, proprietary client information, ordering, one or more overages, one or more usage metrics, one or more custom attributes, one or more service associations, one or more customer notification templates, pricing information, or billing information.

17. The one or more non-transitory computer-readable media of claim 15, wherein the physical aspects of provisioning include information about at least one of: physical storage, one or more physical components, Enterprise Manager (EM) Integration, Identity Management (IDM) Footprint, uniform resource locator (URL) Routing, one or more preconfigured set of resources definitions, one or more tenant placement plugins, one or more per-tenant footprint creation plugins, monitoring configuration, identity management footprint configuration, or network configuration.

18. The one or more non-transitory computer-readable media of claim 13, wherein the subscription order information indicates the plurality of services provided by the cloud infrastructure system, and wherein the subscription order information includes at least one of:

service information, service configuration information, or trial configuration information.

19. The one or more non-transitory computer-readable media of claim 13, wherein the first service is enabled by an orchestration engine, wherein the orchestration engine executes a task execution template for a lifecycle operation of the first service to be provisioned in accordance with the first service declaration.

20. The one or more non-transitory computer-readable media of claim 19, wherein the orchestration engine includes at least one of: a request processor, a request poller, or a request processing engine.

* * * * *

UNITED STATES PATENT AND TRADEMARK OFFICE
CERTIFICATE OF CORRECTION

PATENT NO. : 9,621,435 B2
APPLICATION NO. : 13/907616
DATED : April 11, 2017
INVENTOR(S) : Ramesh Vasudevan et al.

It is certified that error appears in the above-identified patent and that said Letters Patent is hereby corrected as shown below:

In the Claims

Column 46, Line 62 (Claim 13, Line 4): Delete "the computer-executable instructions that,".

Signed and Sealed this
Twenty-second Day of January, 2019

Andrei Iancu
*Director of the United States Patent and Trademark Office*